United States Patent
Shirota et al.

(10) Patent No.: US 8,699,129 B2
(45) Date of Patent: Apr. 15, 2014

(54) MICROSCOPE SYSTEM, STORAGE MEDIUM STORING CONTROL PROGRAM, AND CONTROL METHOD

(75) Inventors: Tetsuya Shirota, Tokyo (JP); Yasuko Ishii, Tokyo (JP); Akihiko Yoshikawa, Tokyo (JP); Izumi Sakuma, Tokyo (JP)

(73) Assignee: Olympus Corporation, Tokyo (JP)

( * ) Notice: Subject to any disclaimer, the term of this patent is extended or adjusted under 35 U.S.C. 154(b) by 291 days.

(21) Appl. No.: 13/052,530

(22) Filed: Mar. 21, 2011

(65) Prior Publication Data

US 2011/0164314 A1    Jul. 7, 2011

Related U.S. Application Data

(63) Continuation of application No. PCT/JP2009/004463, filed on Sep. 9, 2009.

(30) Foreign Application Priority Data

Sep. 26, 2008 (JP) ................ 2008-247931
Sep. 26, 2008 (JP) ................ 2008-248481

(51) Int. Cl.
    *G02B 21/00* (2006.01)
    *G02B 21/36* (2006.01)
(52) U.S. Cl.
    USPC ........................ 359/368; 359/363
(58) Field of Classification Search
    USPC ........................ 359/363, 368–384
    See application file for complete search history.

(56) References Cited

U.S. PATENT DOCUMENTS

| 5,276,550 | A  | 1/1994  | Kojima         |
| 6,118,581 | A  | 9/2000  | Domanik et al. |
| 6,477,266 | B1 | 11/2002 | Asar           |
| 7,050,622 | B2 | 5/2006  | Morishima et al. |
| 7,110,586 | B2 | 9/2006  | Bacus et al.   |
| 7,262,907 | B2 | 8/2007  | Rentzsch       |
| 7,486,886 | B2 | 2/2009  | Endo et al.    |
| 7,577,484 | B2 | 8/2009  | Fiedler et al. |
| 7,822,257 | B2 | 10/2010 | Endo et al.    |

(Continued)

FOREIGN PATENT DOCUMENTS

| EP | 0 453 239 B1  | 8/1995  |
| EP | 1 372 013 A1  | 12/2003 |

(Continued)

OTHER PUBLICATIONS

Extended European Search Report (EESR) dated May 27, 2011 (in English) in counterpart European Application No. 11002414.8.

(Continued)

*Primary Examiner* — Scott J Sugarman
(74) *Attorney, Agent, or Firm* — Holtz, Holtz, Goodman & Chick, PC

(57) ABSTRACT

A microscope system improves the operability of a user in performing a microscope observation. The microscope system attains the improvement by including: a microscope apparatus including a plurality of drive units; a display unit for displaying an operation screen for operation of the microscope apparatus; a pointing device for inputting by a pointer an operation instruction to the microscope apparatus on the operation screen; and a control unit for switching the drive units depending on the position of the pointer on the operation screen, and controlling the operation of the switched drive units depending on the operation of the pointing device.

9 Claims, 55 Drawing Sheets

(56) References Cited

U.S. PATENT DOCUMENTS

| | | |
|---|---|---|
| 2004/0036963 A1 | 2/2004 | D'Hooge et al. |
| 2005/0068614 A1 | 3/2005 | Yoneyama et al. |
| 2005/0270639 A1 | 12/2005 | Miki |
| 2005/0282268 A1 | 12/2005 | Kagayama |
| 2008/0144170 A1* | 6/2008 | Takahashi ............ 359/388 |
| 2011/0267449 A1 | 11/2011 | Shirota et al. |

FOREIGN PATENT DOCUMENTS

| | | |
|---|---|---|
| EP | 1 691 230 A1 | 8/2006 |
| EP | 1 762 878 A1 | 3/2007 |
| EP | 1 598 688 B1 | 6/2010 |
| JP | 2925647 B2 | 5/1999 |
| JP | 11-231223 A | 8/1999 |
| JP | 2001-91854 A | 4/2001 |
| JP | 2002-7498 A | 1/2002 |
| JP | 2002-90632 A | 3/2002 |
| JP | 2002-98897 A | 4/2002 |
| JP | 2003-19679 A | 1/2003 |
| JP | 2003-126017 A | 5/2003 |
| JP | 2005-331887 A | 12/2005 |
| JP | 2007-017930 A | 1/2007 |
| JP | 2007-192776 A | 8/2007 |

OTHER PUBLICATIONS

U.S. Appl. No. 13/178,146, filed Jul. 7, 2011; First Named Inventor: "Tetsuya Shirota"; Title: "Microscope System, Storage Medium Storing Control Program, and Control Method".

International Search Report dated Dec. 22, 2009 (in English) in counterpart International Application No. PCT/JP2009/004463.

Extended European Search Report (EESR) dated Jan. 31, 2012 (in English) issued in counterpart European Application No. 09815836.3.

* cited by examiner

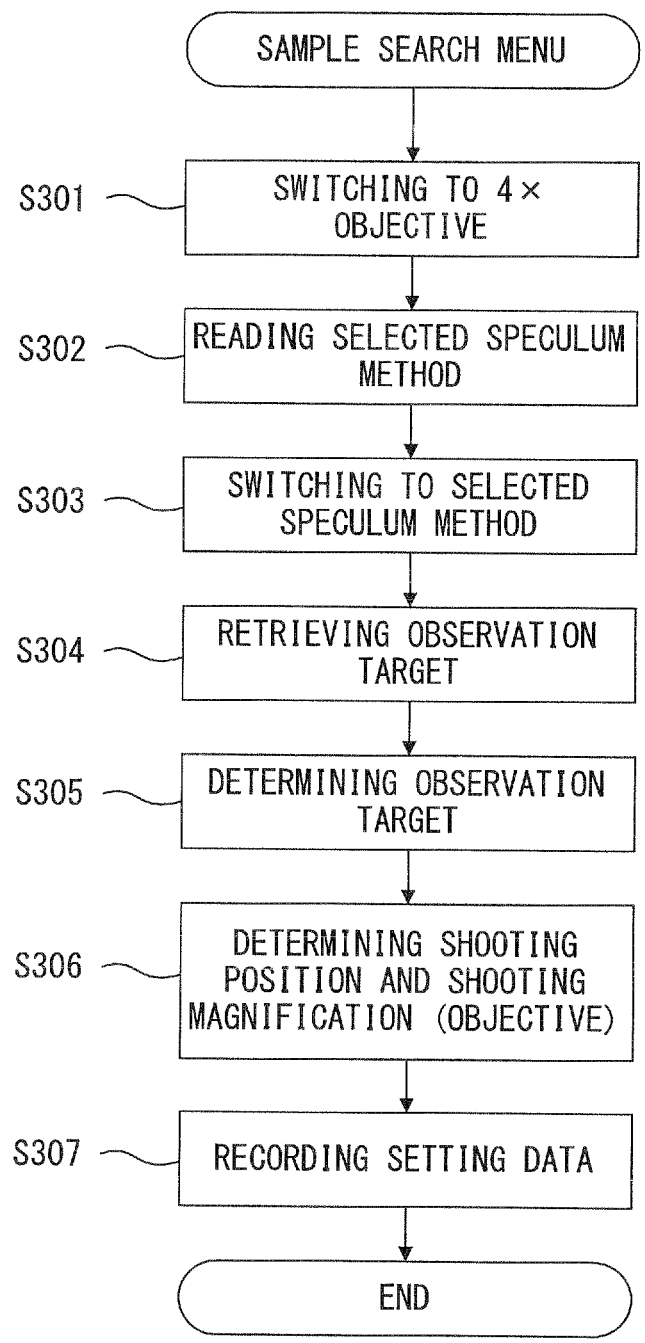
F I G. 9

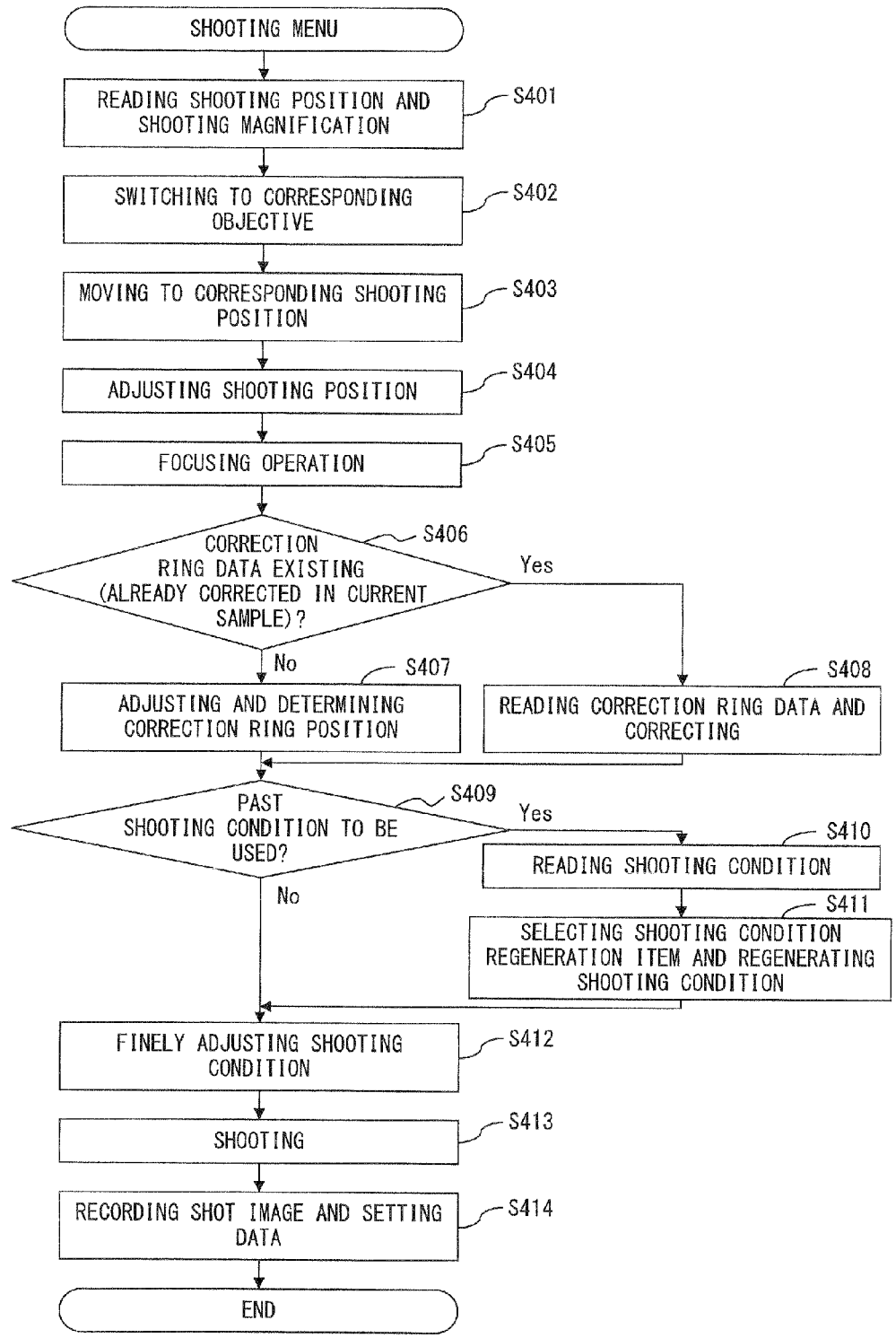
F I G. 1 0

P

| SECTIONAL AREA NAME | SECTIONAL AREA RANGE | DRIVE UNIT NAME | OPERATION CONTENTS BY WHEEL | MOUSE POINTER IMAGE |
|---|---|---|---|---|
| A | $(X_{a1}, Y_{a1}) \sim (X_{an}, Y_{an})$ | STAGE Z DRIVE CONTROL UNIT | 10 μm PER CLICK OF WHEEL IN Z-AXIS DIRECTION | P-a |
| ... | ... | ... | ... | ... |

FIG. 40

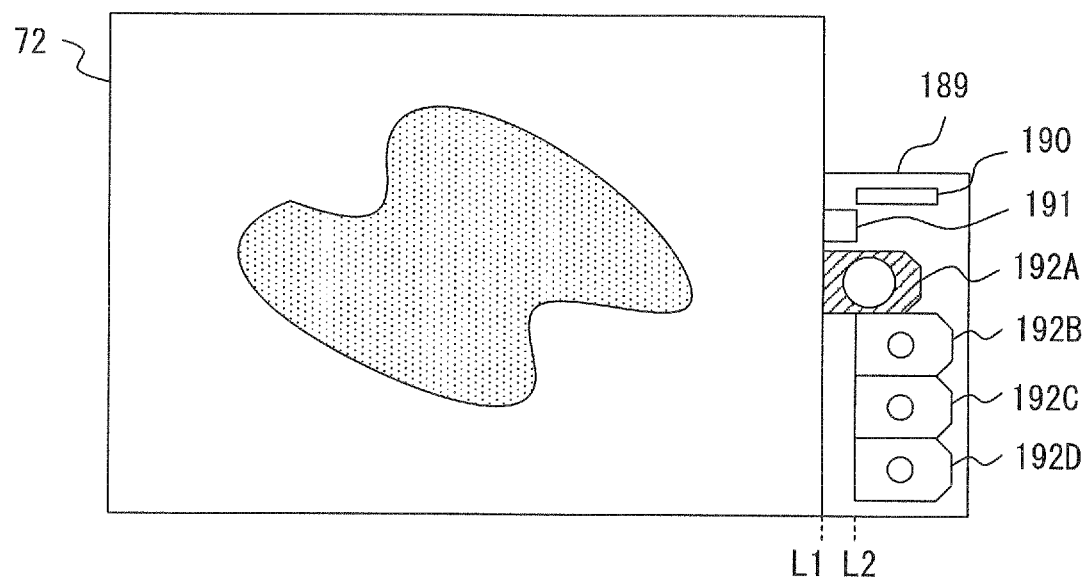
F I G. 4 1 A

F I G. 4 2 A
F I G. 4 2 B
F I G. 4 2 C

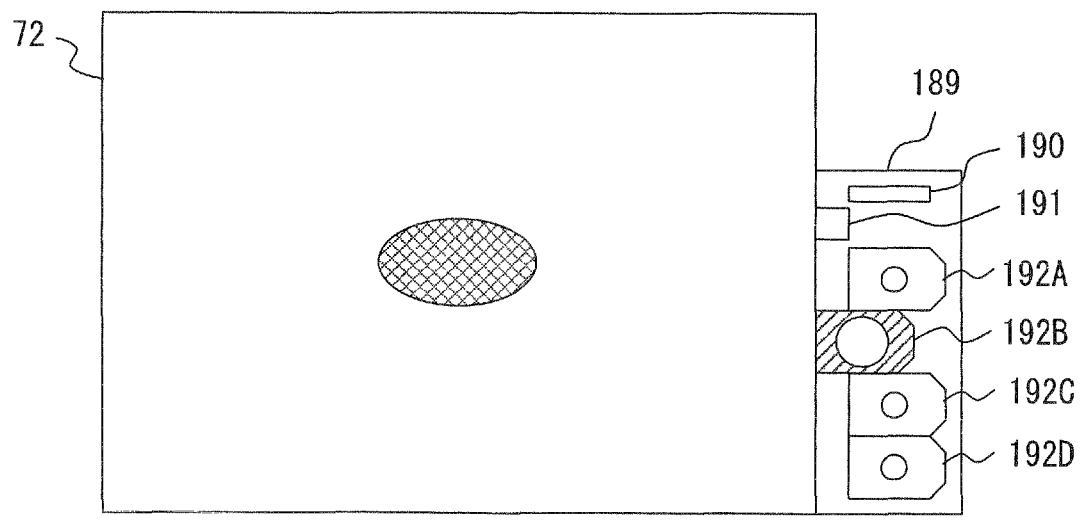
F I G. 4 3

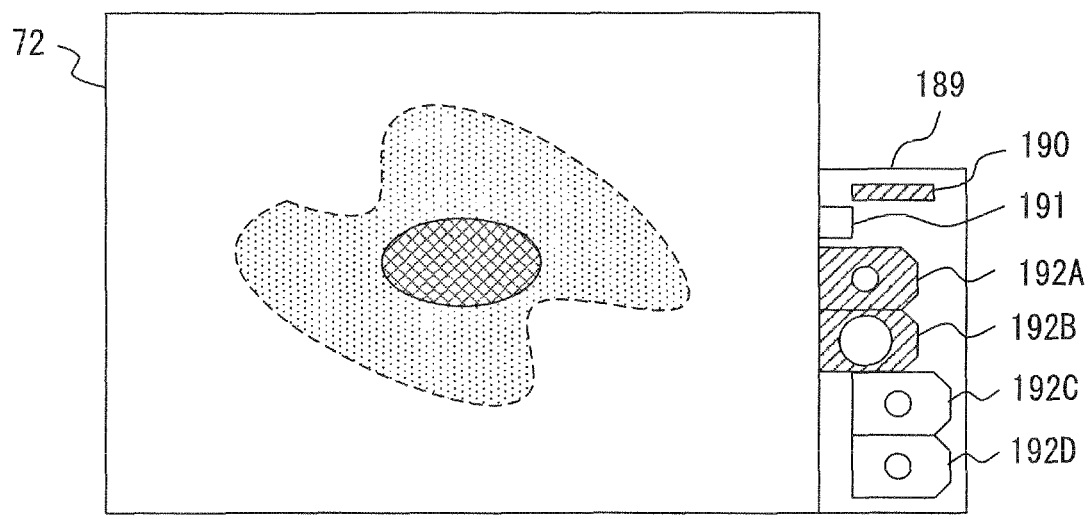
F I G. 4 6

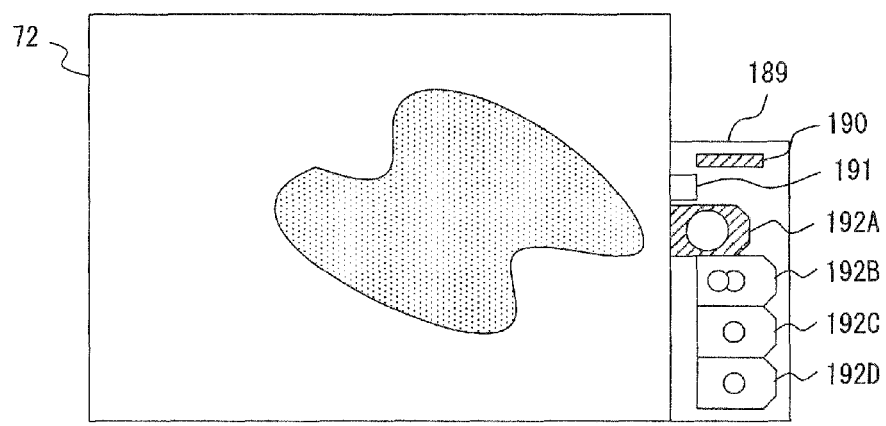
F I G. 50

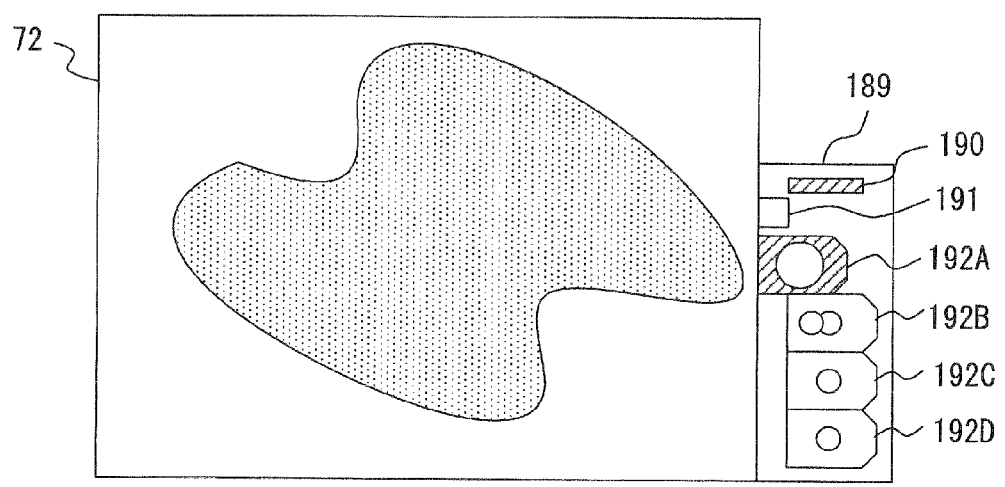
F I G. 5 2

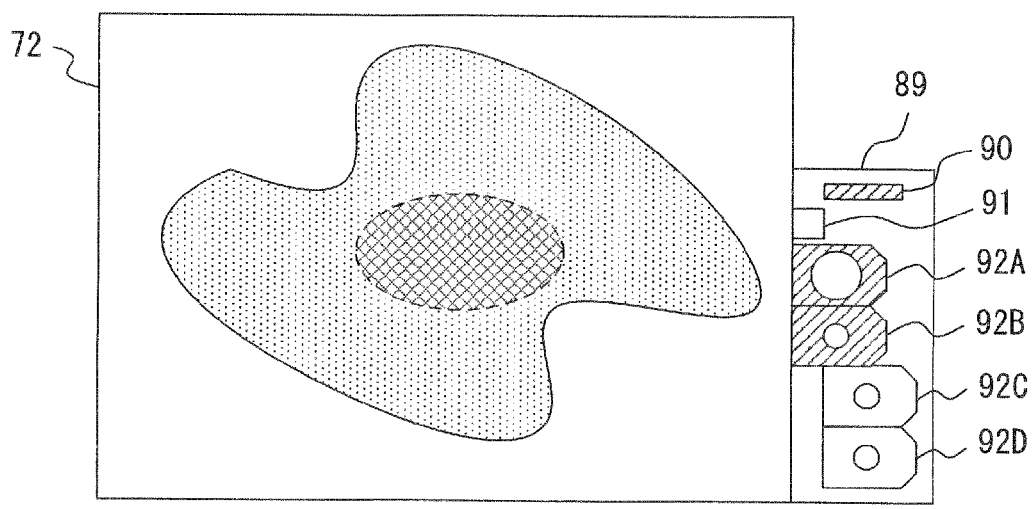
F I G. 5 3

MICROSCOPE SYSTEM, STORAGE MEDIUM STORING CONTROL PROGRAM, AND CONTROL METHOD

CROSS REFERENCE TO RELATED APPLICATIONS

This is a Continuation Application of PCT Application No. PCT/JP2009/004463, filed Sep. 9, 2009, which was not published under PCT Article 21(2) in English.

This application is based upon and claims the benefit of priority from the prior Japanese Patent Application Nos. 2008-248481, filed Sep. 26, 2008 and 2008-247931, filed Sep. 26, 2008, the entire contents of which are incorporated herein by reference.

FIELD

The present invention relates to a microscope system which has a plurality of objectives and performs a scale-up observation on a fine sample, and whose optical members are driven by a motor.

BACKGROUND

A microscope apparatus is widely used in industrial fields, and also in various studies, inspections, etc. in biological fields.

When an inspection is performed using the microscope apparatus which has a plurality of objectives having different magnifications, observations and checks are performed by operating a motor-operated stage capable of moving an observation sample on a plane orthogonal to the optical observation path from the objectives. The inspection can be performed in, for example, the following method. First, a low magnification is set for the objective, and the screening is performed not to cover the entire sample. Then, control is returned to the point where an abnormal portion is detected in the observation sample or where data is to be recorded. Furthermore, using an objective of a high magnification, the speculum method is switched to the optimum speculum method to check in detail the abnormal portion, and records the detailed observation data.

The Patent Document 1 discloses a microscope scaling apparatus for calculating the object magnification and the position of the state required to display a desired area of an observed image on the entire display area of the monitor when the desired area is specified, inserting an objective corresponding to the object magnification into the optical observation path based on the calculation result, and automatically driving the scaling mechanism and the stage so that the specified area can be centered in the observation vision.

The Patent Document 2 discloses a microscope apparatus capable of setting the moving direction of the stage and the moving speed of the stage by moving the pointer on the controller image for display on the monitor in the X-Y direction and the Z direction.

The Patent Document 3 discloses a microscope capable of adjusting the position and the focus of a microscope image by controlling the magnification of a microscope image based on the magnification set by the amount of rotation and the direction of the rotation of the wheel of a mouse, assigning the function of adjusting the position to one switch of the mouse, and assigning the function of adjusting the focus to the other switch.

The Patent Document 4 discloses switching from a speculum method by the operability similar to that in actually observing a specimen by a microscope using a virtual microscope system for regenerating an image of the specimen by combining the microscope images obtained by capturing the specimen.

The Patent Document 5 discloses a fluorescent microscope capable of realizing in real time a multicolor fluorescent observation by automatically switching a filter set, simultaneously obtaining a combined image by sequentially overlapping images, and displaying the obtained images on the display unit.

DOCUMENTS OF PRIOR ARTS

Patent Document 1: Japanese Patent No. 2925647
Patent Document 2: Japanese Laid-open Patent Publication No. 2001-91854
Patent Document 3: Japanese Laid-open Patent Publication No. 2002-98897
Patent Document 4: Japanese Laid-open Patent Publication No. 2007-17930
Patent Document 5: Japanese Laid-open Patent Publication No. 2005-331887

SUMMARY

The microscope system according to the first embodiment of the present invention includes: a microscope apparatus including a plurality of drive units; a display unit for displaying an operation screen for operation of the microscope apparatus; a pointing device for inputting by a pointer an operation instruction to the microscope apparatus on the operation screen; and a control unit for switching the drive units depending on for position of the pointer on the operation screen, and controlling the operation of the switched drive unit depending on the operation of the pointing device.

A storage medium according to the first embodiment of the present invention stores a program used to direct a computer to perform processes for controlling a microscope system provided with: a microscope apparatus including a plurality of drive units; a display unit for displaying an operation screen for operation of the microscope apparatus; and a pointing device for inputting by a pointer an operation instruction to the microscope apparatus on the operation screen according to the first embodiment of the present invention, and the processes includes: a determining process of determining the position of the pointer on the operation screen; a unit switching process of switching a drive unit depending on the position of the pointer on the operation screen based on a determination result; and a unit controlling process of controlling the operation of the switched drive unit.

A method of controlling a microscope system including a microscope apparatus including a plurality of drive units; a display unit for displaying an operation screen for operation of the microscope apparatus; and a pointing device for inputting by a pointer an operation instruction to the microscope apparatus on the operation screen according to the first embodiment of the present invention includes: determining the position of the pointer on the operation screen; switching a drive unit depending on the position of the pointer on the operation screen based on a determination result; and controlling the operation of the switched drive unit depending on an operation of the pointing device.

A microscope system according to the second embodiment of the present invention includes: a microscope capable of observing a specimen by switching a plurality of observing methods; an image pickup unit for capturing an optical image of the specimen; a selection instruction unit receiving a selection instruction to select at least one of the plurality of observing methods; a superposition unit for superposing the captured images based on the selected observing method; a display control unit for controlling display of the superposed images; a detection unit for detecting the operation of the microscope which generates a change of an observation environment of shooting the specimen; and a superposition release unit for releasing the superposition state of the superposed image based on the detection result.

A storage medium stores a program used to direct a computer to control a microscope system including a microscope capable of observing a specimen by switching a plurality of observing methods and an image pickup unit for capturing an optical image of the specimen according to the second embodiment of the present invention, and the control includes: a selection instruction acquiring process of acquiring selection instruction information for selecting at least one of the plurality of observing methods; a superposing process of superposing the captured images based on the selected observing method; a display controlling process of controlling display of the superposed images; a detecting process of detecting the operation of the microscope which generates a change of an observation environment of shooting the specimen; and a superposition releasing process of releasing the superposition state of the superposed image based on the detection result.

A method of controlling a microscope system including a microscope capable of observing a specimen by switching a plurality of observing methods and an image pickup unit for capturing an optical image of the specimen according to the second embodiment of the present invention includes: acquiring selection instruction information for selecting at least one of the plurality of observing methods; superposing the captured images based on the selected observing method; controlling display of the superposed images; detecting the operation of the microscope which generates a change of an observation environment of shooting the specimen; and releasing the superposition state of the superposed image based on the detection result.

BRIEF DESCRIPTION OF DRAWINGS

FIG. 9 is a flowchart relating to the wizard screen C according to an embodiment of the present invention;

FIG. 10 is a flowchart relating to the wizard screen D according to an embodiment of the present invention;

FIG. 40 is an example of a wheel operation control table according to the first embodiment;

FIG. 41A illustrates a speculum method change instruction area 189 of the wizard screen D according to the second embodiment;

FIG. 42 illustrates a variation of a display mode of buttons 192A through 192D according to the second embodiment;

FIG. 43 is an example of a screen displayed when a selection instruction button 192B of the fluorescent cube B is selected in the case where superposed display is not performed according to the second embodiment;

FIG. 46 is an example of a screen displayed when the selection instruction button 192B of the fluorescent cube B is selected in the state in FIG. 45 in the case where the superposed display is performed according to the second embodiment;

FIG. 50 is an example of a screen displayed when a stage is moved and an image superposed on a live image is forcibly released from the superposition in the state in FIG. 49 according to the second embodiment;

FIG. 52 is an example of a screen displayed when a magnification is changed and an image superposed on a live image is forcibly released from the superposition in the state in FIG. 51 according to the second embodiment;

FIG. 53 is an example of a screen displayed when the image in the speculum method released from the superposed display by the change of the magnification is superposed again on the live image from the state in FIG. 52 according to the second embodiment.

DESCRIPTION OF EMBODIMENTS

Figure 1:
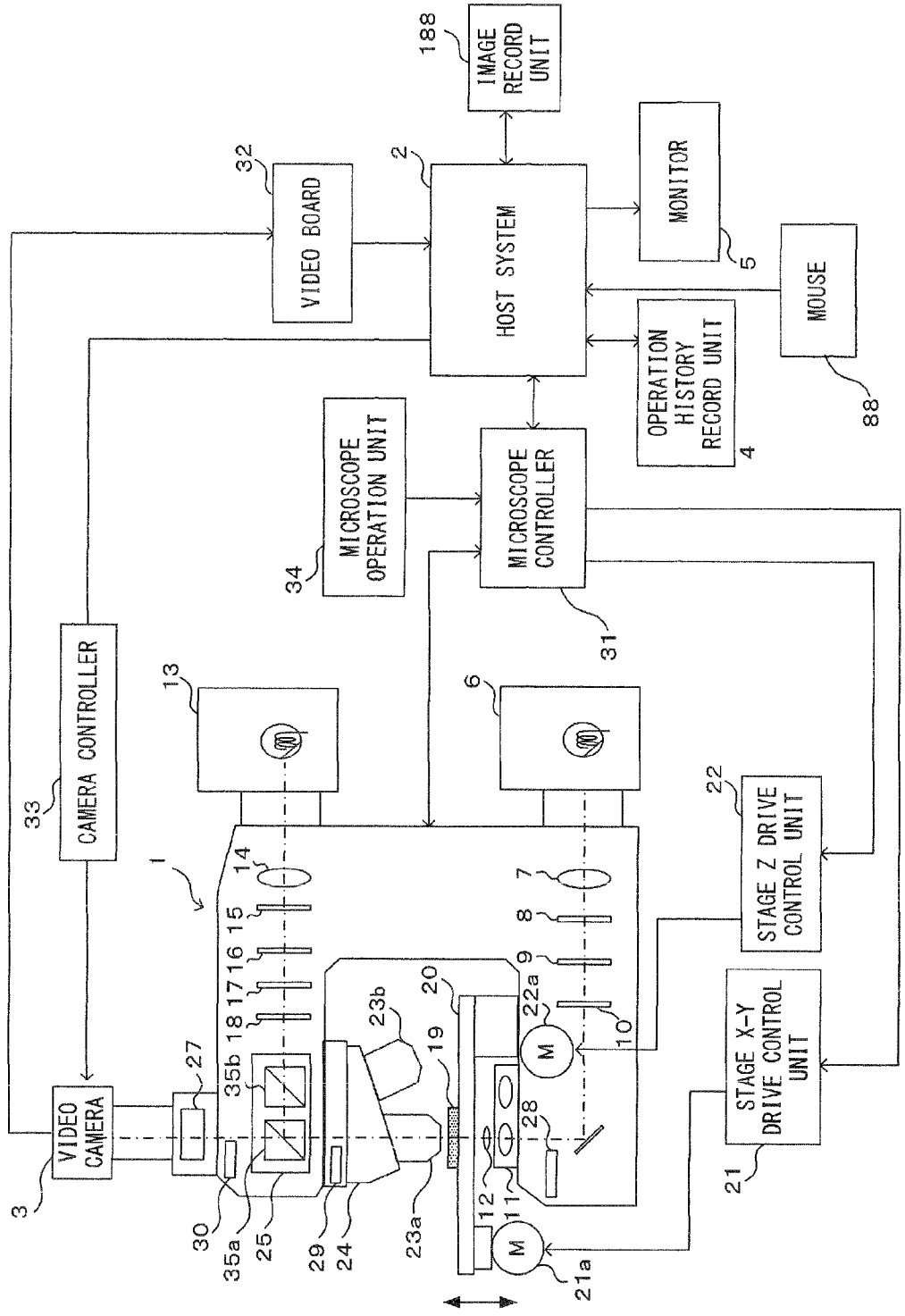
FIG. 1 is an example of a configuration of the microscope system according to an embodiment of the present invention.

The present invention provides a microscope system for improving the operability of a user when a microscope observation is performed.

First Embodiment

Recently, motorized microscope systems have become widespread. One of the systems controls a microscope by operating the operation screen displayed on the monitor using a mouse as a pointing device as disclosed by Japanese Laid-open Patent Publication No. 2002-98897.

When a function of controlling a drive unit is assigned to the wheel of a mouse provided with the wheel, the wheel can be assigned only to one drive unit because there is only one wheel provided. However, since a plurality of drive units are provided in a microscope system, the plurality of drive units cannot be controlled by a wheel provided for the mouse.

However, the drive unit to be driven by the wheel operation of the mouse depends on the observation state. For example, when the drive unit to be driven is to be switched depending on the position of the pointer on the screen displaying a sample, a user had to switch units. Therefore, the user had to switch units, thereby causing poor operability.

To solve the above-mentioned problems, the microscope system for operating a microscope apparatus by operating the operation screen using a pointing device according to the first embodiment can control a plurality of drive units using the pointing device.

The microscope system according to the first embodiment is provided with a microscope apparatus, a display unit, a pointing device, and a control unit.

The microscope apparatus has a plurality of drive units. An example of the microscope apparatus corresponds to a microscope apparatus 1 according to the present embodiment.

The display unit displays an operation screen for operating the microscope apparatus. An example of the display unit corresponds to a monitor 5 according to the present embodiment.

The pointing device inputs an operation instruction to the microscope apparatus using a pointer on the operation screen.

An example of the pointing device corresponds to a mouse 88 according to the present embodiment.

The control unit switches the drive units depending on the position of the pointer on the operation screen, and controls the operations of the switched drive units depending on the operation of the pointing device. An example of the control unit corresponds to a host system 2 according to the present embodiment.

With the above-mentioned configuration, the microscope system for operating the microscope apparatus by operating the operation screen using the pointing device can control a plurality of drive units using the pointing device.

The drive unit includes at least one of a scaling mechanism for scaling an object magnification, a drive stage capable of moving a specimen in the direction of or perpendicularly to the optical observation path, and a dimmer mechanism.

In this case, the control unit determines the position of the pointer on the operation screen. When the pointer is in the first area on the operation screen, the control unit moves the drive stage in the direction of the optical observation path depending on the operation of the pointing device. When the pointer is in the second area on the operation screen, the control unit moves the drive stage perpendicularly to the optical observation path depending on the operation of the pointing device. When the pointer is in the third area on the operation screen, the control unit allows the scaling mechanism to scale the magnification depending on the operation of the pointing device. When the pointer is in the fourth area on the operation screen, the control unit controls the dimmer depending on the operation of the pointing device.

With the above-mentioned configuration, the drive units to be controlled can be switched depending on the position of the pointer on the operation screen. Then, the functions specific to the switched drive units can be controlled by the operation of the pointing device.

The microscope system further includes an image pickup unit for capturing an image of a specimen observed by the microscope apparatus. An example of the image pickup unit corresponds to a video camera 3 according to the present embodiment. The operation screen includes an image display area for displaying the image captured by the image pickup unit. The control unit switches the drive units depending on the position of the pointer in the image display area. Then, the control unit controls the operations of the switched drive units by the operation of the pointing device.

With the above-mentioned configuration, the drive units to be controlled can be switched depending on the position of the pointer on the operation screen. Then, the functions specific to the switched drive units can be controlled by the operation of the pointing device.

An example of the pointing device is a mouse with a wheel. In this case, the control unit controls the operations of the switched drive units by the operation of the wheel of the mouse with the wheel.

With the above-mentioned configuration, the drive units to be controlled can be switched depending on the position of the mouse pointer on the operation screen. Then, the operations of the switched drive units can be controlled by the operation of the wheel of the mouse with the wheel.

Then, the control unit can change the display mode of the mouse pointer into a predetermined display mode depending on the position of the mouse pointer on the operation screen. With the configuration, the display mode of the position of the mouse pointer can be changed into a predetermined display mode depending on the position of the mouse pointer on the operation screen.

The first embodiment is described in detail with reference to the attached drawings.

FIG. 1 is an example of a configuration of the microscope system according to an embodiment of the present invention. The microscope apparatus 1 includes as a transmitted light observing optical system a transmission illuminating light source 6, a collector lens 7 for collecting the illustrating light of the light source 6, a filter unit 8 for the transmitted light observation, a field stop 9 for the transmitted light observation, aperture stop 10 for the transmitted light observation, a condenser optical element unit 11, and a top lens unit 12. It also includes as an incident-light observation optical system an incident-light illumination light source 13, a collector lens 14, filter unit 15 for the incident-light observation, a shutter 16 for the incident-light observation, a field stop 17 for the incident-light observation, and an aperture stop 18 for the incident-light observation.

On the optical observation path on which the optical path of the transmission observing optical system and the optical path of the incident-light observation optical system overlap, a motor-operated stage 20 loaded with a specimen (sample) 19 is provided. The motor-operated stage 20 can be moved in any directions of upper, lower, right, and left directions.

The control of the movement of the motor-operated stage 20 is performed by a stage X-Y drive control unit 21 and a stage Z drive control unit 22. The stage X-Y drive control unit 21 moves the motor-operated stage 20 in the X-axis direction and the Y-axis direction by controlling the drive of an X-Y motor 21a. The stage Z drive control unit 22 moves the motor-operated stage 20 in the Z-axis direction by controlling the drive of a Z motor 22a.

The motor-operated stage 20 has the function (not illustrated in the attached drawings) of detecting an origin by an origin sensor. Thus, the movement control can be performed by detecting and specifying the coordinates of the sample 19 loaded into the motor-operated stage 20.

A revolver 24, a cube unit 25, and a zoom optical system 27 are provided on the optical observation path. The revolver 24 selects an objective to be used in the observation from among the plurality of objectives 23a, 23b, . . . (hereinafter referred to as "objectives 23" as necessary). The cube unit 25 switches the speculum method.

Furthermore, a polarizer 28 for differential interference observation, a DIC (differential interference contrast) prism 29, and an analyzer 30 can be inserted into the optical observation path. Each of these units is motorized, and the operation is controlled by a microscope controller 31 described later.

The objective 23 is provided with a so-called objective with a correction ring having the function of correcting the aberration for correcting the thickness of a cover glass (not illustrated in the attached drawings). In addition, the position of the correction ring can also be controlled by the microscope controller 31.

The microscope controller 31 connected to the host system 2 has the function of controlling the operation of the entire microscope apparatus 1. The microscope controller 31 has the function of changing the speculum method, and dimming the transmission illuminating light source 6 and the incident-light illumination light source 13 according to the control signal from the host system 2. The microscope controller 31 also has the function of transmitting the current speculum state (microscope state) of the microscope apparatus 1 to the host system 2.

In addition, the microscope controller 31 is also connected to the stage X-Y drive control unit 21 and the stage Z drive control unit 22. Thus, the control of the motor-operated stage 20 can also performed by the host system 2.

A microscope operation unit 34 is a hand switch provided with various input units for inputting an operation instruction of the microscope apparatus 1. Furthermore, the operation of the motor-operated stage 20 can also be performed by a joy stick and an encoder (not described) provided for the hand switch.

The microscope image of the sample 19 captured by the video camera 3 is fetched in the host system 2 through a video board 32. The host system 2 can set the ON/OFF state of the automatic gain control, set a gain, set the ON/OFF state of the automatic exposure control, and set the exposing time on the video camera 3 through a camera controller 33.

The host system 2 can hold the image data of the sample 19 transmitted from the video camera 3 in an operation history record unit 4. The image data stored in the operation history record unit 4 is read by the host system 2, and displayed on the monitor 5 as a display unit. An image record unit 188 stores a microscope image of the sample 19 captured by the video camera 3.

The host system 2 can perform image processing such as overlapping the captured observed images of a specimen. The host system 2 controls the display mode of a graphical user interface (GUI) displayed on the monitor 5. Furthermore, the host system 2 also provides a so-called video AF function of performing a focusing operation based on the contrast of the images captured by the video camera 3.

The host system 2 is a computer having a CPU (central processing unit), main memory, the mouse 88, an interface unit, an auxiliary storage device, etc. The CPU controls the operation of the entire microscope system by executing the control program. The main memory is used as work memory by the CPU as necessary.

The mouse 88 is, for example, a mouse with a wheel according to the present embodiment. The wheel has a click function, and corresponds to 24 clicks per rotation of the wheel according to the present embodiment. An input device such as a keyboard etc. other than a mouse for acquiring various instructions from a user can be connected.

The interface unit manages the communication of various data with each component of the microscope system. The auxiliary storage device is, for example, a hard disk device etc. for storing various programs and data.

Described next is four wizard screens displayed as operation menu screens one by one on the monitor 5 by the host system 2.

Figure 2:
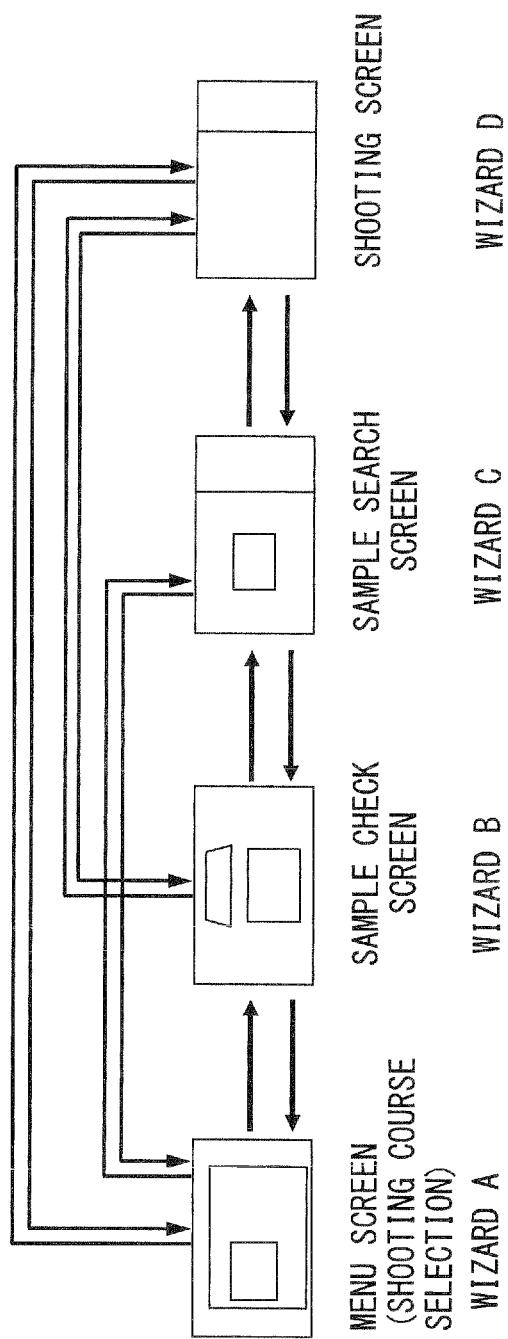
FIG. 2 is an explanatory view of the outline of four wizard screens according to an embodiment of the present invention.

FIG. 2 is an explanatory view of the outline of the four wizard screens. As illustrated in FIG. 2, the four wizard screens are a wizard screen A, a wizard screen B, a wizard screen C, and a wizard screen D. The wizard screen A is a start menu screen. The wizard screen B is a sample check menu screen. The wizard screen C is a sample search menu screen. The wizard screen D is a shooting menu screen.

Each of the four wizard screens is provided for each of a plurality of (four in the present embodiment) observing steps in the microscope observation. When the microscope observation is performed, a user uses the wizard screens by sequentially switching them in each observing step. Switching the wizard screens can be performed from each wizard screen to any of the other three wizard screens as illustrated by the arrows in FIG. 2.

On each wizard screen, the association with a unit capable of performing a setting and an operation is performed so that only a necessary setting and operation can be accepted in the corresponding observing step. Therefore, on each wizard screen, a user cannot casually perform an unnecessary setting or operation. The setting and operation accepted on each wizard screen is recorded on the operation history record unit 4 as history data.

Described below is each of the four wizard screens.

Figure 3:
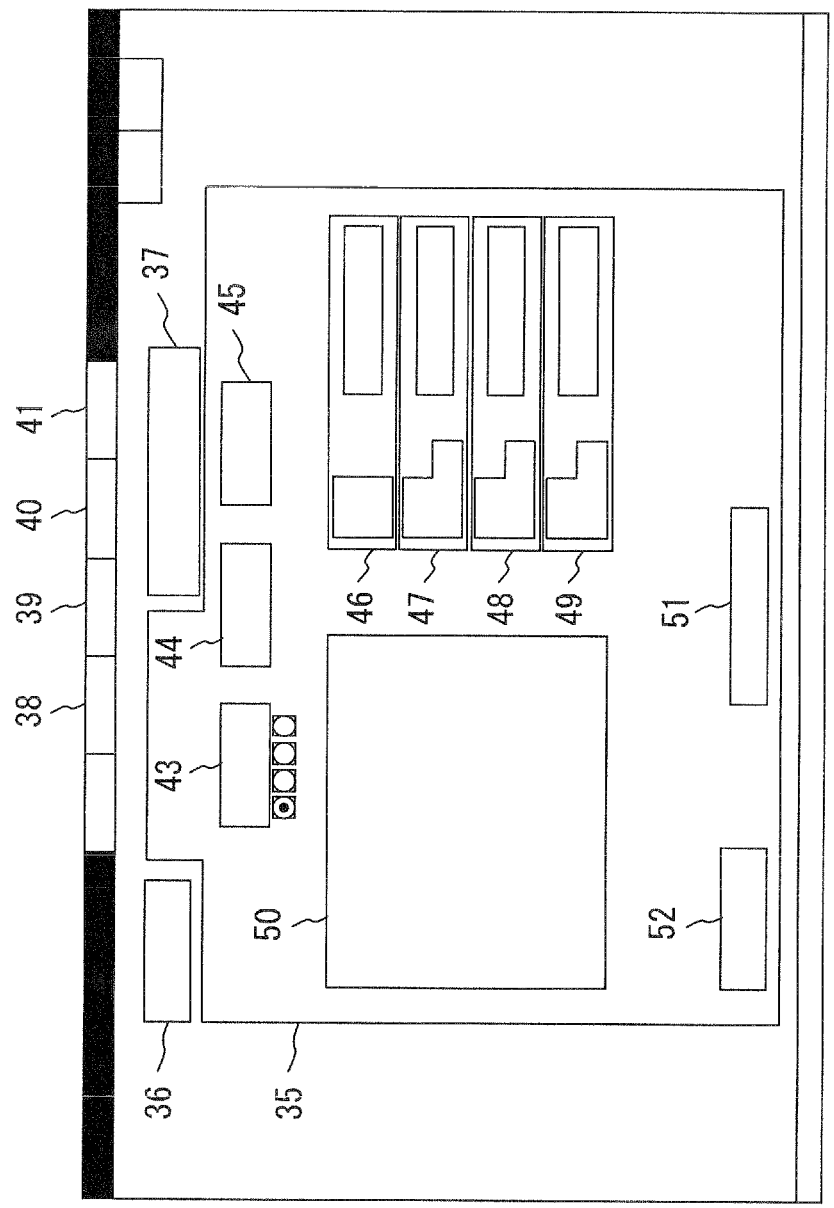
FIG. 3 is an example of a wizard screen A according to an embodiment of the present invention.

FIG. 3 is an example of the wizard screen A. The wizard screen A illustrated in FIG. 3 is a start menu screen (shooting course selection menu screen) as the first operation menu screen to start an observation.

On the wizard screen A, a user can set (switch) the sample (slide glass) 19 to be observed, select the speculum method (bright field observation, differential interference observation, fluorescent observation, etc.) in which an observation is to be performed, select an optical element (objective 23, cube, etc.) to be used, set the shot image size, etc.

On the wizard screen A, a sample switch button 36 is used in issuing an instruction to switch the sample 19. When the sample switch button 36 is pressed (for example, by mouse clicking), the host system 2 transmits an instruction to the motor-operated stage 20 through the microscope controller 31. At the instruction, the motor-operated stage 20 moves to the stage position coordinates (sample switch position coordinates) at which the sample 19 is to be switched.

After setting the sample 19, when a user performs a predetermined operation (for example, repressing the sample switch button 36) on the wizard screen A, the motor-operated stage 20 can be moved to set the position of the sample 19 at the stage position coordinates (default coordinates for starting an observation).

An area 35 is the main area on the wizard screen A. Buttons 43, 44, and 45 in the area 35 are speculum method selection buttons. The button 43 is a fluorescent observation selection button. The button 44 is a differential interference observation selection button. The button 45 is a bright field observation selection button.

Buttons 46 through 49 are shooting method selection button. For example, the button 46 is used in selecting a normal shooting operation. The button 47 is used in selecting a Z stack shooting. The button 48 is used in selecting a time lapse shooting.

A button 51 is used in transferring to the wizard screen B corresponding to the next observing step. A button 52 is used in returning to the wizard screen before the wizard screen A. For example, when the wizard screen D is transferred to the wizard screen A, and the button 52 is pressed (for example, by mouse clicking), control is returned to the wizard screen D. An area 50 is used in displaying various descriptions.

An area 37 is used in selecting, adding, and switching (physical switching) an optical element to be used. A user can set a cube etc. to be used in the observation performed in the selected speculum method through the area 37. That is, the user can set only the optical element related to the speculum method selected on the wizard screen A in various optical elements which can be driven by the microscope apparatus 1.

Buttons 38 through 41 are used in directly transferring to other wizard screens. The button 38 is used in transferring to the wizard screen A. The button 39 is used in transferring to the wizard screen B. The button 40 is used in transferring to the wizard screen C. The button 41 is used in transferring to the wizard screen D. However, when the button for transfer to the same wizard screen as that displayed on the monitor 5 is pressed (for example, by mouse clicking), the wizard screen is not transferred. The buttons 38 through 41 are provided also on the wizard screen B, the wizard screen C, and the wizard screen D described later.

On the wizard screen A, the image size in which the video camera 3 shoots an image can also be set.

Thus, the settings and operations which can be performed by a user on the wizard screen A are, in principle, those for an instruction to move the motor-operated stage 20 for switching the sample 19, those for selecting a shooting course (speculum method), those for switch optical elements, and those for setting a shot image size. Therefore, the setting and operations for other units cannot be performed on the wizard screen A. Furthermore, the area 50 is a menu for display of various descriptions.

Figure 4:
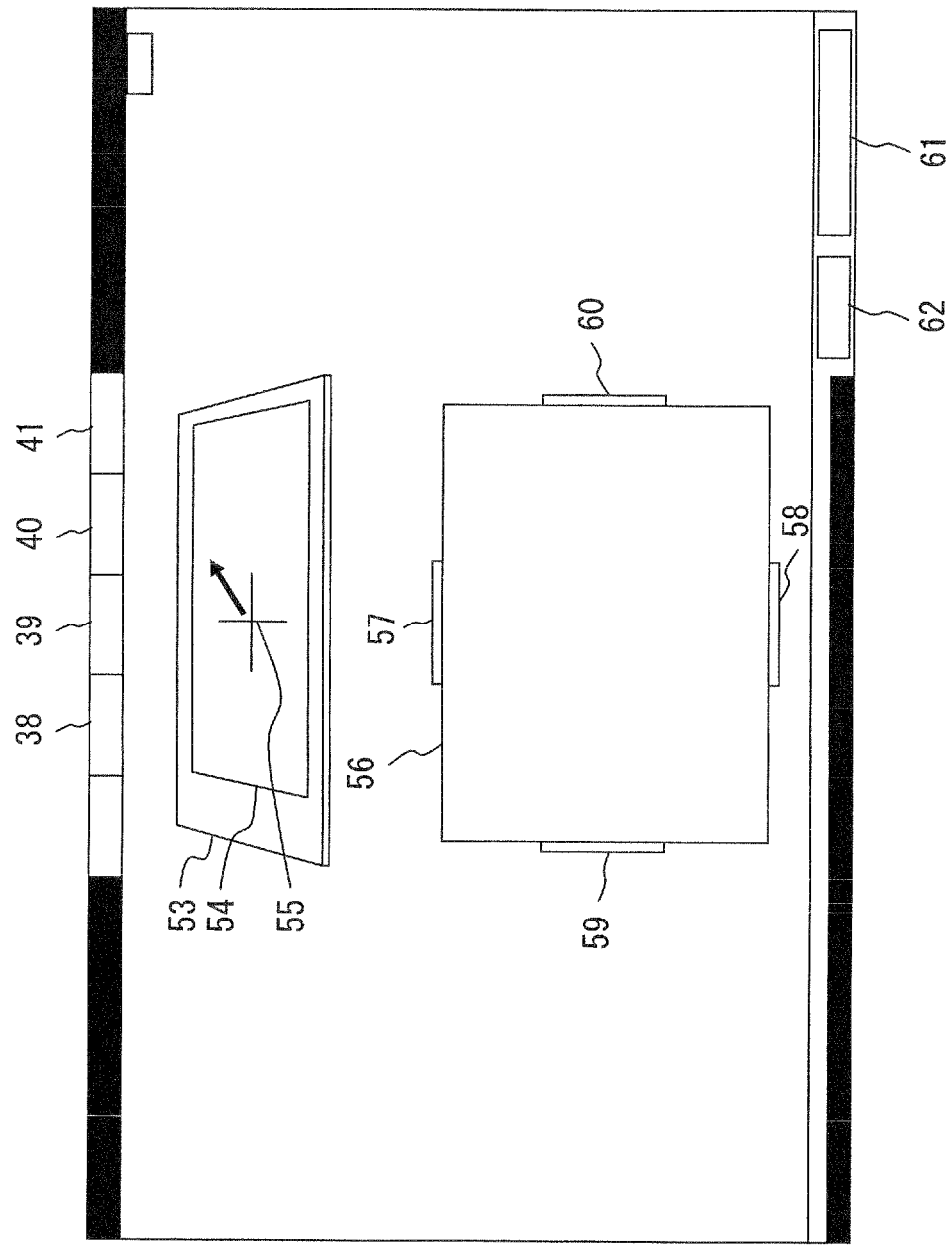
FIG. 4 is an example of a wizard screen B according to an embodiment of the present invention.

FIG. 4 is an example of the wizard screen B. The wizard screen B illustrated in FIG. 4 is a sample check menu screen as an operation menu screen on which the initial observation starting position of a macro image (shot image by a low magnification objective) is retrieved and the AF operation (focusing operation) can be performed on the macro image.

On the wizard screen B, the range of an area 54 indicated by the rectangle in a slide image area 53 refers to the range in which the motor-operated stage 20 can operate on the entire slide glass as the sample 19.

A macro image display area 56 is an area in which a macro image as a live image of the sample 19 shot in real time by the video camera 3 is displayed. When the wizard screen B is displayed on the monitor 5, the objective 23 to be used is a low magnification lens (4× objective) exclusively.

The macro image displayed on the macro image display area 56 is, in principle, the macro image shot in the speculum method selected on the wizard screen A illustrated in FIG. 3. However, when the speculum method selected on the wizard screen A is a fluorescent observation, it is necessary to prevent the fading of the observation target in the sample 19. Therefore, on the wizard screen B, the speculum method is switched to the differential interference observation, and the macro image shot in the differential interference observation is displayed.

In the slide image area 53, the range corresponding to the macro image displayed in the macro image display area 56 is indicated as a rectangular frame 54. In addition, the position of a cross mark 55 in the slide image area 53 is the central position of the displayed macro image in the macro image display area 56.

Provided around the macro image display area 56 are buttons 57 through 60 for moving the sample 19 in the four directions. When a user presses one of the buttons 57 through 60 (for example, by mouse clicking), the motor-operated stage 20 moves in the direction corresponding to the button, and the sample 19 moves in the direction.

Therefore, the user can select the initial observation starting position in which the observation target in the sample 19 is located by pressing the buttons 57 through 60 while confirming the display contents of the slide image area 53 and the macro image display area 56. When the initial observation starting position is selected, the AF operation can be performed. Thus, the focusing coordinates (Z coordinate) in the macro image can be determined.

Furthermore, after the initial observation starting position is selected, the user can press a button 61 (for example, by mouse clicking) to perform the AF operation, thereby determining the focusing coordinates (Z coordinate) of the macro image.

When the fluorescent observation is selected on the wizard screen A, the speculum method is temporarily switched to the differential interference observation as described above, and the macro image shot in the differential interference observation is displayed on the macro image display area 56. Therefore, the initial observation starting position is selected and the focusing coordinates of the microscope image is determined for the macro image shot in the differential interference observation.

The button 61 is a movement instruction button for transfer to the wizard screen C corresponding to the next observing step in addition to execution of the above-mentioned AF operation. By the user pressing the button 61, control is passed to the wizard screen C. A button 62 is to return to the wizard screen before transfer to the wizard screen B.

Thus, the settings and operations performed by a user on the wizard screen B are to select the initial observation starting position in which the observation target in the sample 19 is located and to perform the AF operation on the macro image.

When control is passed from the wizard screen A to the wizard screen B, a switching operation to the speculum method selected on the wizard screen A is automatically performed. Thus, an image in the speculum method selected on the wizard screen A can be displayed in the macro image display area 56 on the wizard screen B. However, when the fluorescent observation is selected as a speculum method, a switching operation to the differential interference observation is performed as described above. In switching the speculum method, the objective 23 and other settings are defaulted depending on the switched speculum method.

Figure 5:
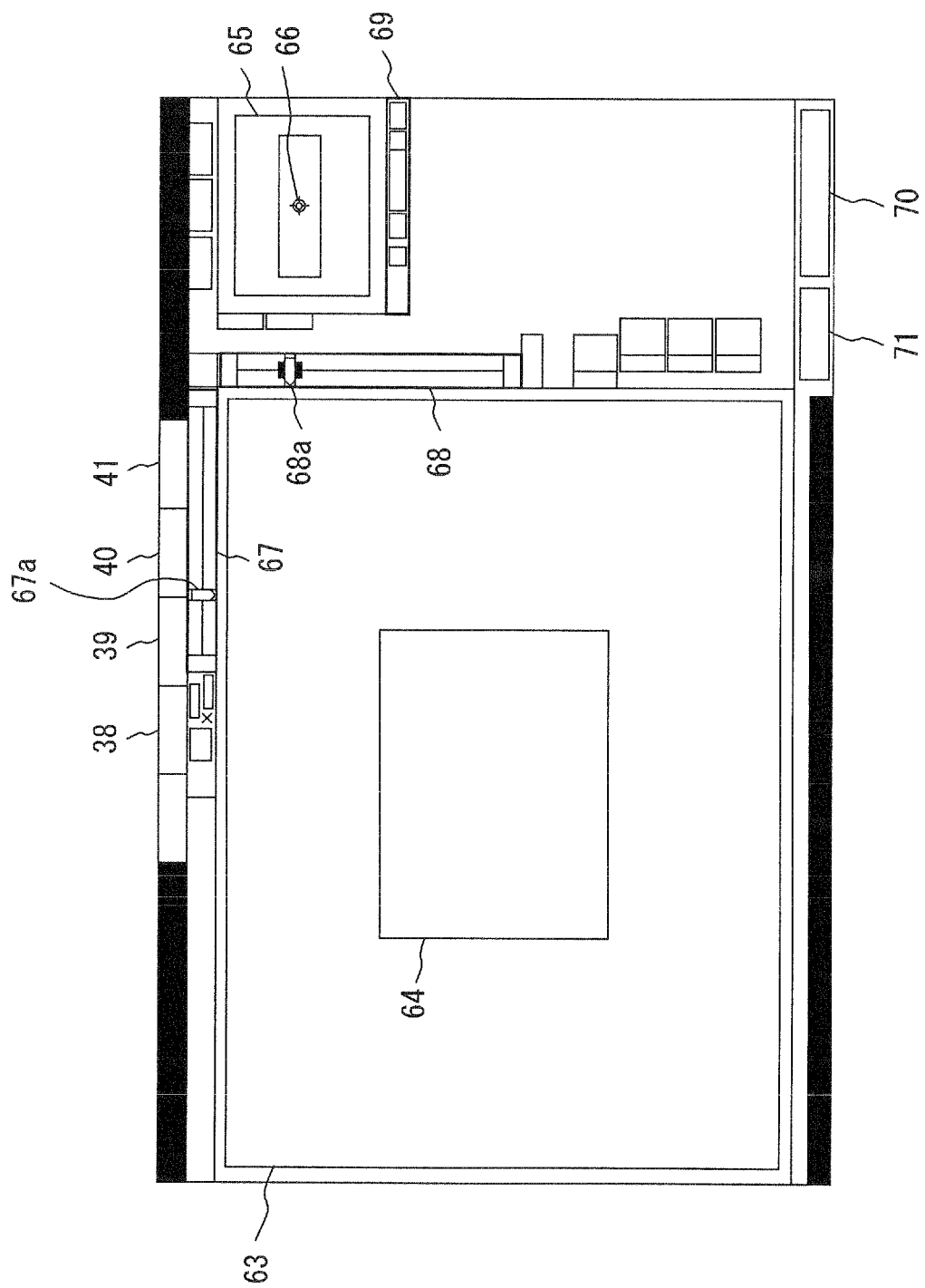
FIG. 5 is an example of a wizard screen C according to an embodiment of the present invention.

FIG. 5 is an example of the wizard screen C. The wizard screen C illustrated in FIG. 5 is a sample search menu screen as an operation menu screen on which the shooting position in the sample 19 is retrieved and the shooting magnification is selected.

On the wizard screen C, a macro live image area 63 displays a macro image as a live image of the sample 19 shot in real time by the video camera 3.

In the macro live image area 63, a user can retrieve the position of a target to be shot in the sample 19, and select the shooting range. When the wizard screen C is displayed on the monitor 5, the objective 23 to be used is a low magnification lens (4× objective in this embodiment) as on the wizard screen B.

A range specification frame 64 indicates a rectangular shooting range of the video camera 3 on the wizard screen D corresponding to the next observation step. That is, the range indicated by the range specification frame 64 corresponds to the range of the view by the objective 23 used in shooting on the next wizard screen D. The range specification frame 64 can move in the range of the macro live image area 63 by the mouse drag and drop operations.

A range specification frame switch area 67 is an area in which the size of the range specification frame 64 (shooting magnification) is changed. In the range specification frame switch area 67, the size of the range specification frame 64 (shooting magnification) can be changed by a user moving a slider 67a right and left (in this embodiment, the size can be changed in the range of 20× through 60×).

A slide area 65 is an area in which the position of the macro live image area 63 is indicated relative to the entire slide glass as the 19. In the slide area 65, a cross mark 66 indicates the position corresponding to the center of the macro image displayed in the macro live image area 63.

In a tool area 69, the brightness etc. of the macro image displayed in the macro live image area 63 is adjusted.

In a focus area 68, the focus of the microscope image displayed in the macro live image area 63 is adjusted. In the focus area 68, an instruction to move the motor-operated stage 20 in the optical axis direction (Z-axis direction) is issued by a user vertically moving a slide bar 68a, thereby changing the position of the focus.

The instruction to move the motor-operated stage 20 in the direction (X- and Y-axis directions) orthogonal to the optical axis direction can be issued by a user scrolling the macro image by the mouse drag and drop operation in the macro live image area 63.

A button 70 is used in transferring to the wizard screen D corresponding to the next observing step for shooting an image in the range specified by the range specification frame 64. A button 71 is used in returning to the wizard screen displayed before transferring to the wizard screen C.

Thus, the settings and the operations to be performed by a user on the wizard screen C are performed for retrieving the shooting position in the sample 19 and selecting the shooting magnification.

Figure 6:
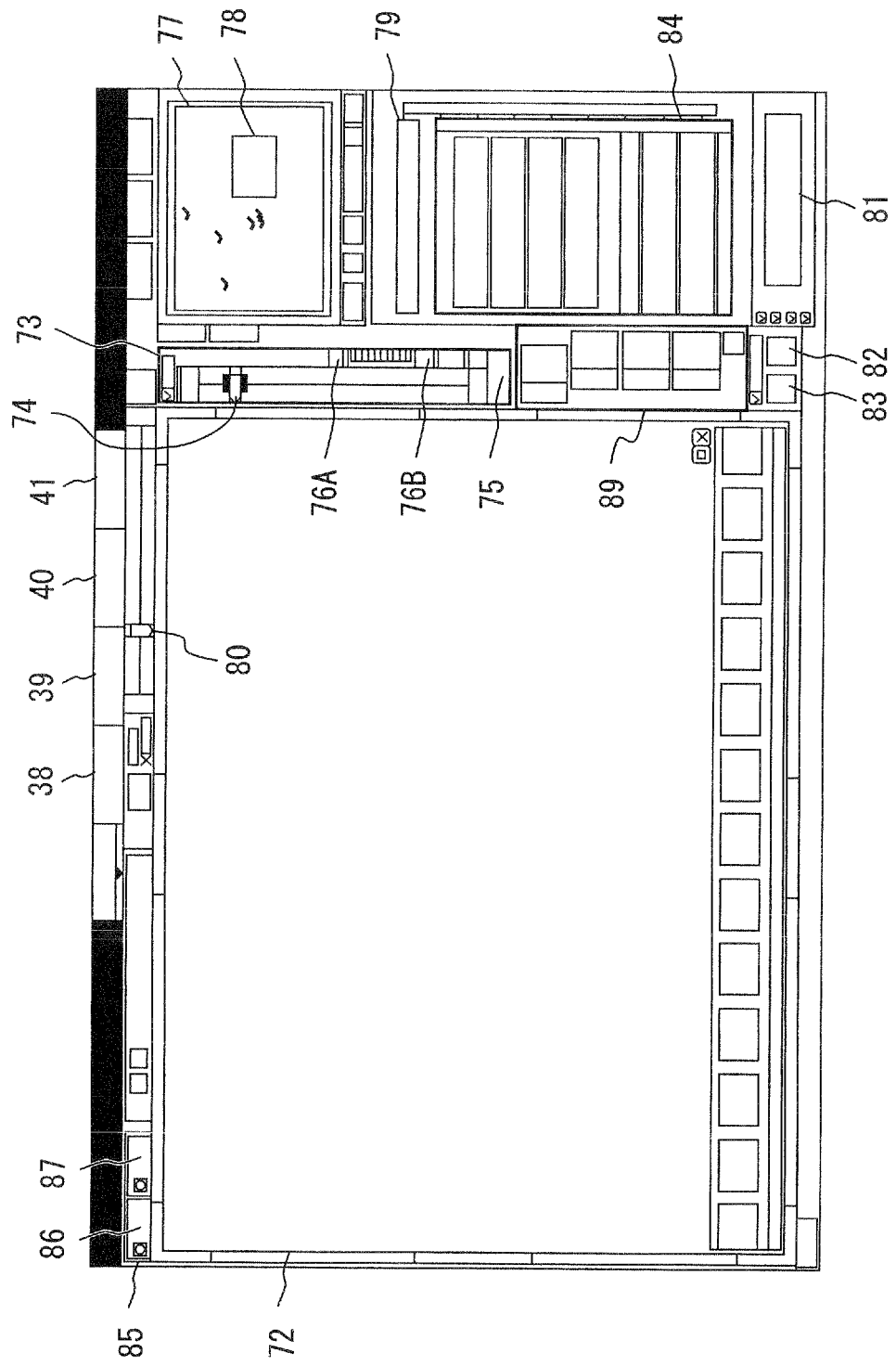
FIG. 6 is an example of a wizard screen D according to an embodiment of the present invention.

FIG. 6 is an example of the wizard screen D. The wizard screen D illustrated in FIG. 6 is a shooting menu screen as an operation menu screen on which an image in the range specified by the range specification frame 64 on the wizard screen C is shot.

On the wizard screen D, an image display area 72 is an area in which a live image obtained by shooting the sample 19 in real time by the video camera 3 in the range specified by the range specification frame 64 on the wizard screen C is displayed, or an area in which a pause image obtained by shooting the sample 19 by the video camera 3 in the range is displayed.

In the image display area 72, the motor-operated stage 20 can be moved so that the specified position can be the central position of the image display area 72 by a user specifying (for example, by double clicking of a mouse) the position in the image display area 72 when the live image is displayed. Therefore, the user can also issue an instruction to move the motor-operated stage 20 from the image display area 72 to adjust the shooting position.

A display image switch area 85 is an area in which the image to be displayed in the image display area 72 is switched between a live image as a real time image and a pause image as a shot image.

A button 86 in the display image switch area 85 is used in switching from the image to be displayed in the image display area 72 to a live image. A button 87 is used in switching from the image to be displayed in the image display area 72 to a pause image. During the display of a fluorescent image, a pause image is displayed to prevent fading unless an operation is performed for a predetermined time.

A focus and correction ring area 73 is used in obtaining focus and performing an AF operation on the image displayed in the image display area 72. In the focus and correction ring area 73, a slide bar 74 is used in adjusting focus.

An instruction to move the motor-operated stage 20 in the optical axis direction (Z-axis direction) is issued by a user vertically moving the slide bar 74 as with the slide bar 68a on the wizard screen C, thereby changing the position of the focus.

An AF button 75 is used in performing an AF operation (focusing operation). Correction ring adjustment buttons 76A and 76B are used in issuing an instruction to drive a correction ring for correcting the aberration in thickness of a cover glass.

A stage control map area 77 is an area in which the display area of the image display area 72 and the image around the range are displayed, and an image displayed in the area 77 is scrolled. In the stage control map area 77, the display range of the image display area 72 is indicated by a rectangular frame 78.

A button 79 is used in listing images previously shot under the similar or same observation conditions as the current observation conditions (speculum method, cube being used, magnification of the objective (shooting magnification), shooting image size, etc.).

A button 80 is used in issuing an instruction to change an optical magnification (zoom). The button 80 makes a change into a lower magnification by sliding it left, and into a higher magnification by sliding it right.

A shot button 81 is used in shooting a live image being displayed in the image display area 72. An area 84 is used by a user manually setting shooting conditions. A button 82 is a button in transferring to the wizard screen C. A button 83 is used in returning the wizard screen before transfer to the wizard screen D.

The speculum method change instruction area 189 is an area in which an instruction to switch the speculum method is issued. In this embodiment, the fluorescent cubes A, B, and C, and the DIC observation can be switched. The operation of the speculum method change instruction area 189 is described later in detail with reference to FIG. 41 and the subsequent drawings.

Thus, the settings and operations which can be performed by a user on the wizard screen D are performed in shooting images in the range specified by the range specification frame 64 on the wizard screen C.

Described next is the operation of the microscope system when a sample is observed while using the above-mentioned four wizard screens. In the descriptions below, the operation is exemplified by selecting the fluorescent observation as a speculum method, selecting the fluorescent cube A as an available cube, and shooting the sample 19 under the fluorescent observation using the fluorescent cube A.

FIGS. 7 through 10 are flowcharts of sample observing operations. The flowcharts are controlled by the host system 2. FIGS. 11 through 19 are examples of the wizard screen displayed on the monitor 5 during the operation.

First, to start the observation of a sample, the monitor 5 displays the wizard screen A (FIG. 3) by a predetermined operation of a user. Thus, the process illustrated in FIG. relating to the wizard screen A as a start menu screen is started.

Figure 7:
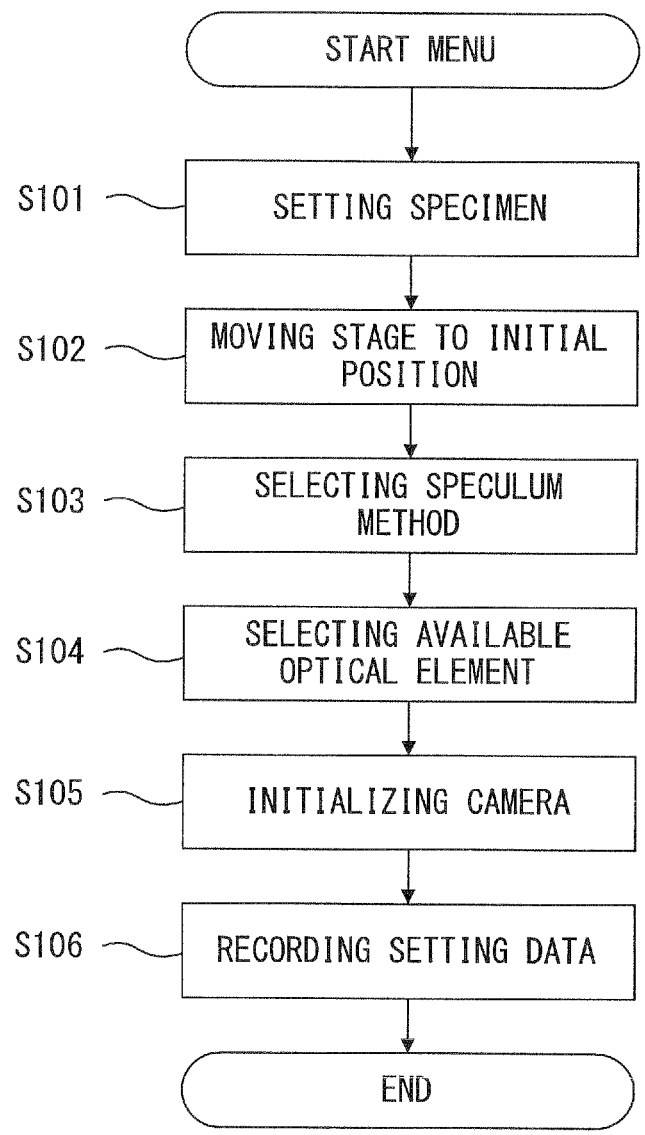
FIG. 7 is a flowchart relating to the wizard screen A according to an embodiment of the present invention.

In FIG. 7, when a user presses the sample switch button 36, the host system 2 moves the motor-operated stage 20 to the coordinates of the start position (sample switch position coordinates) to switch the sample (specimen) 19. After the completion of the movement of the motor-operated stage 20, the sample 19 is set by the user (S101).

When the sample 19 is set, the host system 2 moves the motor-operated stage 20 so that the position of the sample 19 is located at the coordinates of the predetermined central stage position (default coordinates of the start of the observation) of the motor-operated stage 20 depending on the predetermined operation (for example, repressing the sample switch button 36) by the user for the wizard screen A (S102). Thus, the position of the motor-operated stage 20 is set at the reference point coordinates.

Then, by the user pressing one of the buttons 43 through 45, a speculum method is selected (S103). Thus, a speculum method for an observation is selected. In the present embodiment, the fluorescent observation is selected. Therefore, it is assumed that the button 43 has been pressed.

Next, a cube is selected by the operation of the use on the area 37 (S104). Thus, the cube used for the observation is selected. In the present embodiment, the fluorescent cube A is used. Therefore, it is assumed that the fluorescent cube A has been selected.

Then, the image size in which an image is shot by the video camera 3 is set by a predetermined operation of user for the wizard screen A as the initial setting of the camera (S105). In the present embodiment, it is assumed that M×N (M>0, N>0) is set as a shot image size.

Next, when the user presses the button 51, the host system 2 records the settings and operations performed in steps S101 through S105 as history data in the operation history record unit 4 (S106). In the present embodiment, the information that the fluorescent observation has been selected as a speculum method, the fluorescent cube A has been selected as an available cube, the shot image size has been set to M×N, etc. is recorded on the operation history record unit 4 as history data. Then, the wizard screen A displayed on the monitor 5 is switched to the wizard screen B (FIG. 4). Thus, the flowchart illustrated in FIG. 8 relating to the wizard screen B as a sample check menu screen is started.

Figure 8:
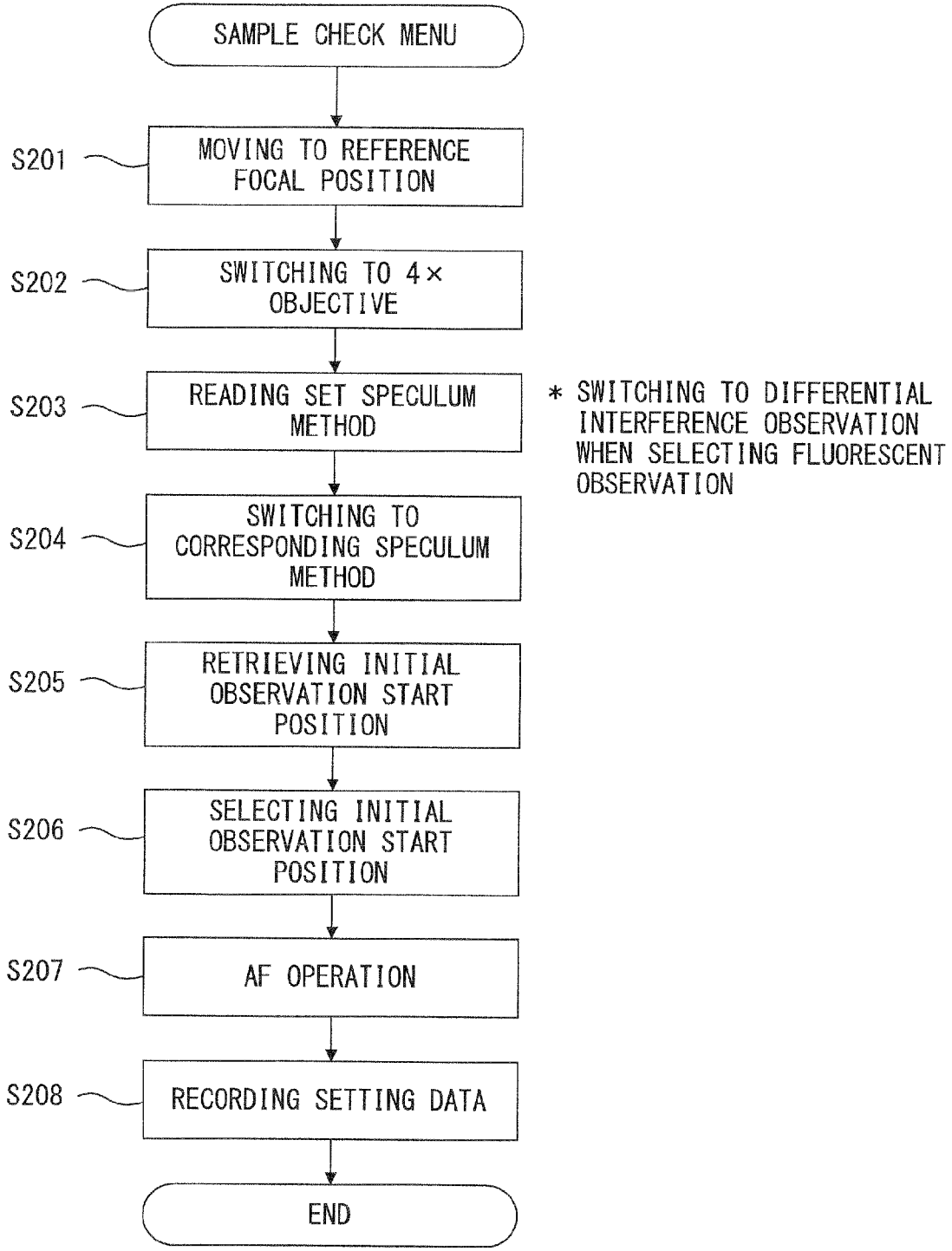
FIG. 8 is a flowchart relating to the wizard screen B according to an embodiment of the present invention.

In FIG. 8, when screen is transferred to the wizard screen B, the host system 2 first issues an instruction to the microscope controller 31. At the instruction, the microscope controller 31 moves the motor-operated stage 20 to the position of a predetermined standard focus (Z coordinate) position (S201), and switches from an available objective 23 to a 4× lens (S202).

Then, the host system 2 reads the speculum method selected in S103 from the operation history record unit 4 (S203). Then, the host system 2 switches from the current speculum method to the speculum method corresponding to the read speculum method (S204).

In the present embodiment, the fluorescent observation is read as a selected speculum method because the operation history record unit 4 stores the information that the fluorescent observation has been selected as a speculum method. Then, the current speculum method is switched to the differential interference observation as a speculum method corresponding to the read fluorescent observation.

Thus, switching not to the fluorescent observation but to the differential interference observation is performed on the wizard screen B when the selected speculum method is a fluorescent observation as described above to prevent an observation target from being faded. Thus, the setting of the microscope apparatus 1 depending on the current speculum method is switched to the setting of the microscope apparatus 1 depending on the differential interference observation.

When the switching of the speculum method is completed, the host system 2 shoots the sample 19 in real time by the video camera 3 in the speculum method to which the switching has been performed, and the display of the macro image in the macro image display area 56 as the live image is started.

Figure 11:
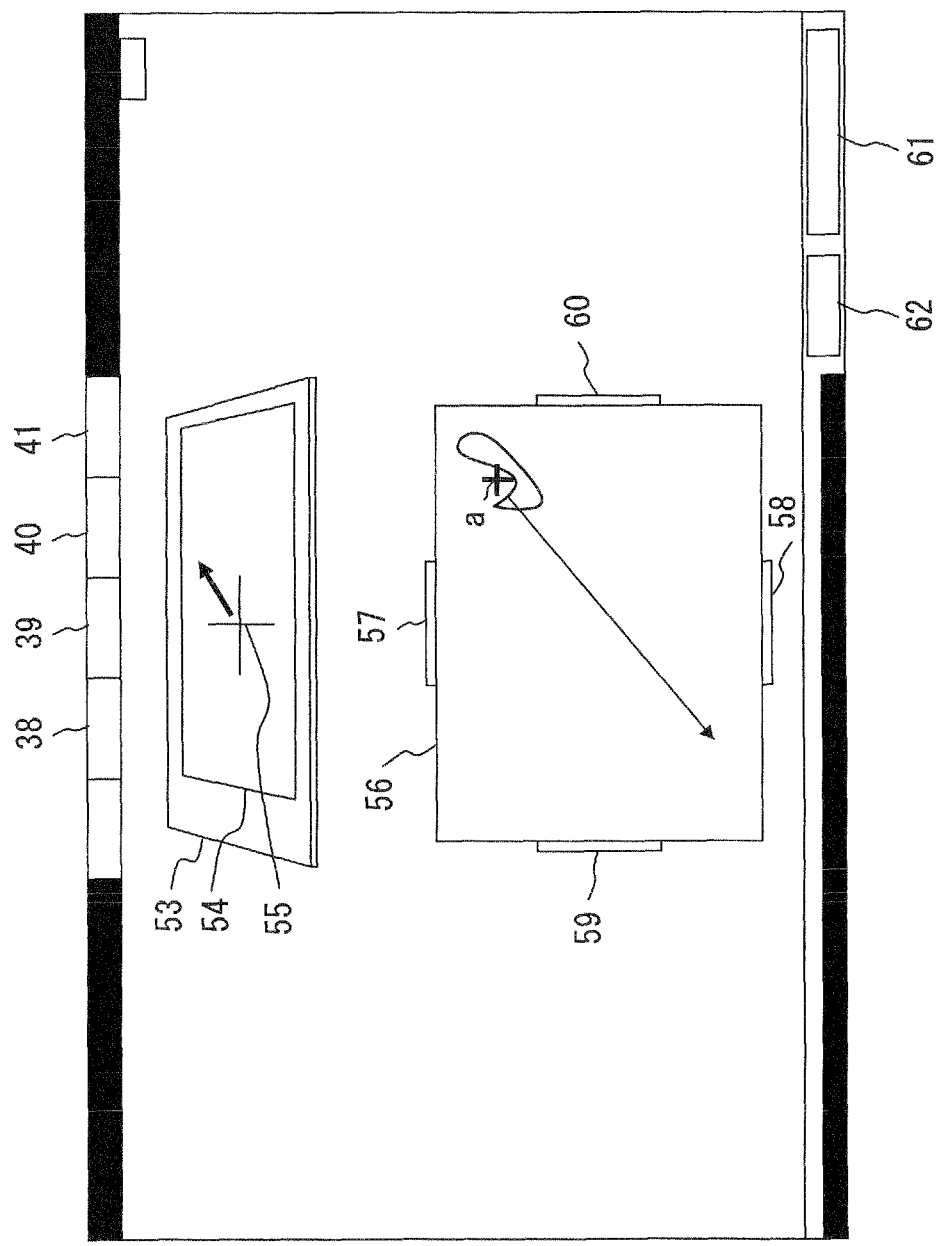
FIG. 11 is the first view of an example of the wizard screen B during the observing operation according to an embodiment of the present invention.

In the present embodiment, since switching is performed to the differential interference observation, the host system 2 shoots the sample 19 in real time by the video camera 3 under the differential interference observation, and starts displaying the macro image as a live image in the macro image display area 56. FIG. 11 is an example of the wizard screen B in this case.

Then, when the user presses the buttons 57 through 60, the host system 2 moves the motor-operated stage 20 (S205). By the operation, the initial observation starting position in which the observation target in the sample 19 is located is selected (S206). Thus, the user presses the buttons 57 through 60 while confirming the display contents of the slide image area 53 and the macro image display area 56, thereby retrieving the initial observation starting position in which the observation target in the sample 19 is located. Then, the user can select a desired position as an initial observation starting position.

The position selected as the initial observation starting position is the central position of the macro image displayed in the macro image display area 56. In the present embodiment, the point a on the macro image displayed in the macro image display area 56 on the wizard screen B illustrated in FIG. 11 is selected as an initial observation starting position. In this case, the buttons 57 through 60 are pressed so that the point a can be the central position in the macro image display area 56.

Figure 12:
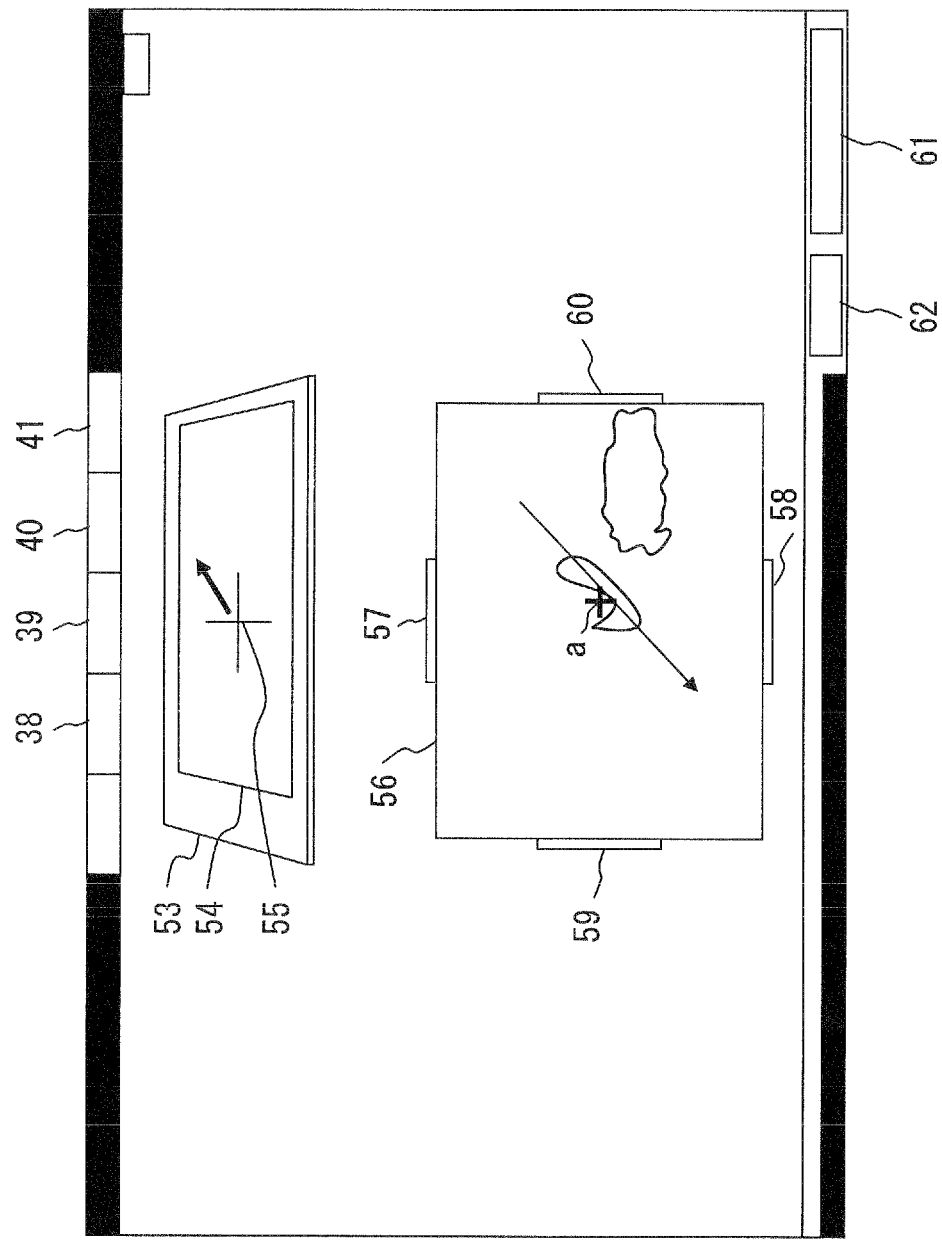
FIG. 12 is the second view of an example of the wizard screen B during the observing operation according to an embodiment of the present invention.

Then, as illustrated in FIG. 12, it is assumed that the point a is located in the central position of the macro image display area 56 and Described as an initial observation starting position. The XY coordinates of the initial observation starting position in this case is defined as (x_a, y_a). Furthermore, as the point a has moved to the center of the macro image display area 56, the rectangular frame 54 moves to a corresponding position in the slide image area 53 of the wizard screen B illustrated in FIG. 12.

When the selection of the initial observation starting position is completed, and when the user presses the button 61, the host system 2 controls the AF operation in the selected initial observation starting position (S207). In the present embodiment, the Z coordinate as the focusing coordinates after the AF operation is defined as (z_a).

Then, the host system 2 records the settings and the operations performed in S201 through S207 as history data in the operation history record unit 4 (S208).

In the present embodiment, the above-mentioned XY coordinates (x_a, y_a) and the Z coordinate (z_a) are recorded as history data in the operation history record unit 4. Then, the wizard screen B displayed on the monitor 5 is switched to the wizard screen C (FIG. 5). Thus, the process starts according to the flowchart in FIG. 9 about the wizard screen C as the sample search menu screen.

In FIG. 9, when control is passed to the wizard screen C, the host system 2 first issues an instruction to the microscope controller 31. If the available objective 23 is not a 4× lens, it is to be switched to a 4× lens (S301).

Then, the host system 2 reads the selected speculum method from the operation history record unit 4 (S302), and the current speculum method is switched to the read speculum method (S303).

In the present embodiment, since the operation history record unit 4 records the fluorescent observation selected as a speculum method, the fluorescent observation is read as a selected speculum method. When it is read, the fluorescent cube A is read as a selected cube. Then, the current speculum method and cube are switched to the read fluorescent observation and fluorescent cube A respectively. Thus, the setting of the microscope apparatus 1 depending on the current speculum method is switched to the setting of the microscope apparatus 1 depending on the fluorescent observation using the fluorescent cube A.

When the switching of the speculum method is completed, the host system 2 shoots the sample 19 by the video camera 3 in real time in the switched speculum method, and starts displaying the macro image as a live image in the macro live image area 63.

Figure 13:
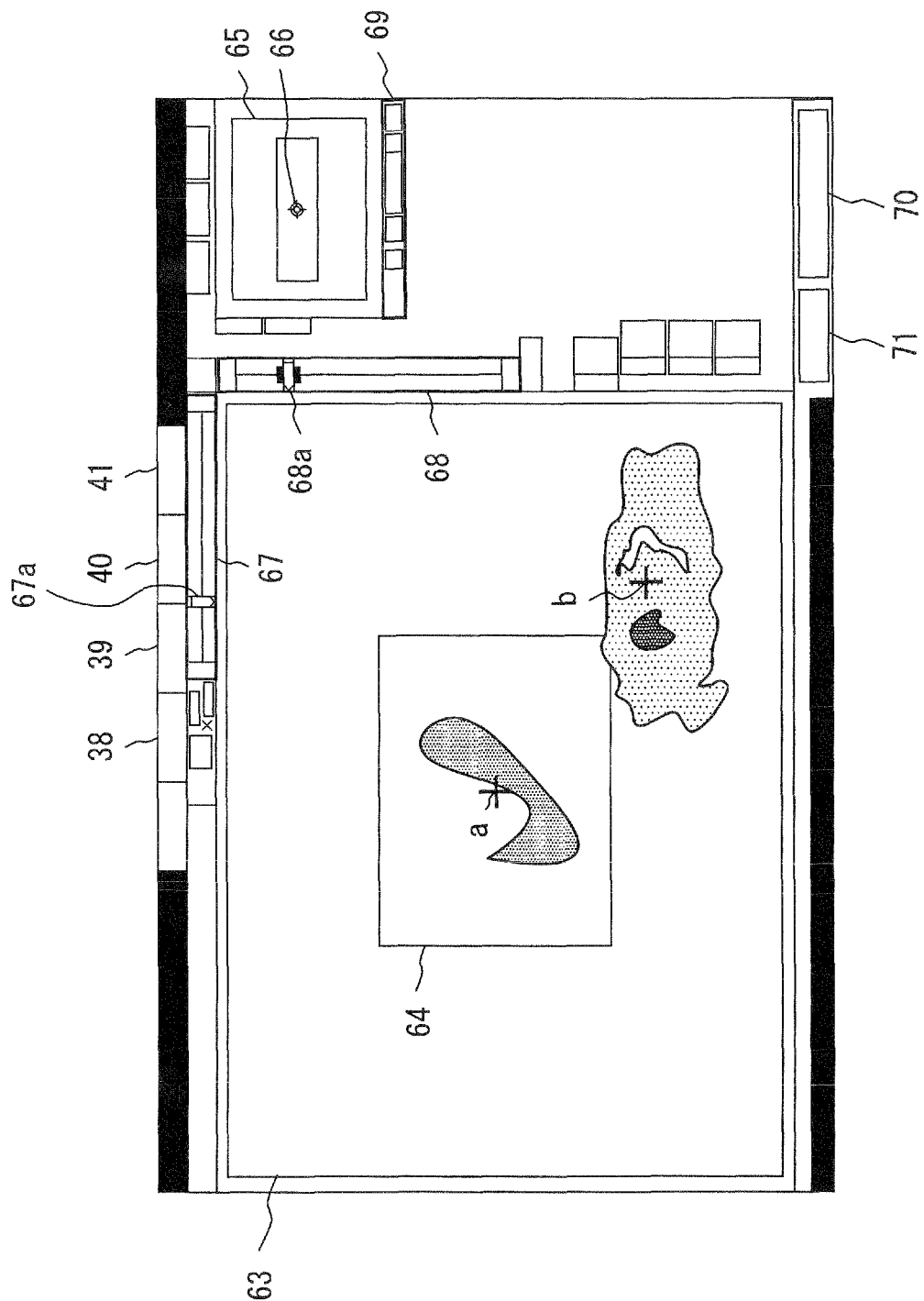
FIG. 13 is the first view of an example of the wizard screen C during the observing operation according to an embodiment of the present invention.

In the present embodiment, since control is switched to the fluorescent observation using the fluorescent cube A, the host system 2 shoots the sample 19 by the video camera 3 in real time in the fluorescent observation using the fluorescent cube A, and starts displaying the macro image as a live image in the macro live image area 63. FIG. 13 is an example of the wizard screen C in this case.

Then, when the user operates (drag and drop using a mouse) the range specification frame 64 of the macro live image area 63, the host system 2 moves the range specification frame 64. Otherwise, when the user scrolls a macro image by the drag and drop using a mouse in the macro live image area 63, the host system 2 moves the motor-operated stage 20 (S304). Thus, the observation target (shooting target) is determined (S305). Thus, the user can retrieve an observation target, and set a desired range at the range specification frame 64, thereby determining the range as an observation target.

Figure 14:
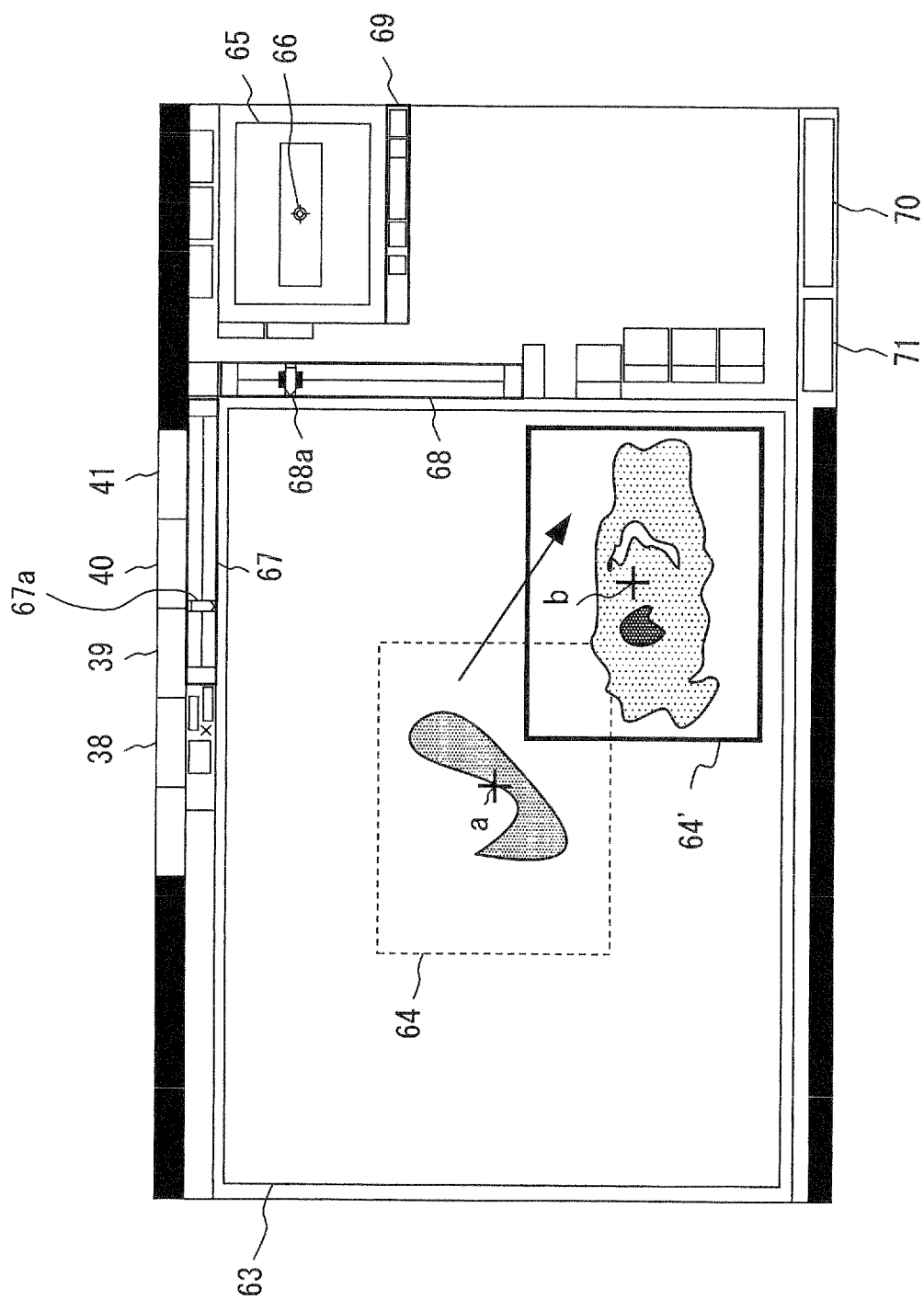
FIG. 14 is the second view of an example of the wizard screen C during the observing operation according to an embodiment of the present invention.

In the present embodiment, the point b of the macro image displayed in the macro live image area 63 on the wizard screen C illustrated in FIG. 13 is determined as an observation target. In this case, the range specification frame 64 is operated so that the point b can be the central position of the range specification frame 64. Then, as illustrated in FIG. 14, the point b is the central position of the range specification frame 64, and determined as an observation target. In FIG. 14, a frame 64' indicates the range specification frame 64 after the movement.

Then, the host system 2 determines the observation target determined in S305 as a position of the shooting target. Simultaneously, when the user operates the slider 67a of the range specification frame switch area 67, the host system 2 changes the size of the range specification frame 64, and determines the shooting magnification (magnification of the objective) (S306).

In the present embodiment, the point b in the range specification frame 64' illustrated in FIG. 14 is determined as a position of the shooting target. Simultaneously, when the user operates the slider 67a, it is assumed that an objective of the shooting magnification of 20× is determined. The XY coordinates of the point b is defined as (x_b, y_b).

Next, when the user presses the button 70, the host system 2 shoots the range displayed in the macro live image area 63. The host system 2 stores the macro image obtained by the shooting operation and the settings and operations in S301 through S306 as history data in the operation history record unit 4 (S307).

In the present embodiment, the macro image obtained by shooting the range displayed in the macro live image area 63 is defined as a macro image (pic_m_b). Then, the operation history record unit 4 stores the macro image (pic_m_b), the XY coordinates (x_b, y_b) of the point b as the coordinates of the position of the shooting target, the shooting magnification (20×) depending on the size of the range specification frame 64 after the change, etc. as history data. Then, the wizard screen C displayed on the monitor 5 is switched to the wizard screen D (FIG. 6). Thus, the process according to the flowchart in FIG. 10 relating to the wizard screen D as a shooting menu screen is started.

In FIG. 10, when control is passed to the wizard screen D, the host system 2 first reads the determined coordinates of the position of the shooting target and shooting magnification from the operation history record unit 4 (S401). The host system 2 switches from the objective 23 to that corresponding to the read shooting magnification (S402). Furthermore, the host system 2 moves the motor-operated stage 20 to the coordinates of the read position of the shooting target (S403).

In the present embodiment, since the coordinates (x_b, y_b) of the position of the shooting target and the shooting magnification (20×) are stored in the operation history record unit 4, the objective 23 is switched to a 20× lens, and the motor-operated stage 20 moves to the coordinates (x_b, y_b) of the position of the shooting target.

Then, the host system 2 shoots the position of the shooting target of the sample 19 by the video camera 3 in real time using the switched objective 23, and starts displaying the live image in the image display area 72. Immediately before transfer to the wizard screen D, the macro image stored in the operation history record unit 4 is read by the host system 2, and the macro image is displayed in the stage control map area 77.

Figure 15:
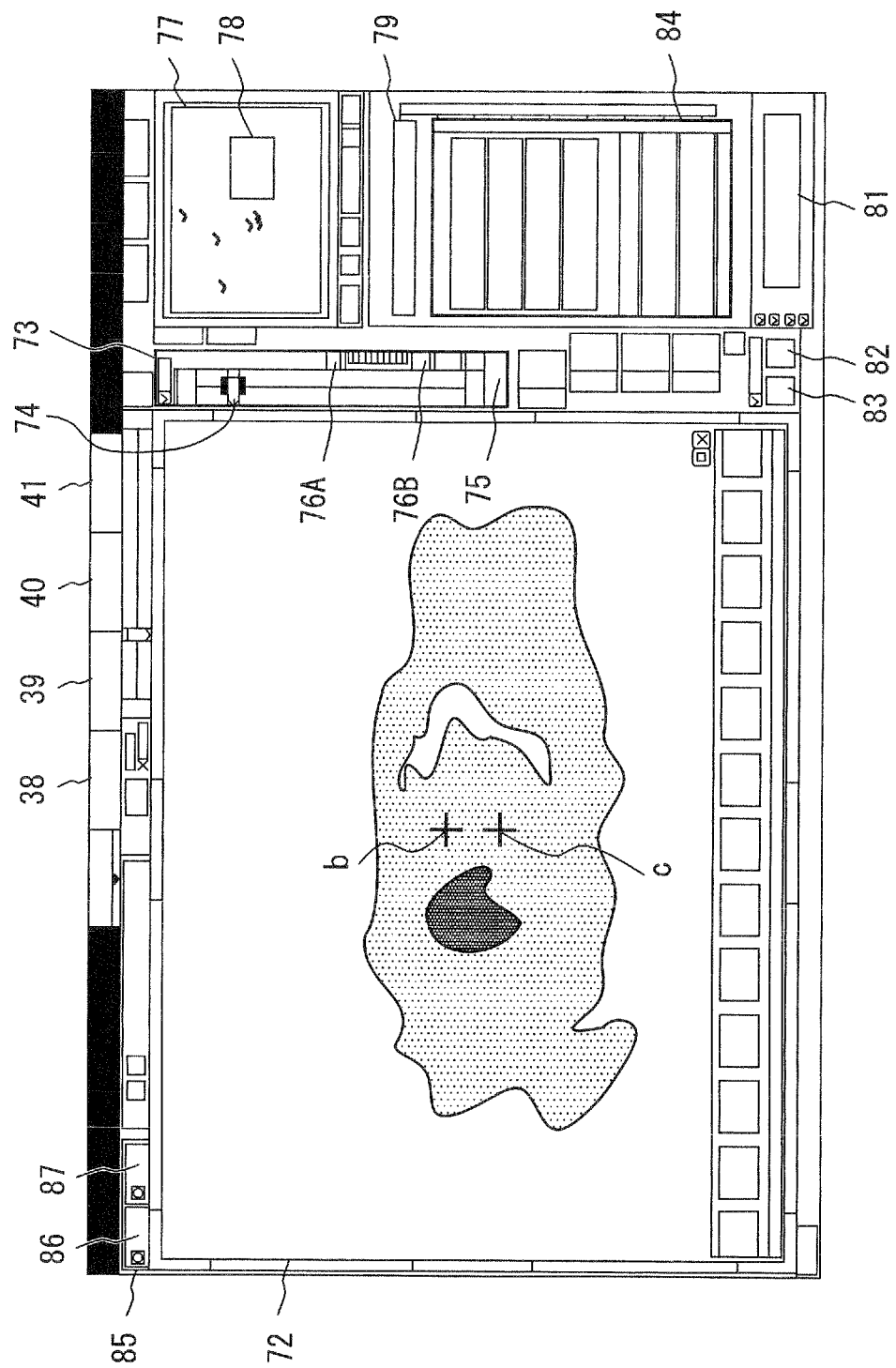
FIG. 15 is the first view of an example of the wizard screen D during the observing operation according to an embodiment of the present invention.

In the present embodiment, the point b as a position of the shooting target is shot by the video camera 3 in real time using the switched 20× objective (20× objective determined depending on the size of the range specification frame 64'), and display of the live image in the image display area 72 is started. In addition, immediately before the transfer to the wizard screen D, the macro image (pic_m_b) stored in the operation history record unit 4 is read. The macro image (pic_m_b) is displayed on the stage control map area 77. FIG. 15 is an example of the wizard screen D in this case.

As illustrated on the wizard screen D in FIG. 15, the point b as a position of the shooting target is displayed in the center of the image display area 72. Furthermore, the macro image (pic_m_b) is displayed in the stage control map area 77.

Then, when the user specifies the position in the image display area 72, the host system 2 moves the motor-operated stage 20 so that the specified position can be the central position of the image display area 72 (S404). Thus, the user can finely adjust the position of the shooting target (range of the shooting).

In the present embodiment, the point c in the live image displayed in the image display area 72 of the wizard screen D illustrated in FIG. 15 is defined as a position of the shooting target. When the user specifies the point c, the host system 2 moves the motor-operated stage 20 so that the point c can be the central position of the image display area 72.

Figure 16:
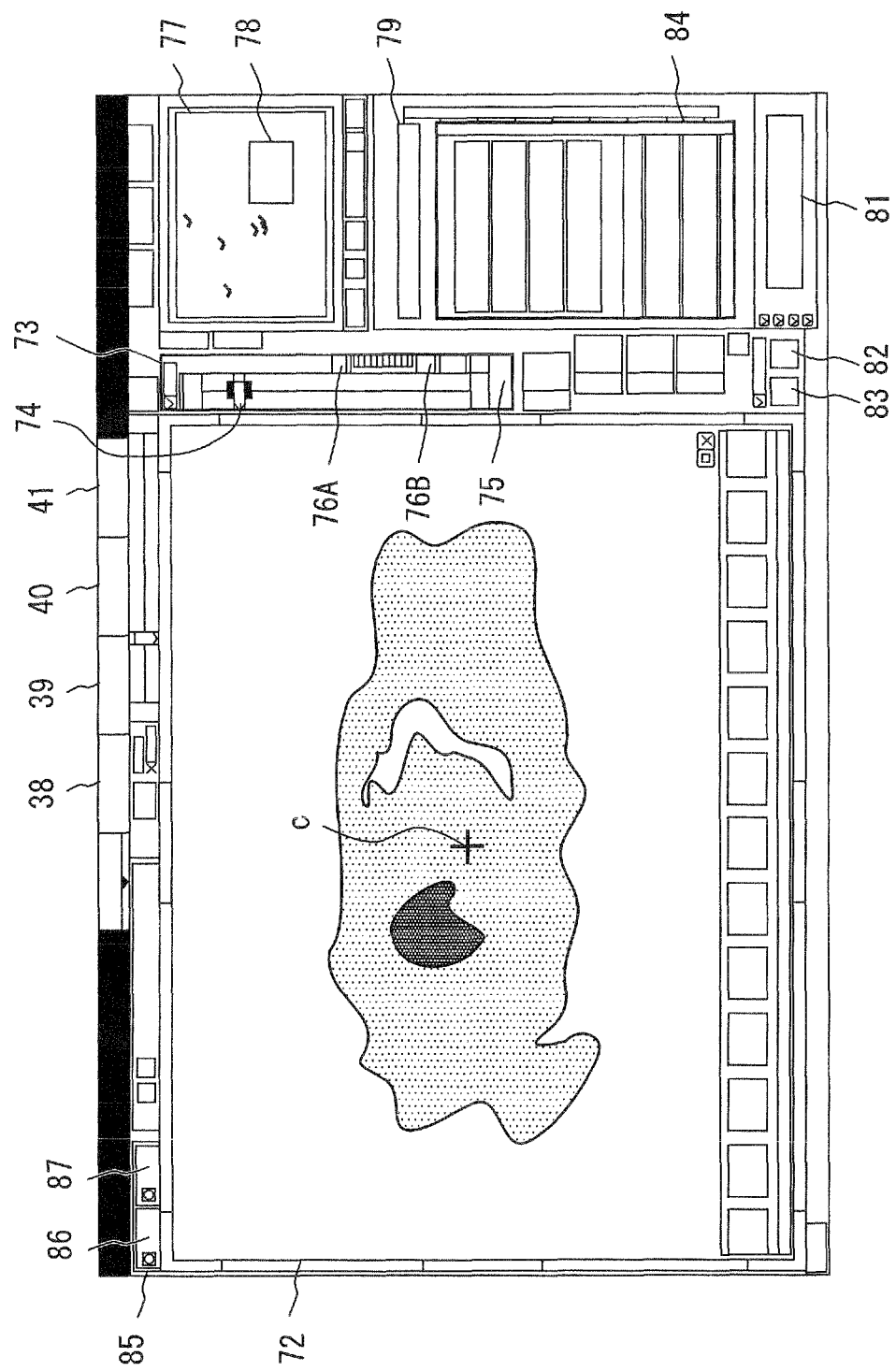
FIG. 16 is the second view of an example of the wizard screen D during the observing operation according to an embodiment of the present invention.

As illustrated in FIG. 16, it is assumed that the point c is the central position and the position of the shooting target. In this case, the point c moves to the center of the image display area 72, and the rectangular frame 78 moves to the position corresponding to the point C in the stage control map area 77. The XY coordinates of the position of the point c is defined as (x_c, y_c).

Then, when the user presses the AF button 75 (for example, by mouse clicking) in the focus and correction ring area 73, the host system 2 controls the AF operation (focusing operation) (S405).

After the AF operation, when the user moves the motor-operated stage 20 to the optical axis direction (Z-axis direction) depending on the operation of the slide bar 74 in the focus and correction ring area 73, the focusing operation can be changed. Thus, the user can also perform a fine adjustment of the focusing operation. The AF operation itself performed in S405 can also be manually performed by the operation of the slide bar 74. The Z coordinate of the focusing position is defined as (z_c).

Then, the host system 2 determines whether or not the correction ring data (correction ring position) corresponding to the current sample 19 is recorded in the operation history record unit 4 (S406).

When the determination result in S406 is NO, the host system 2 performs the process of adjusting and determining the correction ring position (S407). In the process, when the user presses the correction ring adjustment buttons 76A and 76B in the focus and correction ring area 73, the host system 2 drive-controls the correction ring of the objective 23 being used. Thus, the user presses the correction ring adjustment buttons 76A and 76B while confirming the live image displayed in the image display area 72, thereby adjusting the optimum correction ring position. Thus, the aberration correction can be performed on the thickness of the cover glass.

Then, when the user performs a predetermined operation on the wizard screen D, the host system 2 records the current correction ring position as the correction ring position (correction ring data) after the adjustment (after the correction) in the operation history record unit 4. Thus, the user can record the correction ring position after the adjustment in the operation history record unit 4. In the present embodiment, it is assumed that the correction ring position (h_1) is recorded as correction ring data in the operation history record unit 4.

On the other hand, if the determination result in S406 is YES, the host system 2 reads the correction ring data stored in the operation history record unit 4, and drives the correction ring to the position corresponding to the correction ring data (S408). Thus, the correction ring is driven to the optimum position, and the aberration of the thickness of the cover glass can be corrected. For example, if the above-mentioned correction ring position (h_1) as correction ring data is stored in the operation history record unit 4, the correction ring is driven to the correction ring position (h_1) depending on the correction ring data.

In the processes in S406 through S408, according to the flowchart, the process in S407 is performed once on one sample. After the process in S407 is once performed, the process in S407 is not performed until the sample is replaced with another sample, and the process in S408 is performed instead.

When the process in S407 or S408 is completed, the host system 2 determines whether or not the user has pressed the button 79 (S409). The determination is made to determine whether or not the shooting condition used in the past shooting operation is to be used in setting the shooting condition of the video camera 3.

Figure 17:
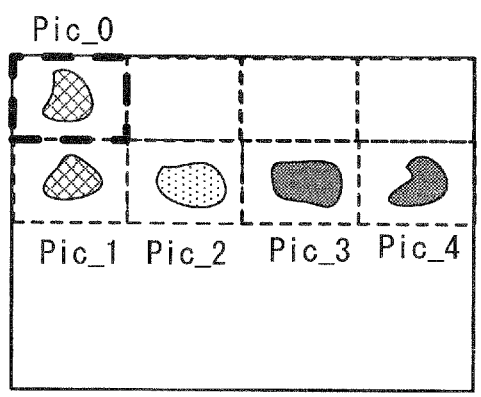
FIG. 17 is an example of a window according to an embodiment of the present invention.

When the determination result in S409 is YES, the host system 2 retrieves an image (except a macro image) shot by the video camera 3 in the past under the same or similar observation condition as the current observation conditions (speculum method, cube being used, magnification of objective (shooting magnification), shot image size, etc.), and recorded in the operation history record unit 4. Then, the host system 2 lists the corresponding image in a window displayed separate from the wizard screen D (S410). FIG. 17 is an example of the window in this case.

In the example of the window illustrated in FIG. 17, in addition to the four images (pic_1~pic_4) in higher order in similarity, lately shot images (excluding a macro image) (pic_0) shot lately are also displayed. In FIG. 17, symbols pic_0~pic_4 are indicated for convenience in explanation, and is not practically displayed.

Next, when the user performs an image selecting operation (for example, by mouse clicking), one image in a window is selected. The host system 2 sets the shooting conditions when the selected image is shot, and the shooting conditions are displayed on the menu 84 (S411). Thus, the user selects a desired image in the window, and can easily regenerate the shooting conditions used when the image was shot.

For example, a bold broken line frame (refer to the image of pic_0) is provided as illustrated in FIG. 17 for the image selected in a window, and is displayed as distinguishable from an unselected image. The window is cleared when the wizard screen D is switched to another wizard screen.

According to the flowchart, a reproducible shooting condition is each shooting condition of exposure, dimmer (including a ND filter), W/B (white balance), and B/B (black balance), and the XY coordinates and the Z coordinate of the motor-operated stage 20 during shooting are not reproduced. In the reproducible shooting conditions, it is also selected whether or not each shooting condition can be reproduced.

The selection can be, for example, performed from the window in which images are listed. In this case, when a user selects a desired image from among the listed windows, the shooting conditions under which the image was shot are also displayed in the window. Thus, reproducible and non-reproducible shooting conditions can be selected by a user.

In the present embodiment, in the example of the window in FIG. 17, it is assumed that the user selects an image (pic_2), and the exposure (ae_2), the dimmer (1_2), the W/B (wb_2), and the B/B (bb_2) have been set as shooting conditions and reproduced.

On the other hand, when the determination result is NO in S409, the host system 2 sets the shooting conditions used during the latest shooting operation (excluding the shooting condition used while shooting a macro image), and the shooting conditions are displayed on in the menu 84. The settings and display of the shooting conditions in this case can also be performed immediately after switching to the wizard screen D.

When the shooting conditions are thus set, the user performs an operation (for example, by mouse-clicking) to change the shooting conditions for the menu 84, and the host system 2 changes the set shooting conditions (S412). Thus, the user can perform a fine adjustment of the set shooting conditions. In addition, it is quite natural that the user can manually set the shooting conditions.

When the user presses the shot button 81, the host system 2 shoots the live image displayed in the image display area 72 (S413). In the present embodiment, the shooting conditions in this case (shooting conditions used when the point c is shot) are the exposure (ae_c), the dimmer (1_c), the W/B (wb_c), and the B/B (bb_c), and the shot image is (pic_c). When the live image is shot, the shot image is displayed as a pause image in the image display area 72.

Next, the host system 2 records the settings and operations performed in S401 through S413 as history data in the operation history record unit 4 (S414). In the present embodiment, the above-mentioned XY coordinates (x_c, y_c) and the Z coordinate (z_c) as the current XY coordinates and Z coordinate, and the exposure (ae_c), the dimmer (1_c), the W/B (wb_c), the B/B (bb_c), the shot image (pic_c), etc. as the shooting conditions used when the point c is shot in S413 are recorded in the operation history record unit 4. In S414, the user can press the button 86 to switch from the pause image displayed in the image display area 72 to the live image.

Described above are a series of operations of observing a sample on the wizard screen. However, each wizard screen can be switch to another wizard screen as necessary as described above. In this case, when the button 38 is pressed, control can be passed to the wizard screen A to resume the process flow illustrated in FIG. 7. In addition, by pressing the button 39, control can be passed to the wizard screen B to resume the process flow illustrated in FIG. 8. Control can also be passed to the wizard screen C to resume the process flow illustrated in FIG. 9 by pressing the button 40 or 82. Control can also be passed to the wizard screen D to resume the process flow illustrated in FIG. 10 by pressing the button 41.

Thus, for example, after the process in S414 is completed, the user can press the button 82 to continuously search an observation target as another shooting point. In this case, when the user presses the button 82 to switch from the wizard screen D displayed on the monitor 5 to the wizard screen C. Then, the available objective 23 is changed from a 20× lens to a 4× lens. Then, a macro image (live image) by the 4× objective is displayed in the macro live image area 63.

The XY coordinates and the Z coordinate in this case are taken over from the XY coordinates and the Z coordinate immediately before switching from the wizard screen D to the wizard screen C as illustrated in the flowchart (FIG. 9) relating to the wizard screen C.

Figure 18:
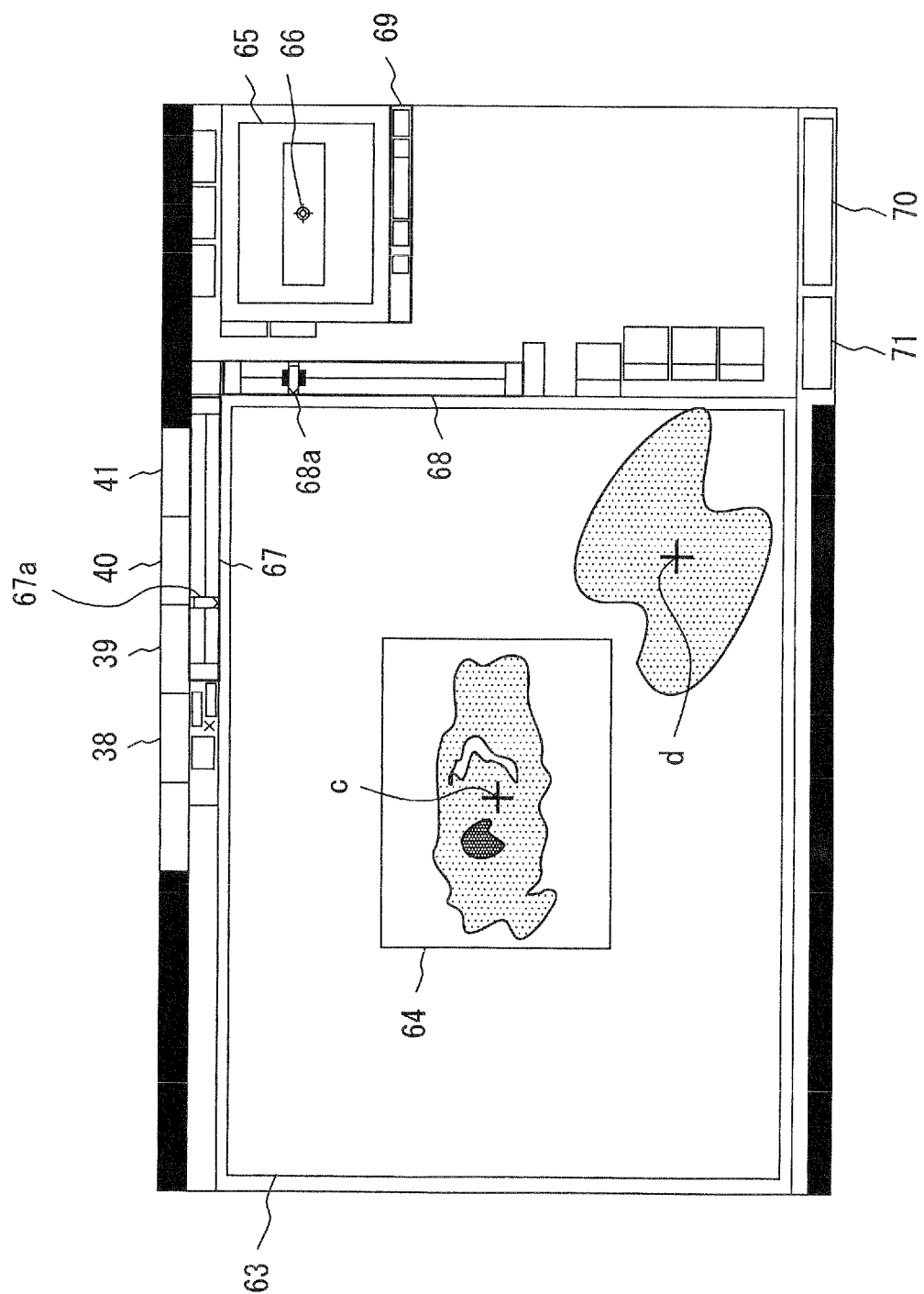
FIG. 18 is the third view of an example of the wizard screen C during the observing operation according to an embodiment of the present invention.

Therefore, in the present embodiment, the XY coordinates and the Z coordinate are taken over from the XY coordinates (x_c, y_c) and the Z coordinate (z_c) immediately before the switch to the wizard screen C. FIG. 18 is an example of the wizard screen C.

By the user operating on the wizard screen C illustrated in FIG. 18, the point d displayed in the macro live image area 63 is determined as a new observation target, the shooting magnification of 20× is determined, and the screen is switched to the wizard screen D.

Figure 19:
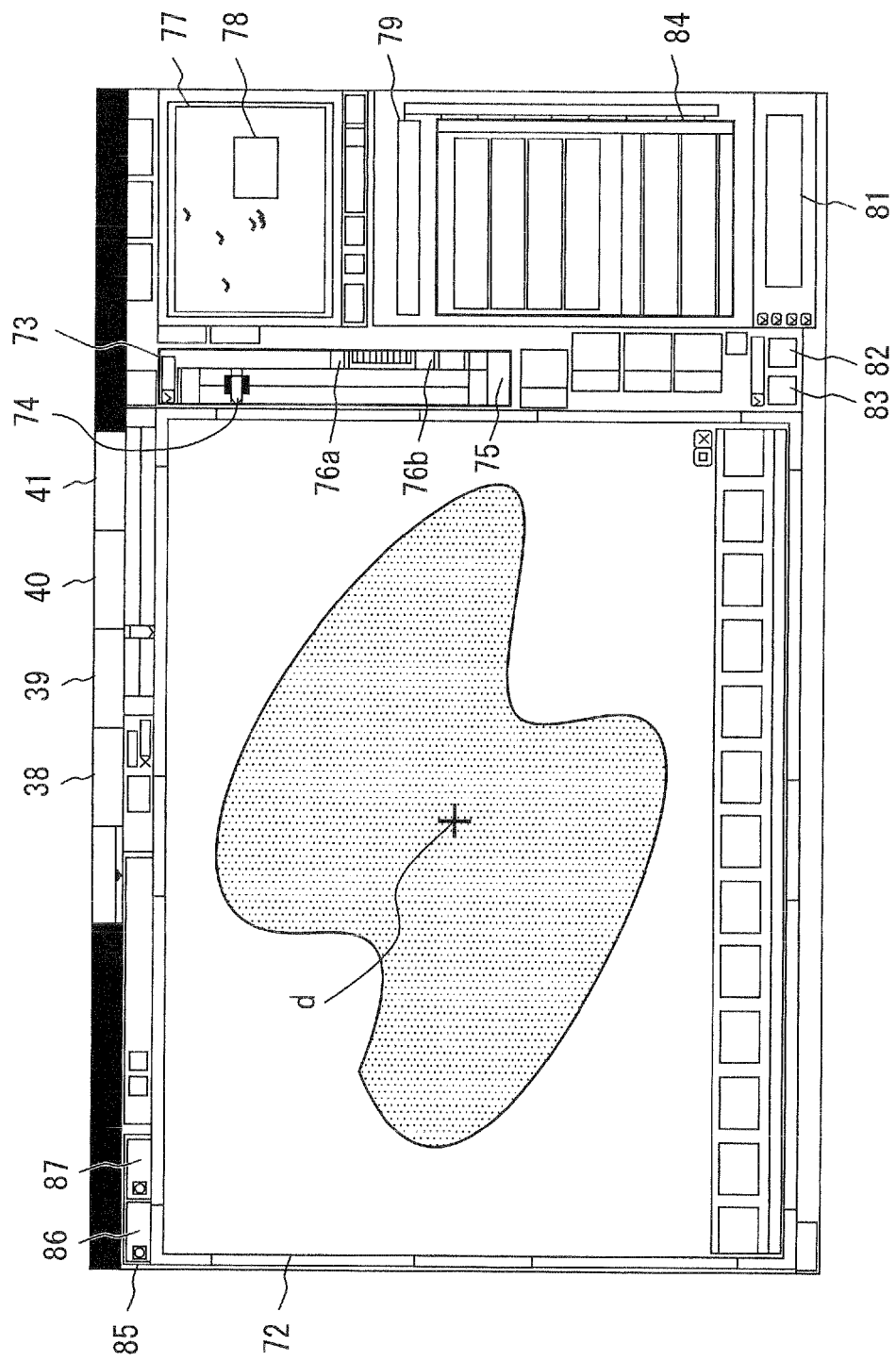
FIG. 19 is the third view of an example of the wizard screen P during the observing operation according to an embodiment of the present invention.

Then, the live image at the point d by the 20× objective is displayed in the image display area 72 on the wizard screen D. FIG. 19 is an example of the wizard screen D in this case.

The user can set again as a shooting condition the shooting condition used when the latest shooting operation was performed. The shooting condition used when the past shooting operation was performed can be set by pressing the button 79. The user can finely adjust the shooting condition set as described above on the menu 84.

Described next is the control of the drive unit configuring the microscope system by the wheel operation of the mouse 88.

Figure 20A:
FIG. 20 is an example of a mouse 88 according to the first embodiment of the present invention.
Figure 20B:
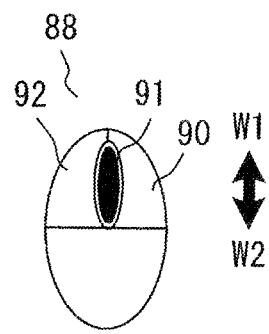

FIG. 20 is an example of the mouse 88. The mouse 88 is a mouse with a wheel, and includes a left button 90, a right button 92, and a wheel 91. The wheel 91 is generally used in scrolling a screen, and rotates in the directions of W1 and W2. The rotation direction and the amount of rotation of the wheel 91 are detected by the host system 2. P indicates an example of the mouse pointer of the mouse 88 displayed on the screen.

The function of controlling the drive unit is assigned to the wheel 91. In this case, the drive unit to be controlled depends on the wizard screen and the area on the wizard screen.

The assignment of the functions on the wizard screen C is described below with reference to the screens illustrated in FIGS. 21 through 34 and the flowchart in FIG. 35.

Figure 21:
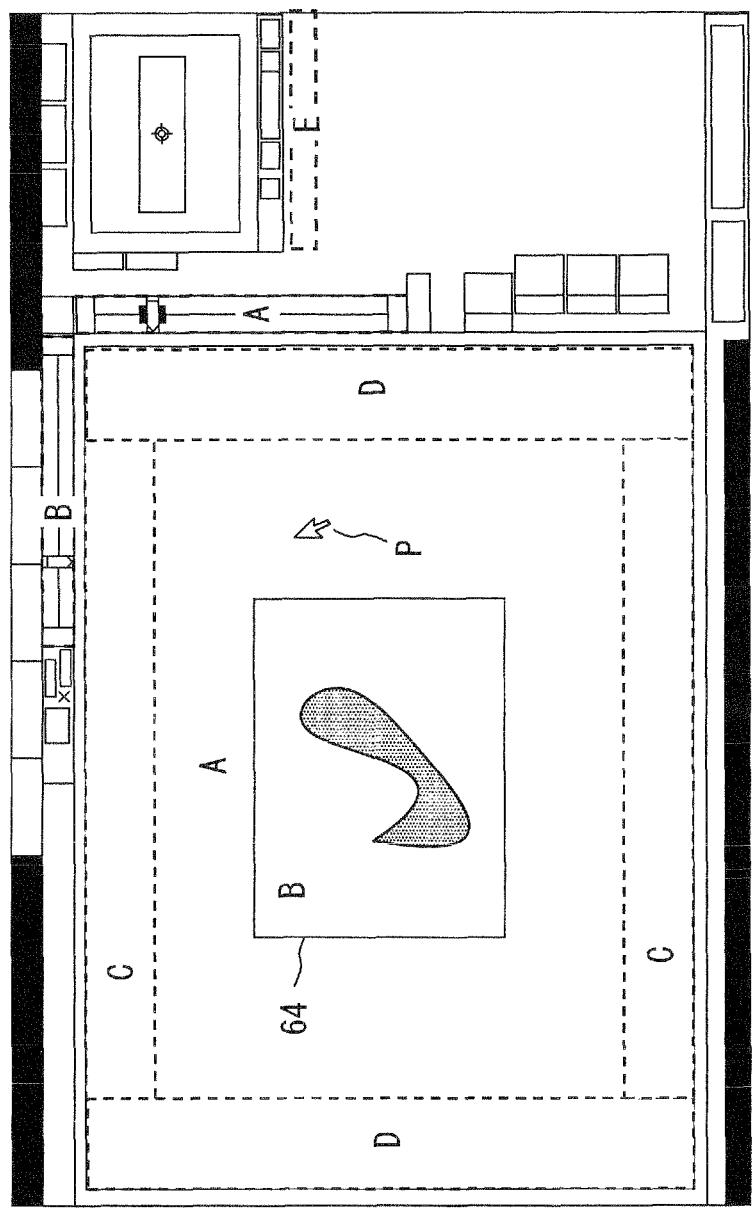
FIG. 21 is an example of a screen when a mouse pointer P is located in a sectional area A of the wizard screen C according to the first embodiment.
Figure 22:
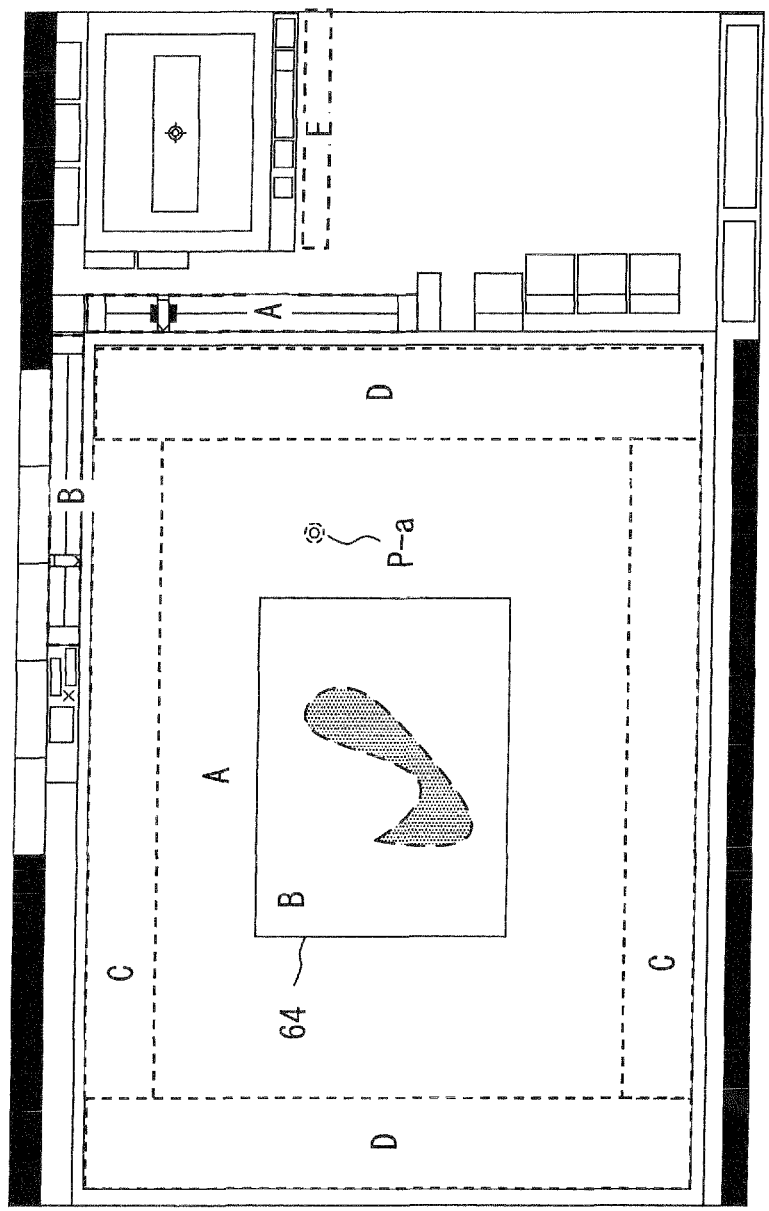
FIG. 22 is an example of a screen when the mouse pointer P is detected in the sectional area A of the wizard screen C, and the mode of the mouse pointer is changed according to the first embodiment.
Figure 35:
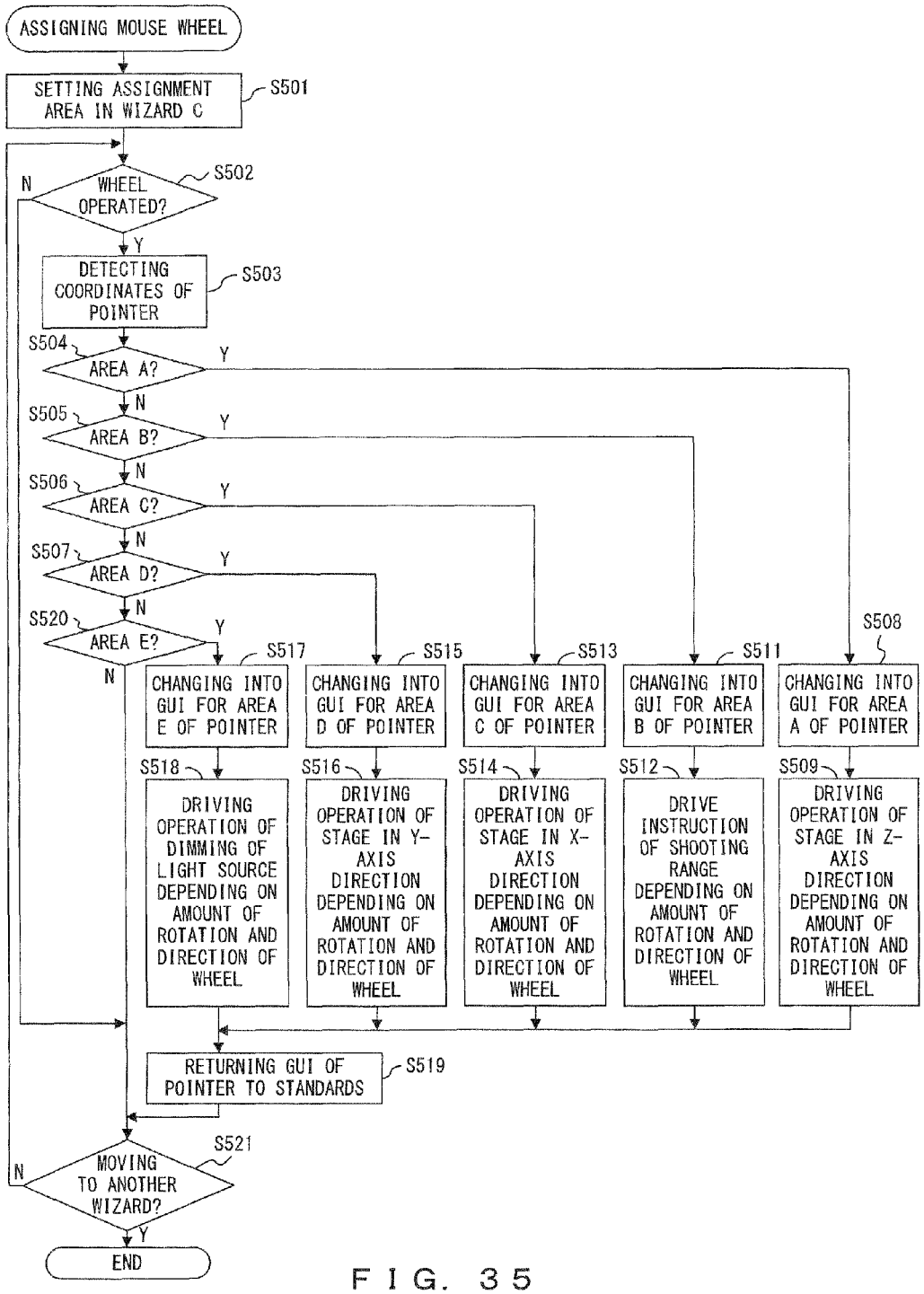
FIG. 35 is a flowchart when the wheel operation of a mouse is performed in each area on the wizard screen C according to the first embodiment.

In the flowchart in FIG. 35, the host system 2 divides the wizard screen C into a plurality of areas, and assigns the function for controlling the drive unit to each area (S501). As illustrated in FIG. 21, the host system 2 divides the operation section by the wheel 91 on the wizard screen C into the operation sections A, B, C, D, and E.

Thus, the following operation can be realized by dividing the wizard screen C into a plurality of areas. That is, when the position of the mouse pointer moves to the respective operation sections and wheel 91 is rotated in the operation section to which the pointer have moved, the drive of the drive unit assigned to the operation section is controlled.

First, the case in which the mouse pointer is located in the sectional area A is described below with reference to FIG. 21. When the wheel 91 is operated (S502), the host system 2 detects the position of the mouse pointer P (S503). When the mouse pointer P is located in the operation area A (S504), the host system 2 makes a change from the mode in which the GUI (graphical user interface) of the mouse pointer is indicated by P into the mode in which it is indicated by P-a in FIG. 22 (S508).

The host system 2 drive-controls the stage Z drive control unit 22 depending on the rotation direction and the amount of rotation of the wheel 91 through the microscope controller 32 to adjust the distance between the objective 23 and the motor-operated stage 20 (S509).

That is, when the wheel 91 is moved in the direction of W2, the host system 2 drive-controls the stage Z drive control unit 22 depending on the amount of rotation of the wheel 91 in the direction of the approach of the sample 19 to the objective 23. When the wheel 91 is moved in the direction of W1, the host system 2 drive-controls the stage Z drive control unit 22 depending on the amount of rotation of the wheel 91 in the direction of the departure of the sample 19 from the objective 23.

The motor-operated stage 20 can be driven at 10 µm per click of the wheel in the Z-axis direction. Since the magnification is fixed on the wizard screen C, the amount of drive is also fixed. In the case of the mouse wheel without clicking, the amount of drive per revolution of wheel can be, for example, 240 µm correspondingly.

When the driving operation of the stage Z drive control unit 22 is completed, the host system 2 returns to the mode in which the GUI of the mouse pointer is indicated by P (S519). Thus, when the mouse pointer is located in the sectional area A, the motor-operated stage 20 can be driven in the Z-axis direction by rotating the wheel 91.

Figure 23:
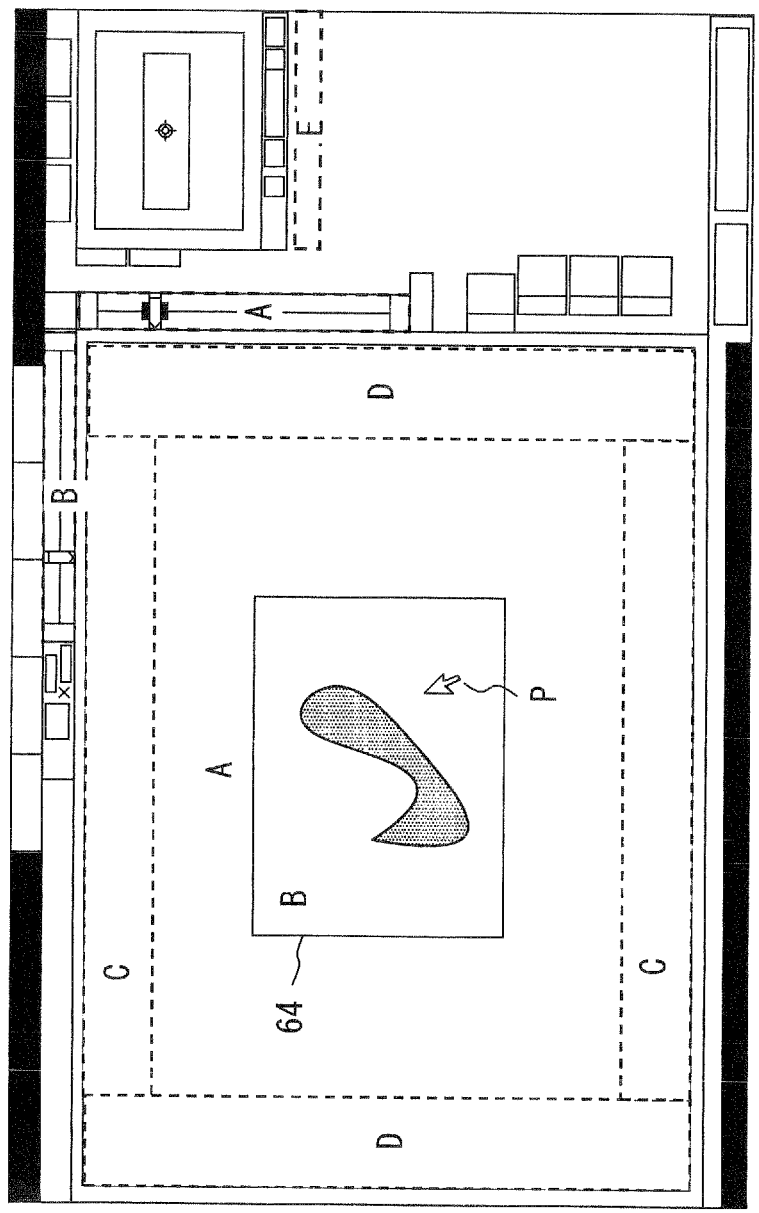
FIG. 23 is an example of a screen when a mouse pointer P is located in a sectional area B of the wizard screen C according to the first embodiment.

Described next is the case in which the mouse pointer is located in the sectional area B as illustrated in FIG. 23. When the wheel 91 is operated (S502), the position of the mouse pointer P is detected (S503). When the mouse pointer P is located in the sectional area B (S505), the host system 2 makes a change from the mode in which the GUI of the mouse pointer is indicated by P into the mode in which it is indicated by P-b in FIG. 24 (S511).

Then, by the mouse operation, the size of the range specification frame 64 indicating the range of the shooting by the video camera 3 on the next wizard screen D is changed depending on the rotation direction and the amount of rotation of the wheel 91. Then, the host system 2 sets the shooting range based on the changed size of the range specification frame 64 (S512).

Figure 24:
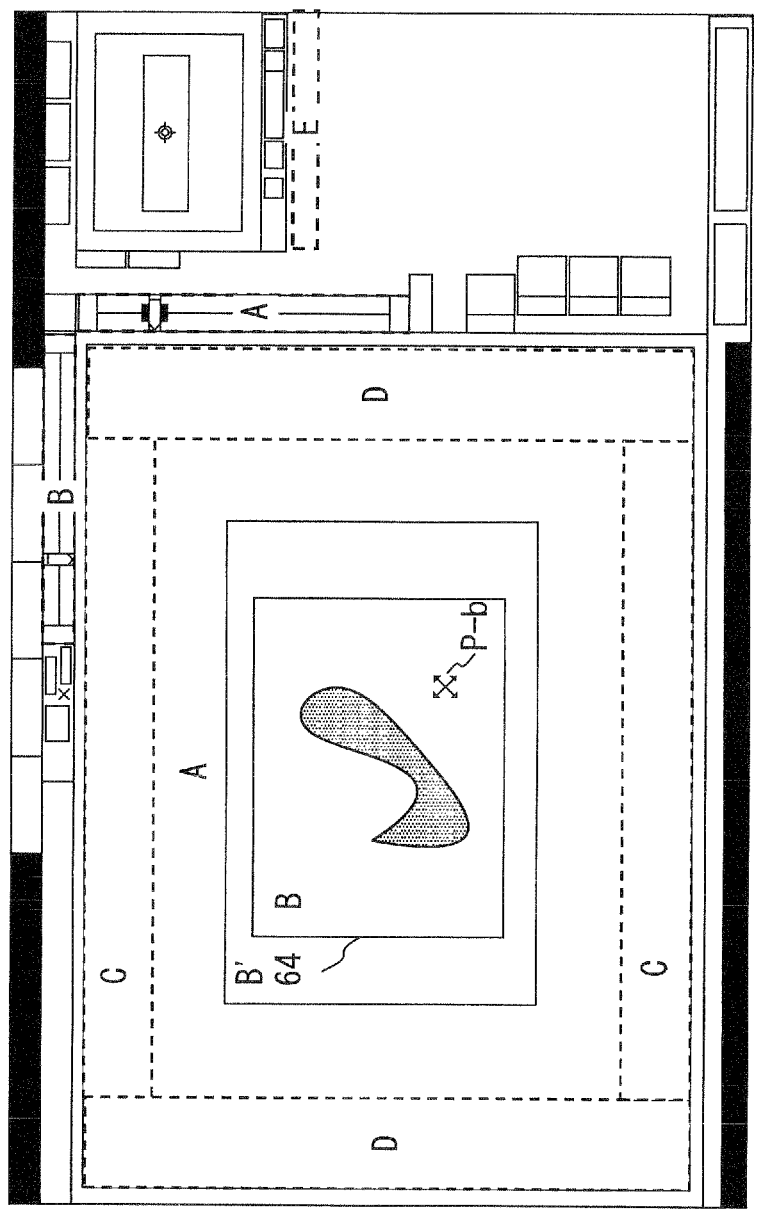
FIG. 24 is an example of a screen (1) when the mouse pointer P is detected in the sectional area B of the wizard screen C, and the mode of the mouse pointer is changed according to the first embodiment.
Figure 25:
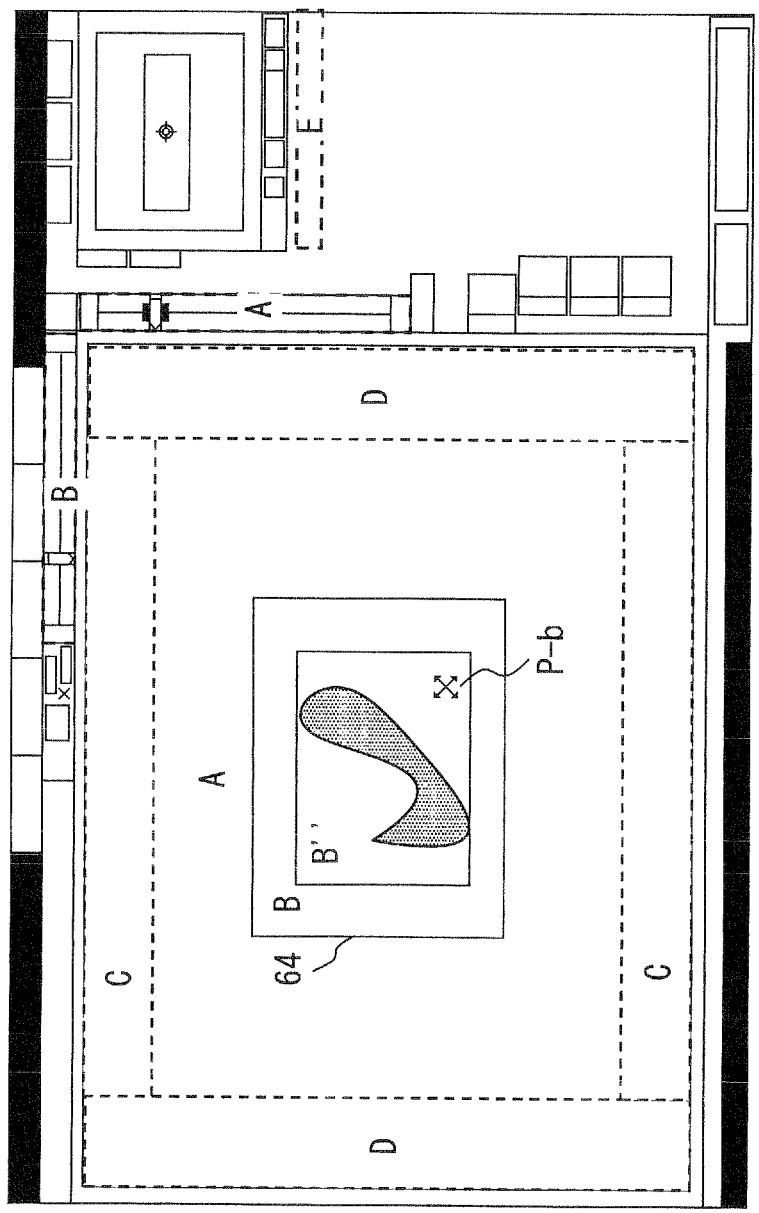
FIG. 25 is an example of a screen (2) when the mouse pointer P is detected in the sectional area B of the wizard screen C, and the mode of the mouse pointer is changed according to the first embodiment.

That is, when the wheel 91 is moved in the direction of W1, the host system 2 changes the size of the range specification frame 64 enclosing the shooting range depending on the amount of rotation of the wheel 91 in the direction in which the shooting range increases from B to B' (in the direction of lower shooting magnification) as illustrated in FIG. 24. When the wheel 91 is moved in the direction of W2, the host system 2 changes the size of the range specification frame 64 enclosing the shooting range depending on the amount of rotation of the wheel 91 in the direction in which the shooting range decreases from B to B' (in the direction of higher shooting magnification) as illustrated in FIG. 25.

When the mouse pointer moves outside the sectional area B, the host system 2 returns to the mode in which the GUI of the mouse pointer is indicated by P (S519). When control is passed to the wizard screen D after the change of the shooting range by the wheel operation, the range specified by the range specification frame 64 can be shot. Therefore, when the pointer is located in the sectional area B, the shooting range on the next wizard screen D can be set by rotating the wheel 91

Figure 26:
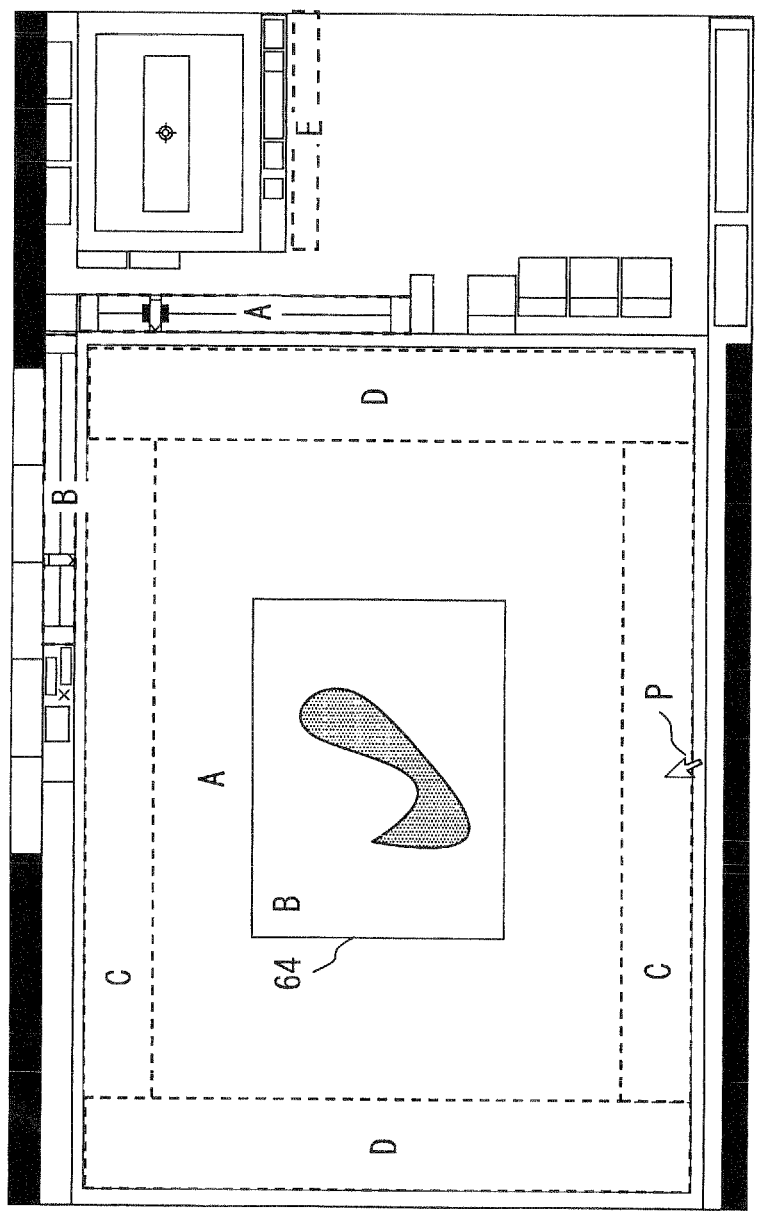
FIG. 26 is an example of a screen when a mouse pointer P is located in a sectional area C of the wizard screen C according to the first embodiment.

Described next is the case in which the mouse pointer P is located in the sectional area C as illustrated in FIG. 26. When the wheel 91 is operated (S502), and the mouse pointer P is located in the operation area C (S506), the host system 2 makes a change from the mode in which the GUI of the mouse pointer is indicated by P to the mode in which it is indicated by P-c in FIG. 27 (S513).

Then, the host system 2 drive-controls the stage X-Y drive control unit 21 in the X-axis direction depending on the rotation direction and the amount of rotation of the wheel 91 through the microscope controller 32 (S514).

Figure 27:
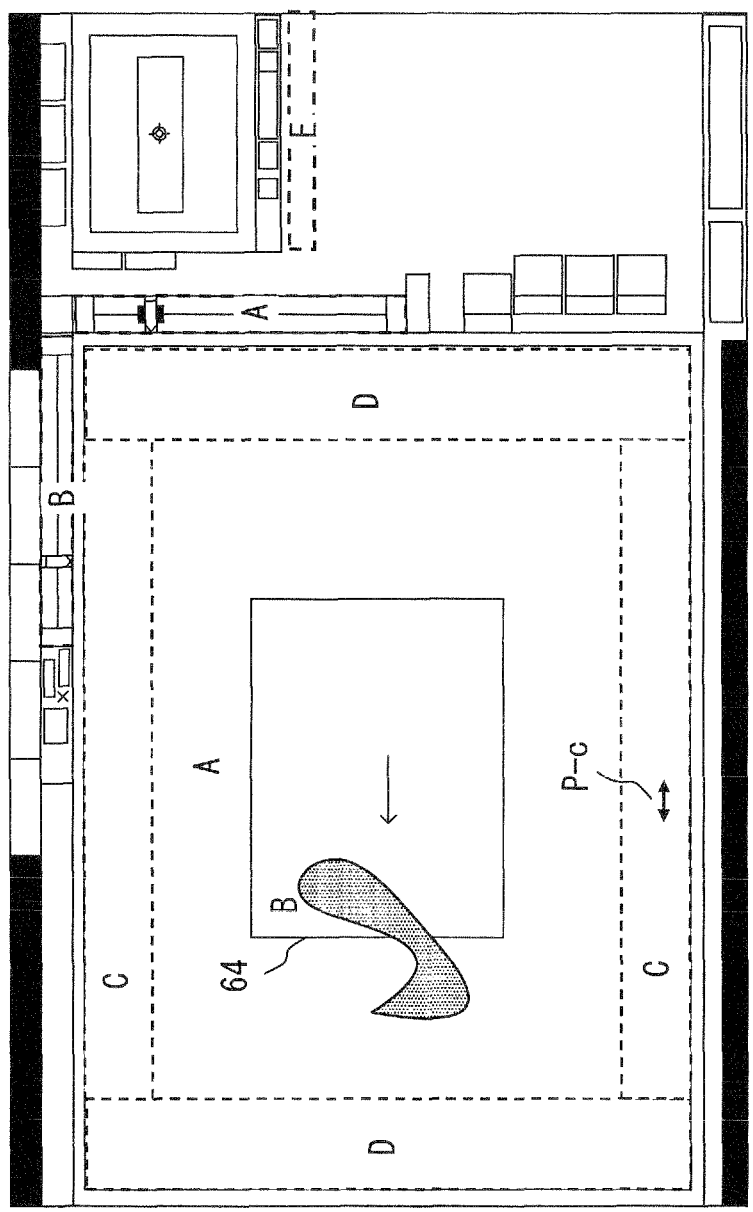
FIG. 27 is an example of a screen (1) when the mouse pointer P is detected in the sectional area C of the wizard screen C, and the mode of the mouse pointer is changed according to the first embodiment.
Figure 28:
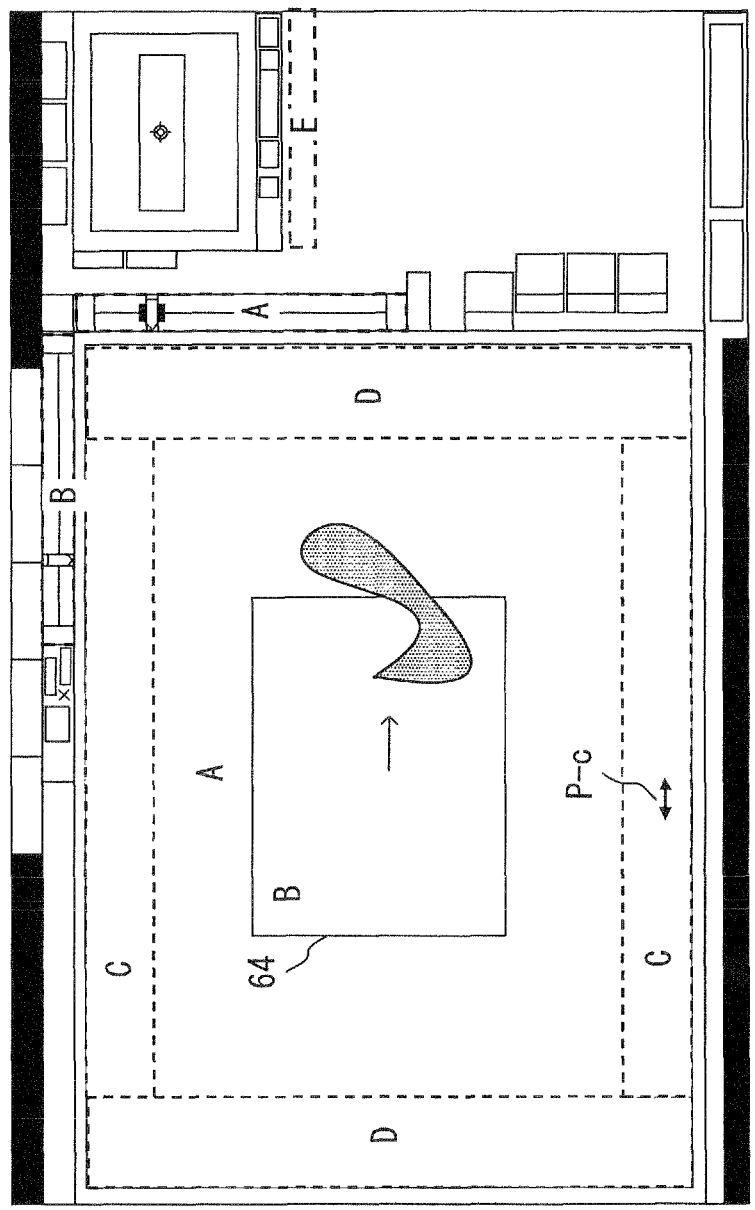
FIG. 28 is an example of a screen (2) when the mouse pointer P is detected in the sectional area C of the wizard screen C, and the mode of the mouse pointer is changed according to the first embodiment.

That is, when the wheel 91 is moved in the direction of W1, the sample 19 is moved in the X-axis direction indicated by the leftward arrow in FIG. 27. Therefore, the host system 2 drive-controls the stage X-Y drive control unit 21 depending on the amount of rotation of the wheel 91. When the wheel 91 is moved in the direction of W2, the sample 19 is moved in the X-axis direction indicated by the rightward arrow in FIG. 28. Therefore, the host system 2 drive-controls the stage X-Y drive control unit 21 depending on the amount of rotation of the wheel 91.

The amount of drive of the motor-operated stage 20 corresponds to the amount of movement corresponding to the ¼ screen in the direction of the display area per click of mouse wheel. In the case of the mouse wheel without clicking, the amount of drive can correspond to, for example, 5 screens per rotation of mouse wheel.

When the driving operation of the motor-operated stage 20 is completed, the host system 2 returns to the mode in which the GUI of the mouse pointer is indicated by P again (S519). Therefore, when the mouse pointer is located in the sectional area C, the motor-operated stage 20 can be driven in the X-axis direction by rotating the wheel 91.

Figure 29:
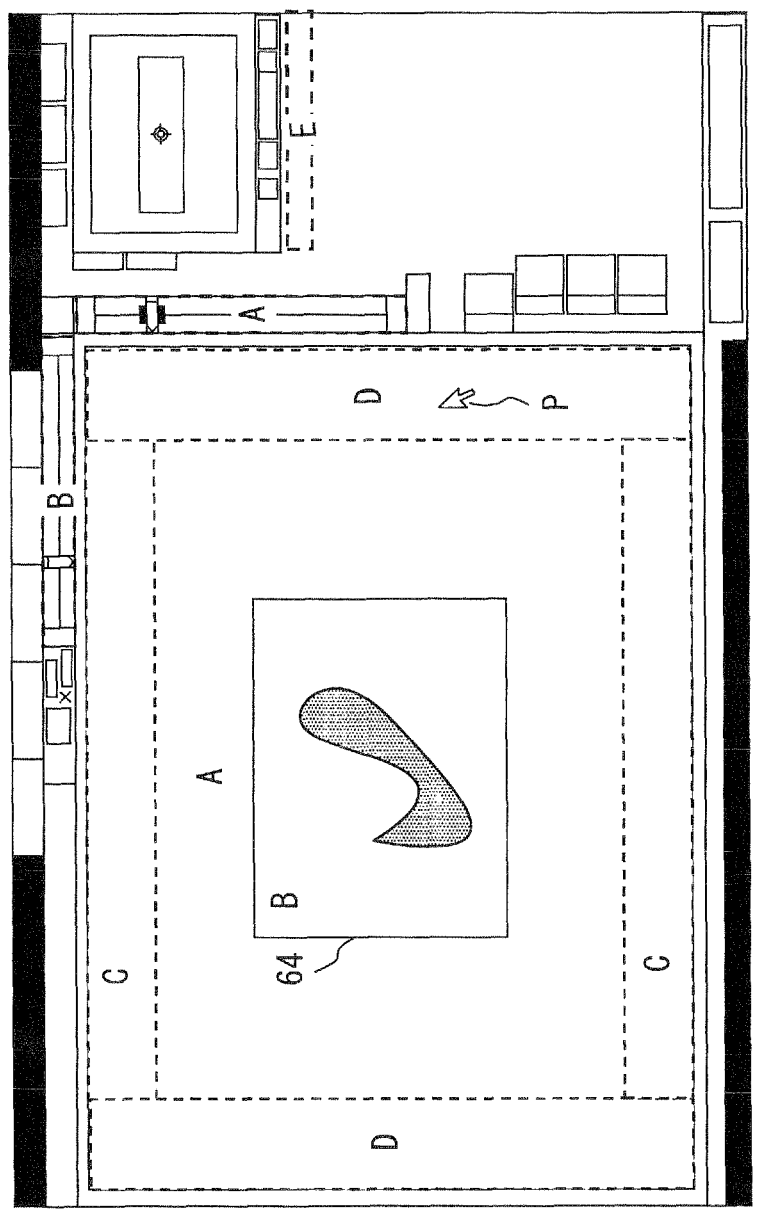
FIG. 29 is an example of a screen when a mouse pointer P is located in a sectional area D of the wizard screen C according to the first embodiment.

Described next is the case in which the mouse pointer is located in the sectional area D as illustrated in FIG. 29. When the wheel 91 is operated (S502), and the mouse pointer P is located in the operation area D (S507), the host system 2 makes a change from the mode in which the GUI of the mouse pointer is indicated by P to the mode in which it is indicated by P-d in FIG. 30 (S515).

Then, the host system 2 drive-controls the stage X-Y drive control unit 21 in the Y-axis direction depending on the rotation direction and the amount of rotation of the wheel 91 through the microscope controller 32 (S516).

Figure 30:
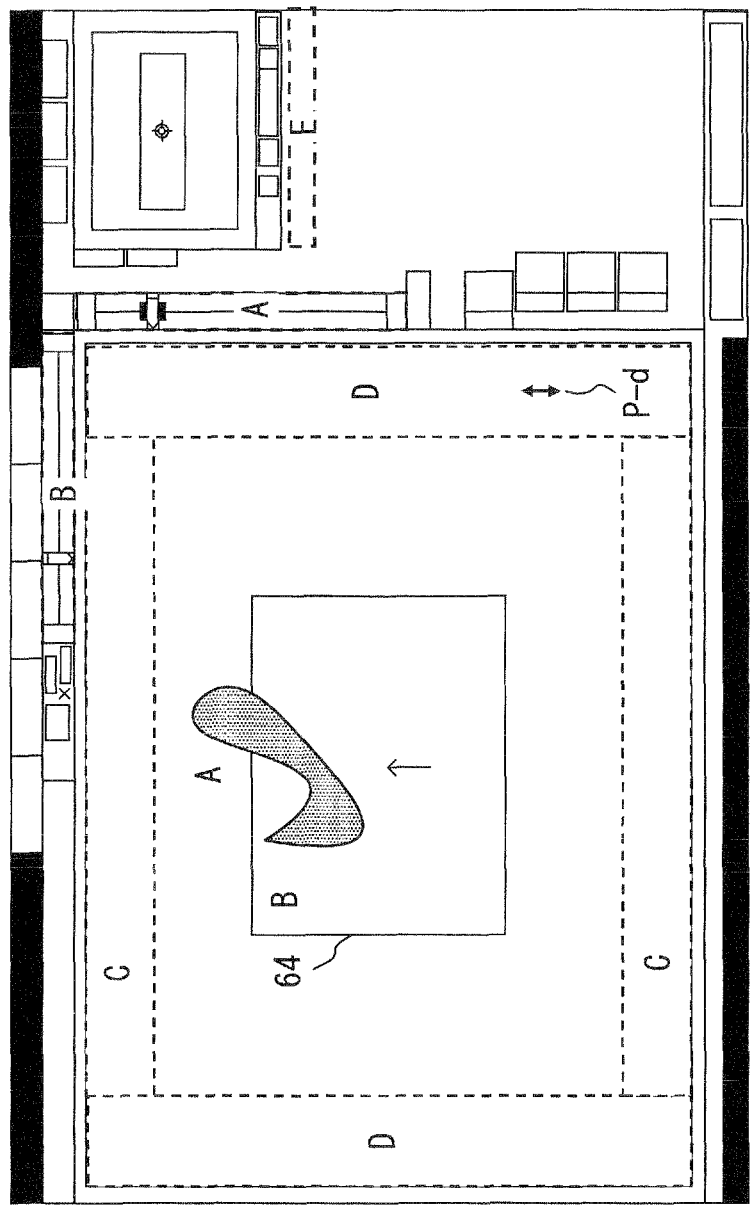
FIG. 30 is an example of a screen (1) when the mouse pointer P is detected in the sectional area D of the wizard screen C, and the mode of the mouse pointer is changed according to the first embodiment.
Figure 31:
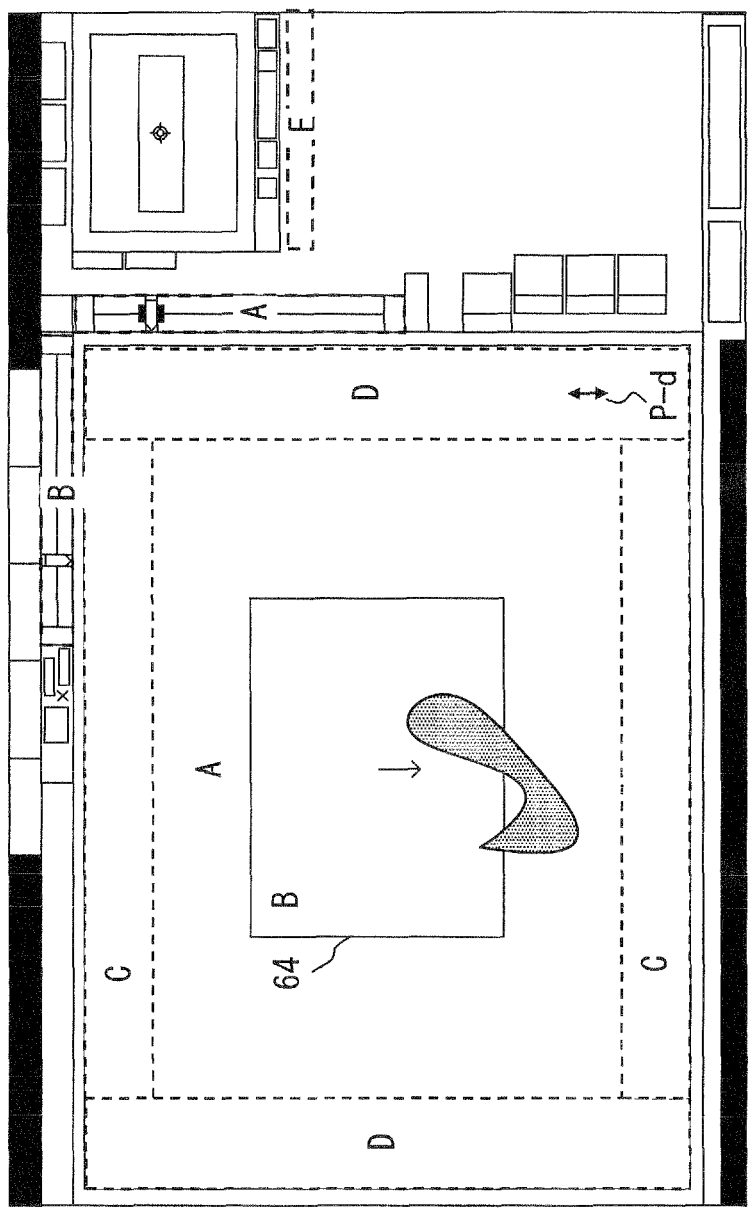
FIG. 31 is an example of a screen (2) when the mouse pointer P is detected in the sectional area D of the wizard screen C according to the first embodiment, and the mode of the mouse pointer is changed.

That is, when the wheel 91 is moved in the direction of W1, the sample 19 is moved in the X-axis direction indicated by the upward arrow in FIG. 30. Therefore, the host system 2 drive-controls the stage X-Y drive control unit 21 depending on the amount of rotation of the wheel 91. When the wheel 91 is moved in the direction of W2, the sample 19 is moved in the X-axis direction indicated by the downward arrow in FIG. 31. Therefore, the host system 2 drive-controls the stage X-Y drive control unit 21 depending on the amount of rotation of the wheel 91.

When the driving operation of the motor-operated stage 20 is completed, the host system 2 returns to the mode in which the GUI of the mouse pointer is indicated by P again (S519). Therefore, when the mouse pointer is located in the sectional area C, the motor-operated stage 20 can be driven in the Y-axis direction by rotating the wheel 91.

Figure 32:
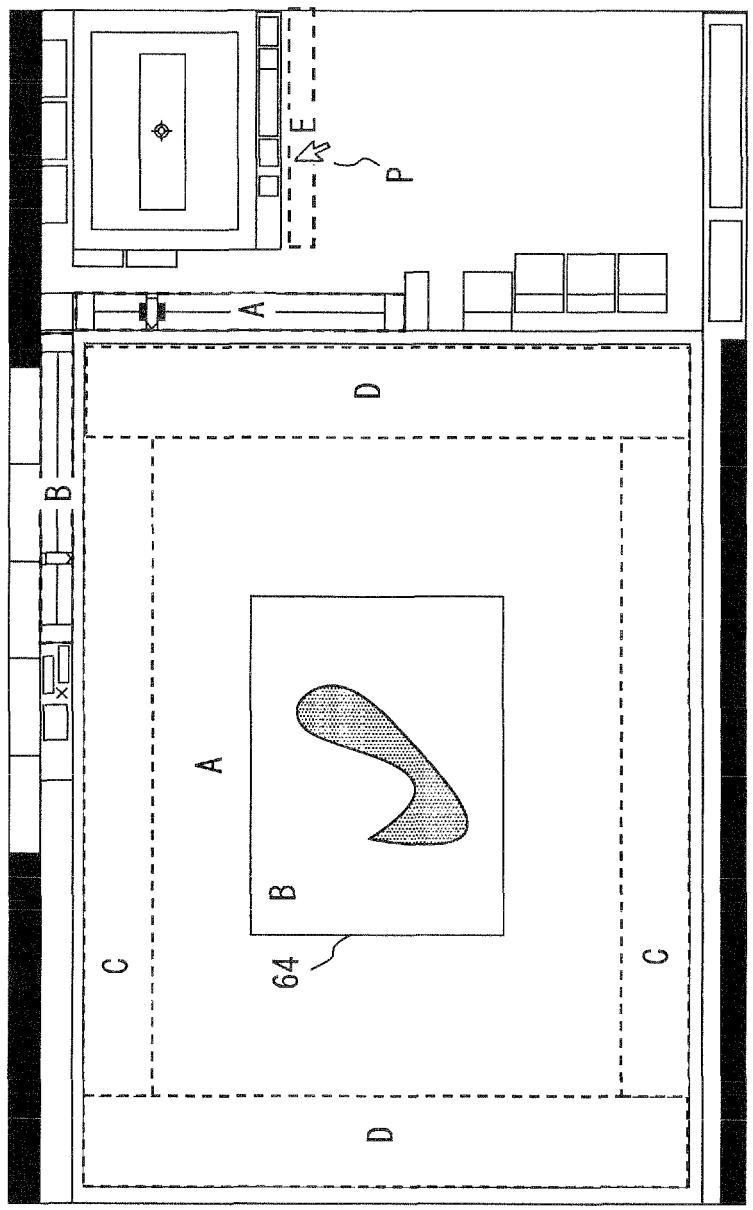
FIG. 32 is an example of a screen when a mouse pointer P is located in a sectional area E of the wizard screen C according to the first embodiment.

Described next is the case in which the mouse pointer is located in the sectional area E as illustrated in FIG. 32. When the wheel 91 is operated (S502), and the mouse pointer P is located in the operation area E (S520), the host system 2 makes a change from the mode in which the GUI of the mouse pointer is indicated by P to the mode in which it is indicated by P-e in FIG. 33 (S517).

Figure 33:
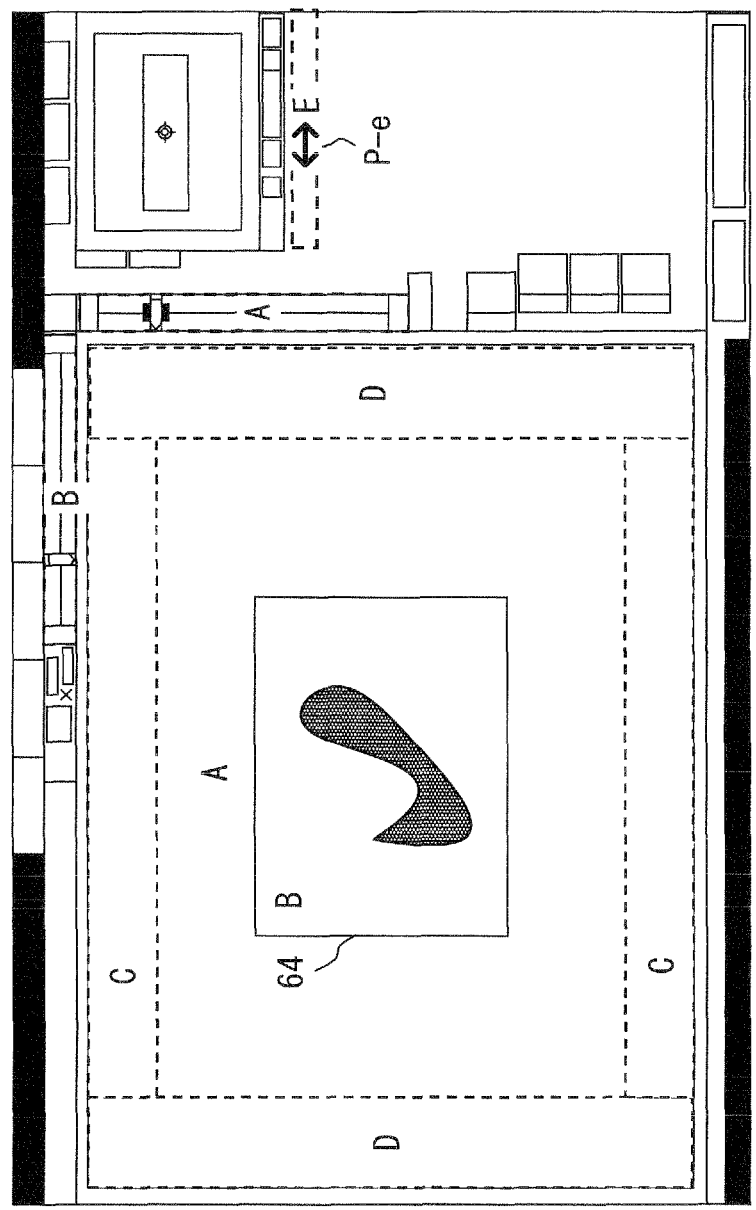
FIG. 33 is an example of a screen (1) when the mouse pointer P is detected in the sectional area E of the wizard screen C, and the mode of the mouse pointer is changed according to the first embodiment.
Figure 34:
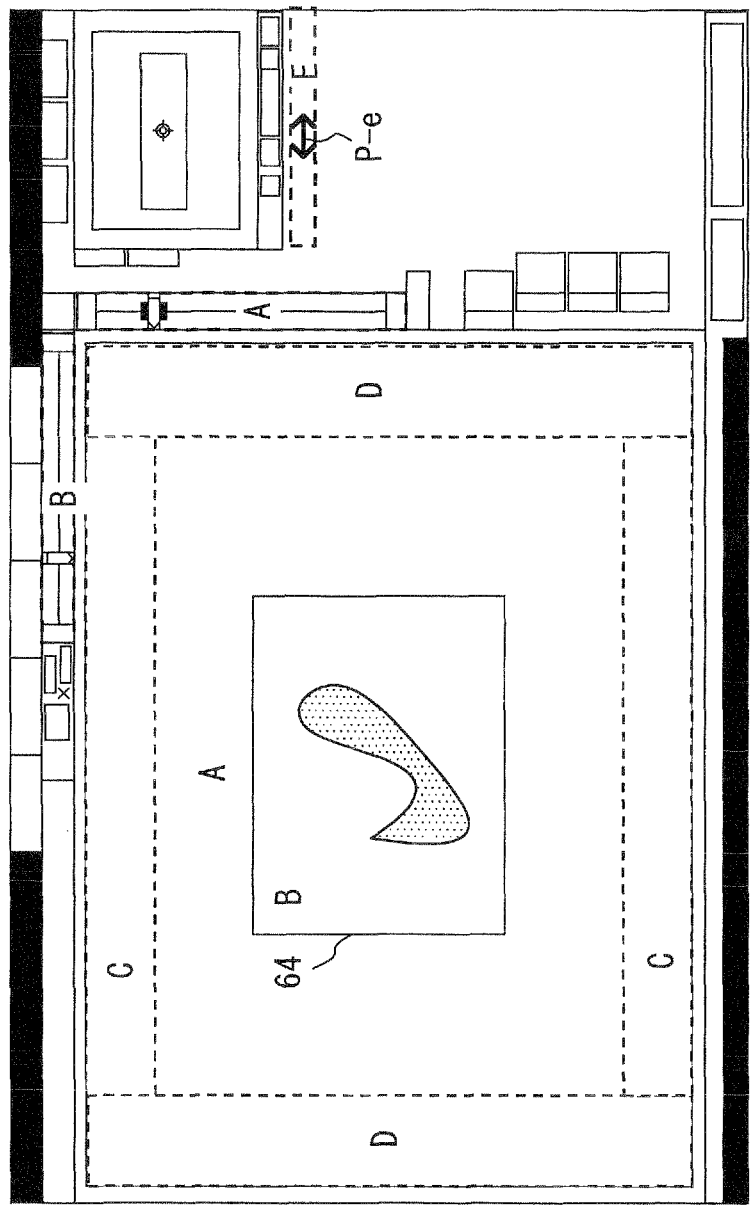
FIG. 34 is an example of a screen (2) when the mouse pointer P is detected in the sectional area E of the wizard screen C, and the mode of the mouse pointer is changed according to the first embodiment.

Then, the host system 2 controls the dimmer of the light source depending on the rotation direction and the amount of rotation of the wheel 91 through the microscope controller 32 (S518). When the wheel 91 is moved in the direction of W1, the sample image in the range specification frame 64 becomes bright as illustrated in FIG. 33. When the wheel 91 is moved in the direction of W2, the sample image in the range specification frame 64 becomes dark as illustrated in FIG. 34.

That is, when the wheel 91 is moved in the direction of W1, the host system 2 controls the dimming drive of the light source depending on the amount of rotation of the wheel 91 to increase the quantity of light as illustrated in FIG. 33. When the wheel 91 is moved in the direction of W2, the host system 2 controls the dimming drive of the light source depending on the amount of rotation of the wheel 91 to decrease the quantity of light as illustrated in FIG. 34.

When the driving operation for dimming the light source is completed, the host system 2 returns to the mode in which the GUI of the mouse pointer is indicated by P again (S519). Therefore, when the mouse pointer is located in the sectional area E, the dimming drive control can be realized by rotating the wheel 91.

Next, the assignment of the function of the wizard screen D is described below with reference to the screens illustrated in FIGS. 36 through 38 and the flowcharts in FIG. 39.

Figure 36:
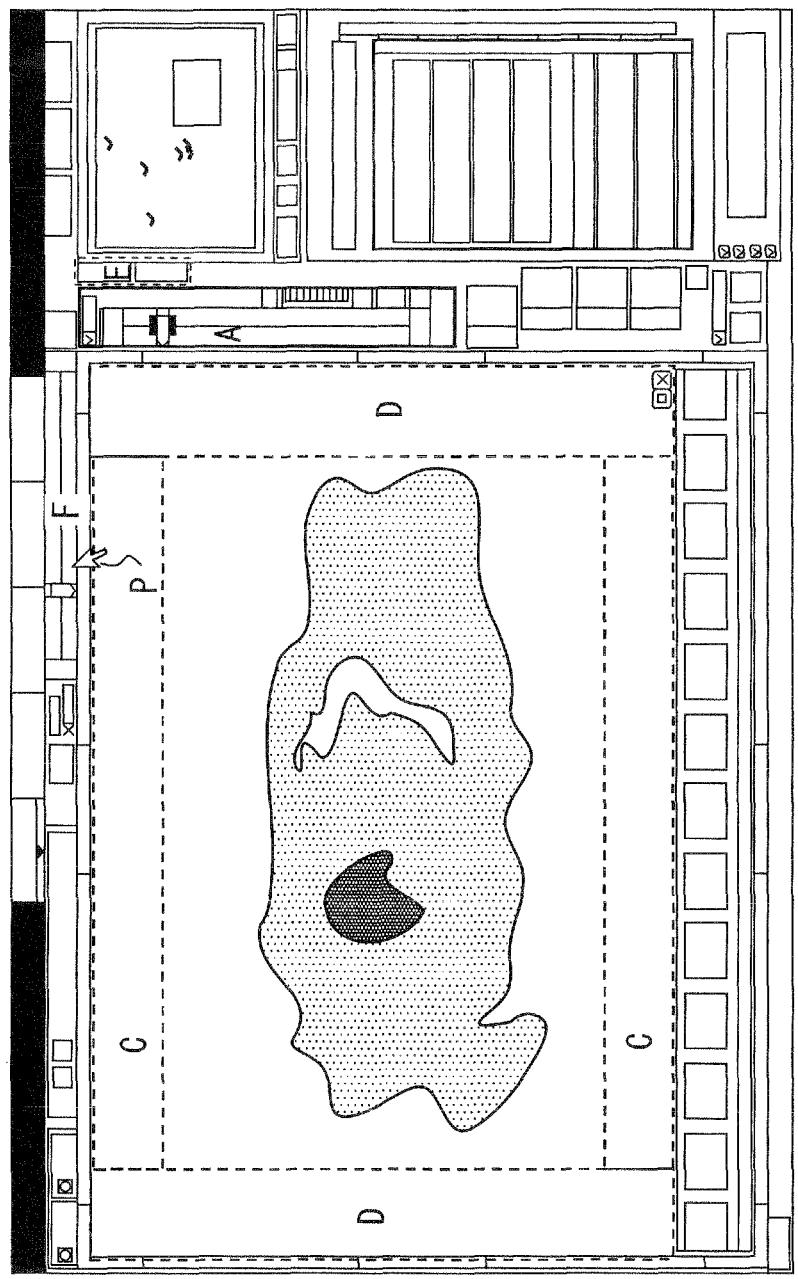
FIG. 36 is an example of a screen when a mouse pointer P is located in a sectional area F of the wizard screen D according to the first embodiment.

In the flowchart in FIG. 36, the host system 2 divides the wizard screen D into a plurality of areas, and assigns the function for controlling the drive unit to each area (S601). As illustrated in FIG. 36, the host system 2 divides the operation section by the wheel 91 on the wizard screen D into the operation sections A, C, D, E, and F.

Thus, the same control as on the wizard screen C can be realized by dividing the wizard screen into a plurality of areas. That is, when the position of the mouse pointer moves to the respective operation sections and wheel 91 is rotated in the operation section to which the pointer have moved, the drive of the drive unit assigned to the operation section is controlled.

Described first is the case in which the mouse pointer is located in the sectional area A. When the mouse operation is performed in the operation section A, as with the wizard screen C, the host system 2 controls the stage Z drive control unit 22 depending on the rotation direction and the amount of rotation of the wheel 91 to adjust the distance between the objective 23 and the motor-operated stage 20 (S609).

That is, when the wheel 91 is moved in the direction of W2, the host system 2 drive-controls the stage Z drive control unit 22 depending on the amount of rotation of the wheel 91 in the direction of the approach of the sample 19 to the objective 23. When the wheel 91 is moved in the direction of W1, the host system 2 drive-controls the stage Z drive control unit 22 depending on the amount of rotation of the wheel 91 in the direction of the departure of the sample 19 from the objective 23.

The amount of drive of the motor-operated stage 20 driven in the Z-axis direction by the stage Z drive control unit 22 varies depending on the optical magnification. Therefore, when the 20× magnification is selected, it can be driven at 1 μm per click of mouse wheel. When the 40× magnification is selected, it can be driven at 0.5 μm per click of mouse wheel. In the case of the mouse wheel without clicking, the amount of drive per rotation of wheel can correspond to the amount of drive such as 20 μm or 10 μm.

Since the cases of operation sections C, D, and E are the same as the wizard screen C, the detailed descriptions are omitted here.

Described next is the case in which the mouse pointer is located in the sectional area F as illustrated in FIG. 36. When the wheel 91 is operated (S602) and the mouse pointer P is located in the operation area F (S605), the host system 2 makes a change from the mode in which the GUI of the mouse pointer is indicated by P to the mode in which it is indicated by P-f in FIG. 37 (S611).

Then, the host system 2 drive-controls the zoom optical system 27 through the microscope controller 32 depending on the rotation direction and the amount of rotation of the wheel 91 to adjust the optical magnification (S612).

Figure 37:
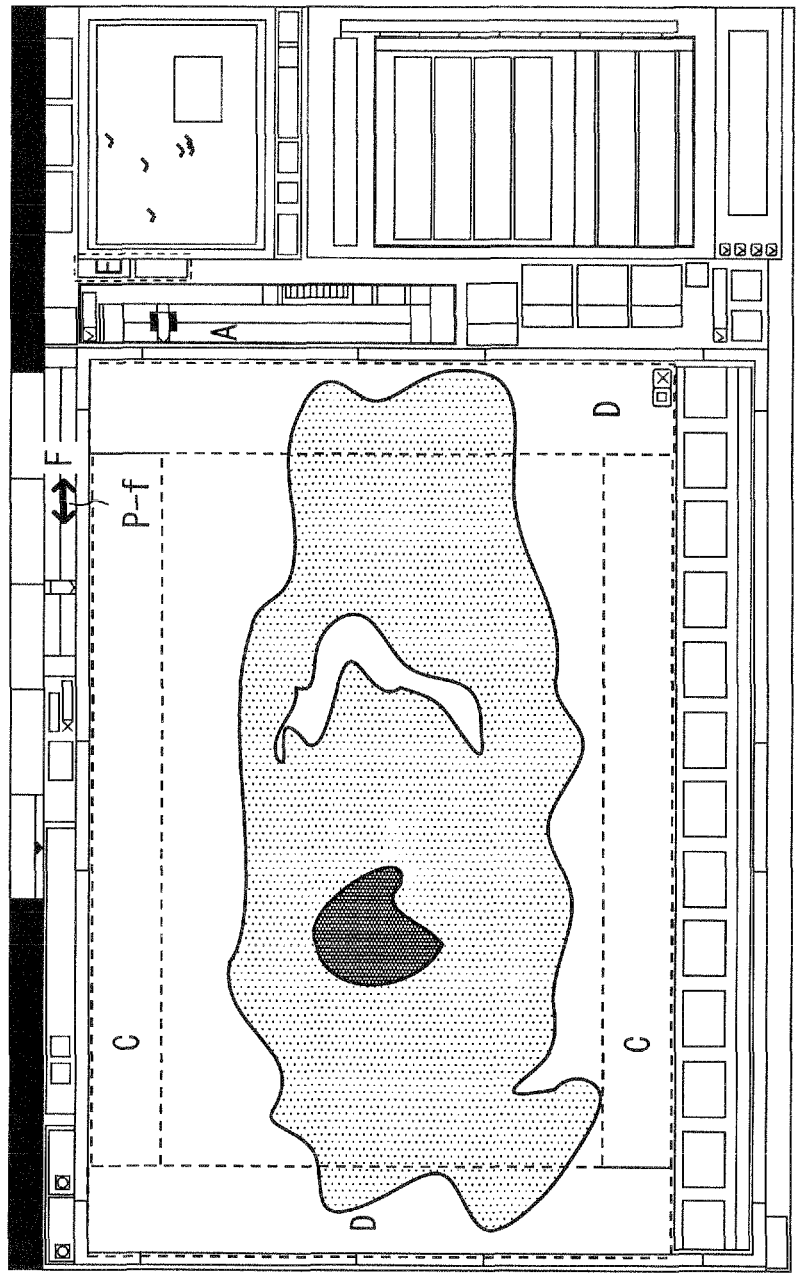
FIG. 37 is an example of a screen (1) when the mouse pointer P is detected in the sectional area F of the wizard screen D, and the mode of the mouse pointer is changed according to the first embodiment.
Figure 38:
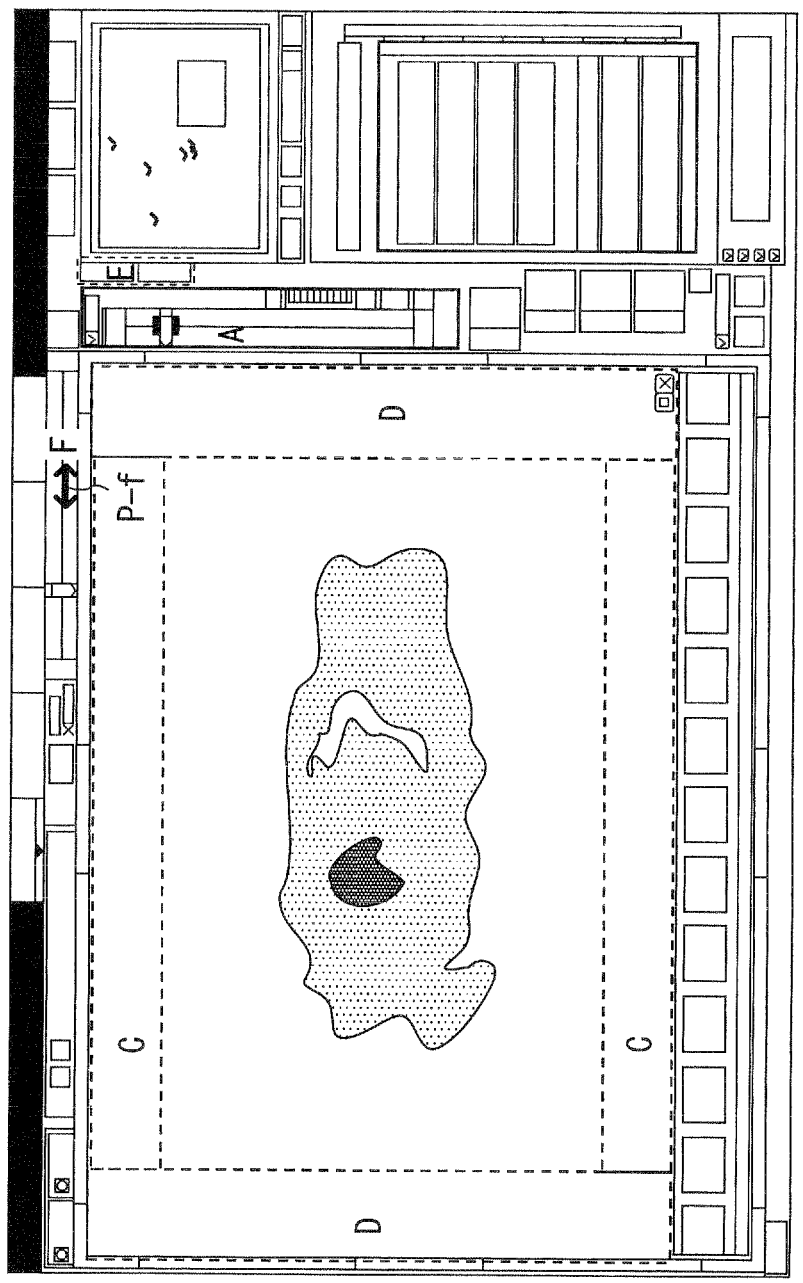
FIG. 38 is an example of a screen (2) when the mouse pointer P is detected in the sectional area F of the wizard screen D, and the mode of the mouse pointer is changed according to the first embodiment.

That is, when the wheel 91 is moved in the direction of W2, the host system 2 drive-controls the zoom optical system 27 in the direction of higher optical magnification as illustrated in FIG. 37 depending on the amount of rotation of the wheel 91. When the wheel 91 is moved in the direction of W1, the host system 2 drive-controls the zoom optical system 27 in the direction of lower optical magnification as illustrated in FIG. 38 depending on the amount of rotation of the wheel 91. The zoom optical system can be driven by the amount of drive of changing the 1× magnification per click of wheel.

When the driving operation of the zoom optical system 27 is completed, the host system 2 returns to the mode in which the GUI of the mouse pointer is indicated by P again (S619). Therefore, when the mouse pointer is located in the sectional area F, the drive of the optical magnification can be realized by rotating the wheel 91.

FIG. 40 is an example of a wheel operation control table. The wheel operation control table is provided for each wizard screen, and stored in the storage device of the host system 2. The wheel operation control table stores, for example, a "sectional area name", a "sectional area range", a "drive unit name", "operation contents by wheel", and a "mouse pointer image".

The "sectional area name" stores the name of a sectional area. The "sectional area range" stores the coordinates indicating the range of the sectional area on the wizard screen. The "drive unit name" stores the drive unit name assigned to the sectional area. The "operation contents by wheel" stores the control information for drive of a drive unit depending on the rotation direction and the amount of rotation of the wheel when the mouse pointer is located in the sectional area. The "mouse pointer image" stores the image data of a mouse pointer displayed when the mouse pointer is located in the sectional area, or the location information about the image data.

Figure 39:
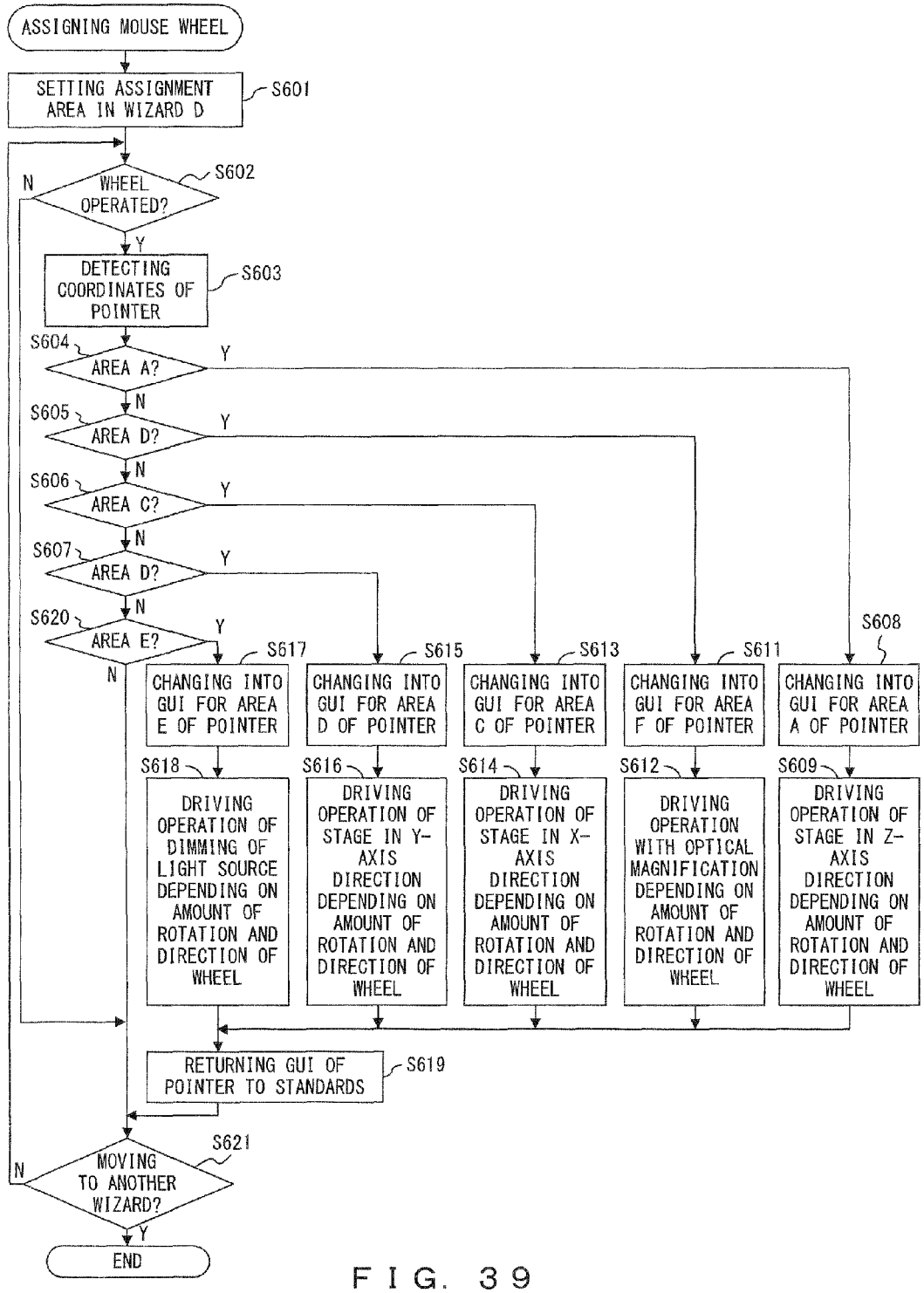
FIG. 39 is a flowchart when the wheel operation of a mouse is performed in each area on the wizard screen D according to the first embodiment.

When the process flow illustrated in FIGS. 35 and 39 is performed, the CPU of the host system 2 reads the wheel operation control table corresponding to each wizard screen from the storage device, and performs the process based on the process flow. Using the wheel operation control table, the host system 2 can switch the drive unit to be driven depending on the area on the wizard screen. Furthermore, using the wheel operation control table, the host system 2 can convert the rotation direction and the amount of rotation of the wheel into an instruction signal for physical operations of the switched drive unit, and transmit the signal to the microscope controller 31. Therefore, the microscope controller 31 can drive the drive unit according to the transmitted signal.

As described above, the microscope system according to the present embodiment can automatically switch the drive unit to be driven on the sample display screen or the operation menu display screen depending on the selected area and the wheel operation of the mouse 88 in the area, and can control the switched drive unit. Thus, the operation of the microscope system can be improved and the operation load of the user can be reduced.

In the present embodiment, the assignment of the mouse wheel of the mouse with a wheel of the pointing device is described, but it can be replaced with a trackball or other common pointing devices. In addition, the amount of drive by a mouse wheel is not fixed, and a user can optionally set it for each portion. Furthermore, the drive unit assigned to the mouse wheel can be a motor-driven AS (aperture stop), a motor-driven correction ring, and other drive units.

According to the first embodiment, on the sample display screen or the operation menu display screen, the drive unit to be driven depending on the area selected by the mouse and the mouse wheel operation in the selected area can be automatically switched. Thus, the operability of the microscope system can be improved, and the operation load of the user can be reduced.

Second Embodiment

Recently, various observing methods have been used in various studies and analyses. For example, in the fluorescent observation, a multi-excitation observation for staining and expressing a plurality of fluorescent dyes is used. The multi-excitation observation can be performed by a method in which a fluorescent filter for multi-excitation capable of simultaneously observing a plurality of fluorescent dyes, and a method in which a fluorescent filter for single color corresponding to a fluorescent dye to be used is switched and used.

However, there has been the problem of restricting a free observation because the fluorescent filter for multi-excitation limits the combination of observable fluorescent wavelengths.

In addition, in the method of displaying an image by shooting the image by switching a plurality of fluorescent filters for single color and superposing the shot images, the operation of the microscope is limited by the intervals of switching the filters. Therefore, when a stage is moved or a magnification converting operation is performed, the images before update are superposed and displayed, thereby causing inconvenient use.

Therefore, the present embodiment provides a microscope system capable of easily tracing a specimen without trouble during display although an operation of a microscope which generates a change in observation environment is performed when observed images shot in a plurality of observing methods are superposed and displayed for the same specimen.

The microscope system according to the second embodiment includes a microscope, an image pickup unit, a selection instruction unit, a superposition unit, a display control unit, a detection unit, and a superposition release unit.

The microscope can observe a specimen by switching a plurality of observing methods. The microscope corresponds to, for example, a microscope apparatus 1 according to the present embodiment.

The image pickup unit captures an optical image of the specimen. The image pickup unit corresponds to, for example, a video camera 3 according to the present embodiment.

The selection instruction unit is assigned a selection instruction to select at least one observing method in the plurality of observing methods. The selection instruction unit corresponds to, for example, a switch instruction button 192 which is used in switching to an observing method by each fluorescent cube according to the present embodiment.

The superposition unit superposes the captured images in the selected observing method. The superposition unit corresponds to the processes in steps S706 and S707 performed by, for example, the host system 2 according to the present embodiment.

The display control unit controls displaying the superposed images. The display control unit corresponds to, for example, the process in S707 performed by the host system 2 according to the present embodiment.

The detection unit detects the operation of the microscope which generates a change in observation environment in which the specimen is shot. The detection unit corresponds to, for example, the process in S710 performed by the host system 2 according to the present embodiment.

The superposition release unit releases the superposed state of the superposed images based on the detection result. The superposition release unit corresponds to, for example, the process in S711 performed by the host system 2 according to the present embodiment.

With the above-mentioned configuration, according to the present embodiment, display trouble does not occur and a specimen can be easily traced although an operation of a microscope which generates a change in observation environment is performed while superposing and observing the images captured in a plurality of observing methods on the same specimen.

The superposition unit accumulatively superposes an image obtained in the observing method at the selection instruction on the image displayed by the display control unit. With the configuration, a stored observed image can be superposed on the live image.

The detection unit can detect an operation relating to at least one of the operations of moving a stage loaded with the specimen, changing a magnification, and focusing. With the configuration, the operation of the microscope which generates a change in observation environment in which a specimen is shot.

When the operation of the microscope is detected, the superposition release unit can release the superposed state of the image by clearing the image superposed on the displayed image. With the configuration, superposed images can be released and live images can be obtained when moving a stage and switching objectives, thereby easily finding a specimen. Thus, the operation of the microscope system can be improved and the operation load of the user can be reduced.

The selection instruction unit is displayed as a part of a graphical user interface for displaying the images. In this case, when the selection instruction is provided by the selection instruction unit, the display control unit can change the display mode of the selection instruction unit from a first display mode to a second display mode. With the configuration, the selected observing method can be determined easily and visually.

In addition, when a selection release instruction is provided by the selection instruction unit, the display control unit changes the display mode of the selection instruction unit from the second display mode to the first display mode, and when the operation of the microscope is detected by the detection unit, the display mode of the selection instruction unit can be changed from the second display mode to the third display mode. With the configuration, the observing method released by a user can be easily distinguished visibly from the observing method forcibly released by the change of an observation environment.

The observing method can be a fluorescent observation method in which a fluorescent observation is performed for each wavelength. In addition, at least two of the bright field observation method, the dark field observation method, the phase difference observation method, and the differential interference contrast method can be available.

The second embodiment is described in detail with reference to the attached drawings. Described below is the superposing operation of observed images by the fluorescent cubes A, B, and C according to the present embodiment. Since the configuration of the microscope system and the screen configuration of the microscope system according to the present embodiment are the same as those according to the first embodiment (FIGS. 1 through 19), their descriptions are omitted here. The same configuration as in the first embodiment is assigned the same reference numeral, and the description is omitted here.

Figure 54:
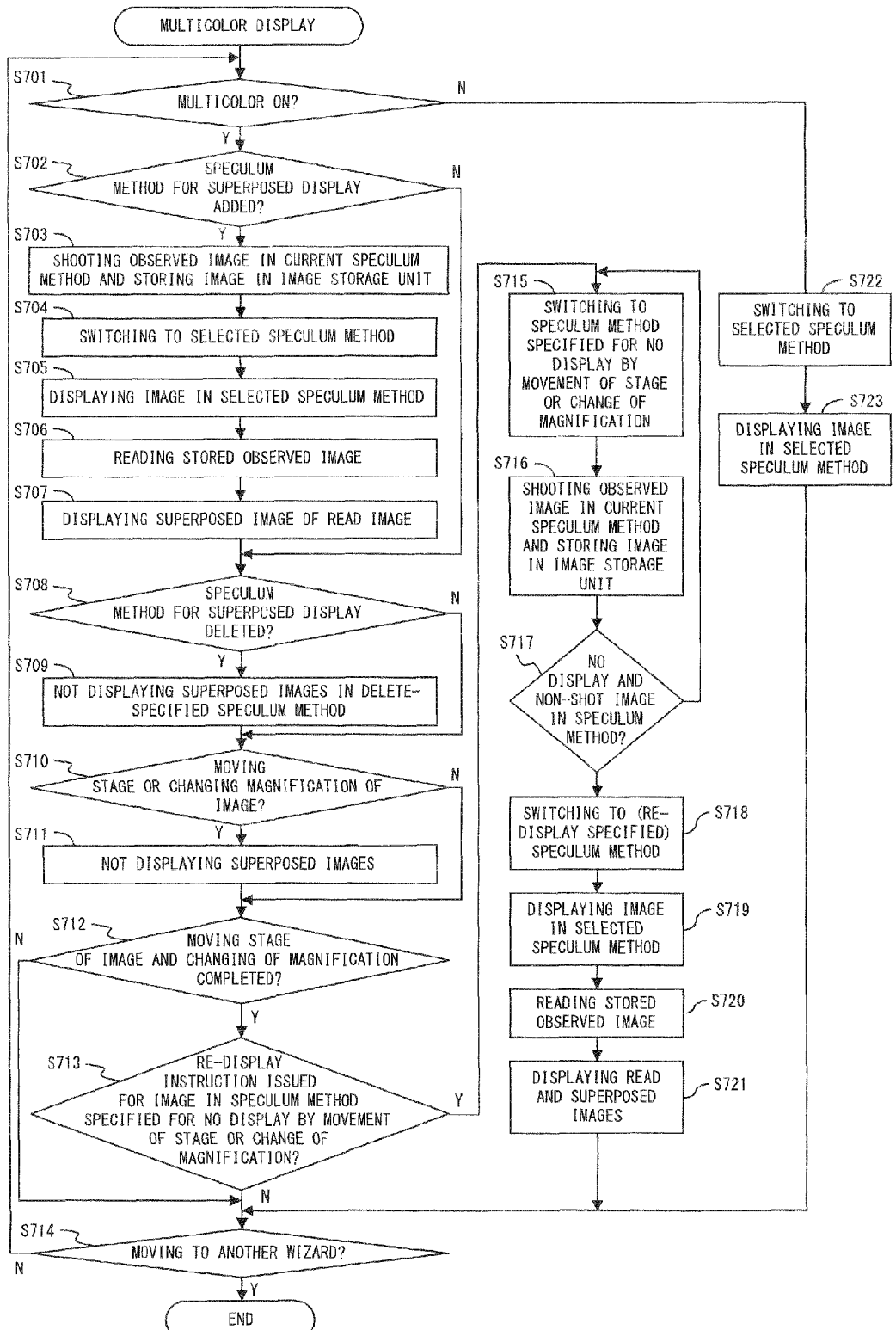
FIG. 54 is a flowchart of the operations of various buttons of the speculum method change instruction area 189 according to the second embodiment.

The function available when the range of the shooting operation of a user is finely adjusted (S404) is described below with reference to the screens in FIGS. 41 through 53 and the flowchart in FIG. 54.

Figure 41B:
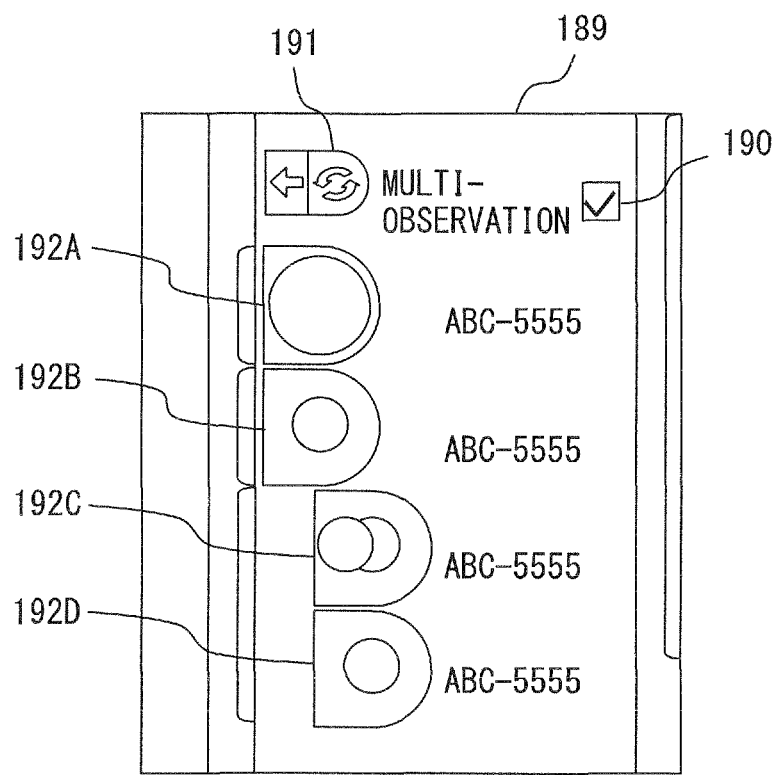
FIG. 41B is an example of the GUI of the speculum method change instruction area 189 according to the second embodiment of the present invention.

FIG. 41A illustrates the speculum method change instruction area 189 of the wizard screen D. FIG. 41B is an example of a GUI of the speculum method change instruction area 189. The button 192A is a switch instruction button to the observing method by the fluorescent cube A. The button 192B is a switch instruction button to the observing method by the fluorescent cube B. The button 192C is a switch instruction button to the observing method by the fluorescent cube C. The button 192D is a switch instruction button to the fluorescent DIC observation.

When each of the buttons 192A, 192B, 192C, and 192D (collectively referred to as "button 192") the button is slid from L1 to L2. That is, when the left end of the button 192 reaches L1, the speculum method corresponding to the button indicates the selected state. When the left end of the button 192 is located at L2, it indicates the non-selected state.

The display mode of the GUI of the buttons 192A through 192D is further changed into the display mode indicated by the reference numerals 193 through 195 illustrated in FIGS. 42(*a*) through 42(*c*). The GUI of the button indicated in a mode 193 selects the speculum method currently corresponding to the button as a main method, and a live image is displayed in the image display area 72. The GUI of the button in a mode 194 indicates the speculum method corresponding to the button as a non-main method (not selected as a main method) or a non-selected state. The GUI of the button in a mode 195 indicates an image in the speculum method corresponding to the button as a non-display state by the operation of the microscope described later.

A button 190 is an ON/OFF button for multi-color display, and superposes and displays the fluorescent observation images shot in the speculum method by each fluorescent cube (hereinafter referred to as "superposed display"). A button 191 is a redisplay instruction button of superposed images described later.

The control of the display mode for indicating the selected/non-selected state etc. of the button is performed by the CPU of the host system 2 which reads the program according to the present embodiment or the processor for screen control etc.

First, with reference to FIGS. 41 through 44, the operation of switching the speculum method when superposed display is not performed is described. It is assumed that the multicolor display OFF state is selected by the button 190 (N in S701).

In FIG. 41A, the button 192A is in the selected state, that is, the fluorescent cube A is selected. In this case, a live image by the fluorescent cube A is displayed in the image display area 72.

In this state, the selection instruction button 192B for the fluorescent cube B is selected. Then, the left end of the button 192B is moved to the position of L1, and the mode of the button 192B is changed from the mode 194 to the mode 193. The host system 2 issues an instruction through the microscope controller 31 to insert the fluorescent cube B (35*b*) into the optical observation path (S722).

Then, as illustrated in FIG. 43, an observed image (live image) by the fluorescent cube B is displayed in the image display area 72 (S723). The button 192A is moved to the position of L2, and the mode is changed from the mode 193 to the mode 194.

Then, the selection instruction button 192C of the fluorescent cube C is selected. The left end of the button 192C is moved to the position of L1, and the mode is changed from the mode 194 to the mode 193. The host system 2 instructs the microscope controller 31 to insert the fluorescent cube C (35*c*) into the optical observation path (S722).

Figure 44:
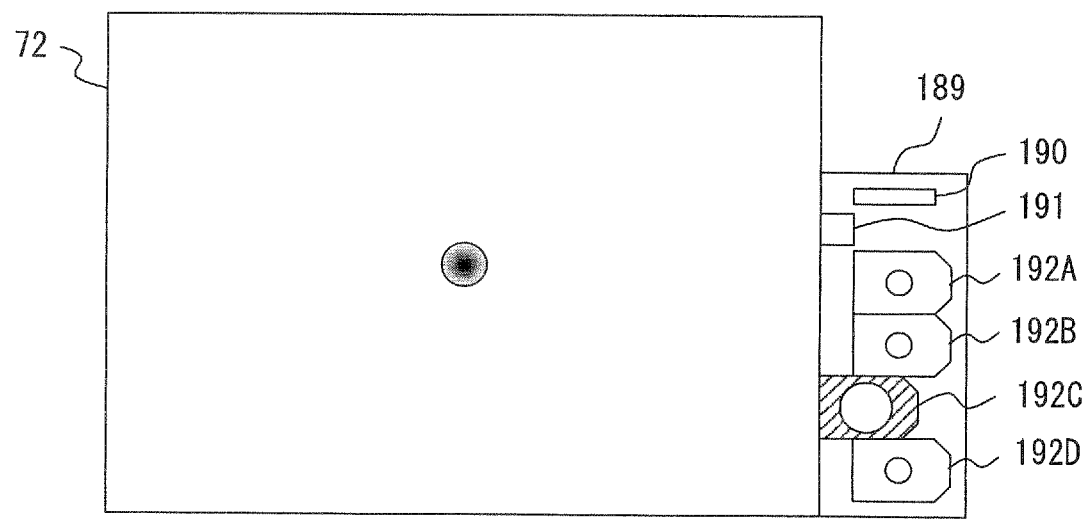
FIG. 44 is an example of a screen displayed when a selection instruction button 192C of the fluorescent cube C is selected in the case where superposed display is not performed according to the second embodiment.

Then, as illustrated in FIG. 44, an observed image (live image) by the fluorescent cube C is displayed in the image display area 72 (S723). The button 192B is moved to the position of L2, and the mode is changed from the mode 193 to the mode 194.

Next, the operation of switching the speculum method when the superposed display is performed is described with reference to FIGS. 45 through 47. That is, the case in which the multicolor display ON state is selected by the button 190 is described.

Figure 45:
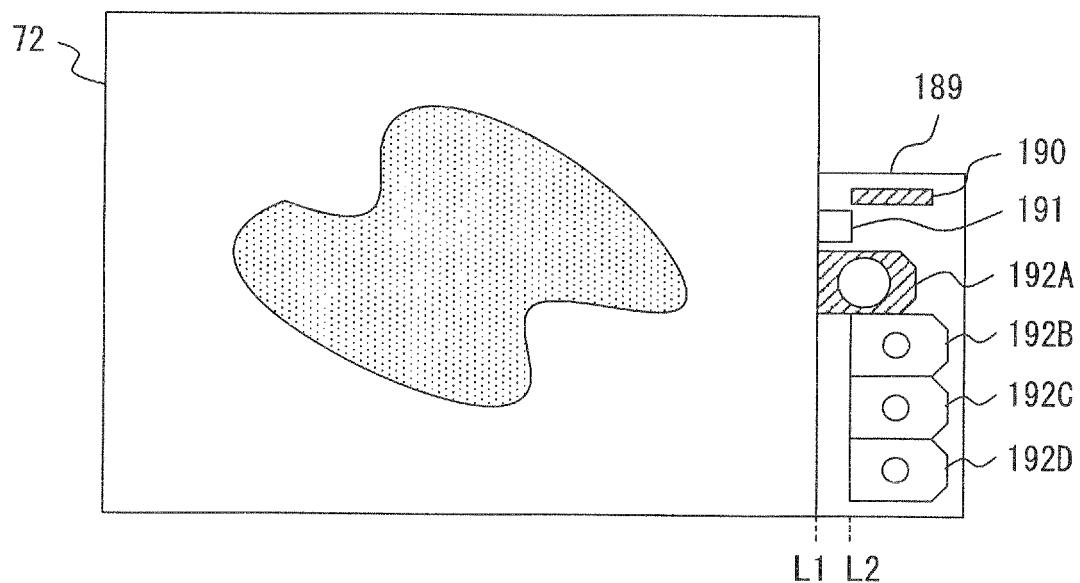
FIG. 45 is an example of a screen displayed when a selection instruction button 192A of the fluorescent cube A is selected in the case where superposed display is performed according to the second embodiment.

As illustrated in FIG. 45, the multicolor display button 190 is placed in the ON position (S701) with the live image displayed by the cube A in the image display area 72. In this case, the button 192B for selection of the fluorescent cube B is selected (Y in S702).

Then, the host system 2 stores in the image record unit 188 the live image by the cube A displayed in the image display area 72 (S703). The left end of the button 192B is moved to the position of L1, and the mode is changed from the mode 194 to the mode 193.

The host system 2 instructs the microscope controller 31 to insert the fluorescent cube B (35b) into the optical observation path (S704). Then, by the control of the host system 2, the observed image (live image) by the fluorescent cube B is displayed in the image display area 72 (S705).

Then, the host system 2 reads the image of the fluorescent cube A stored in the image record unit 188 (S706). As illustrated in FIG. 46, the host system 2 superposes and displays the read image of the fluorescent cube A on the observed image (live image) by the fluorescent cube B (S707). In this case, the button 192A is placed in the position of L1, and the mode of the button 192A is changed from the mode 193 to the mode 194. That is, the image of the fluorescent cube A stored in the image record unit 188 is superposed on the observed image (live image) by the fluorescent cube B and displayed in the image display area 72.

Next, when the selection instruction button 192C of the fluorescent cube C is selected in the state illustrated in FIG. 46 (S702), the host system 2 stores the live image by the cube B displayed in the image display area 72 in the image record unit 188 (S703). The left end of the button 192C is moved to the position of L1, and the mode is changed from the mode 194 to the 193.

The host system 2 issues an instruction through the microscope controller 31 to insert the fluorescent cube C (35c) into the optical observation path. The observed image (live image) by the fluorescent cube C is displayed in the image display area 72 (S705). The host system 2 reads the image of the fluorescent cubes A and B stored in the image record unit 188 (S706).

Figure 47:
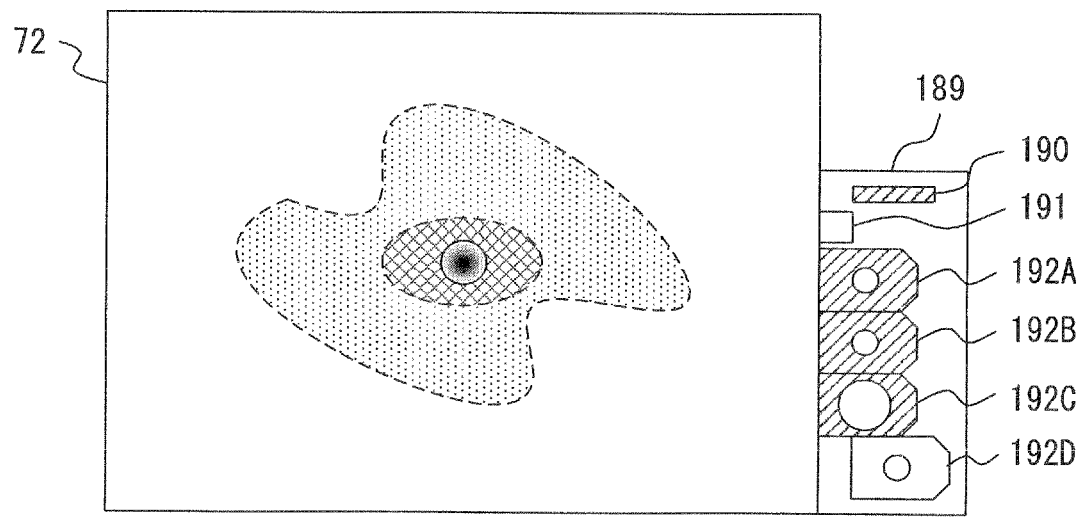
FIG. 47 is an example of a screen displayed when the selection instruction button 192C of the fluorescent cube C is selected in the state in FIG. 46 in the case where the superposed display is performed according to the second embodiment.

As illustrated in FIG. 47, the host system 2 performs superposed display (S707). That is, the images of the fluorescent cubes A and B stored in the image record unit 188 are superposed on the observed image (live image) by the fluorescent cube C and displayed in the image display area 72. In this case, the button 192B is located at the position of L1, and the mode is changed from the mode 193 to the mode 194.

When the selection instruction button 192A of the fluorescent cube A is selected in the state illustrated in FIG. 47 (S702), the host system 2 stores in the image record unit 188 the live image by the cube C displayed in the image display area 72 (S703). The left end of the button 192A is moved to the position of L1, and the mode is changed from the mode 194 to the mode 193.

The host system 2 issues an instruction through the microscope controller 31 to insert the fluorescent cube A (35a) into the optical observation path. The observed image (live image) by the fluorescent cube A is displayed in the image display area 72 (S705). The host system 2 reads the image of the fluorescent cubes B and C stored in the image record unit 188 (S706).

Figure 48:
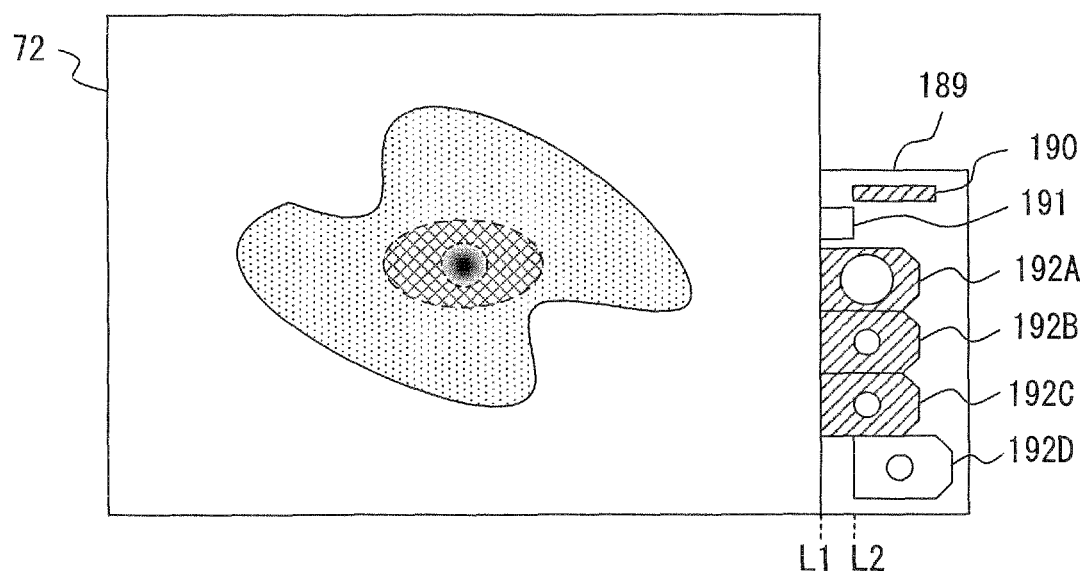
FIG. 48 is an example of a screen displayed when the selection instruction button 192A of the fluorescent cube A is selected in the state in FIG. 47 in the case where the superposed display is performed according to the second embodiment.

As illustrated in FIG. 48, the host system 2 superposes the images by the fluorescent cubes B and C on the observed image (live image) by the fluorescent cube A and displays the resultant images (S707).

In addition, the button 192C is located in the position of L1, and the mode is changed from the mode 193 to the mode 194. The images of the fluorescent cubes B and C stored in the image record unit 188 are superposed on the observed image (live image) by the fluorescent cube A and displayed in the image display area 72.

Next, the operation of releasing the speculum method in which the superposed display is performed is described below with reference to FIGS. 48 and 49. In the superposed display, when the observed image by the fluorescent cube C is released, the button 192C is selected to select the fluorescent cube C as a target of the release of superposed display in the state illustrated in FIG. 48 (Y in S708).

Then, the host system 2 releases the superposed display of the fluorescent cube C read from the image record unit 188 (S709). As illustrated in FIG. 49, the image of the fluorescent cube B stored in the image record unit 188 is superposed on the observed image by the fluorescent cube A and displayed in the image display area 72. The mode of the button 192C is still the mode 194, and a movement is performed to the position of L2.

In the superposed display, the live image corresponding to the button indicated by the mode 193 cannot be released. Therefore, when a live image is released from superposed display, the live image is switched to an observed image (live image) by another fluorescent cube, and then released.

Next, the operation of releasing the speculum method in which superposed display is performed by the movement of a stage is described below with reference to FIGS. 49 and 50.

Figure 49:
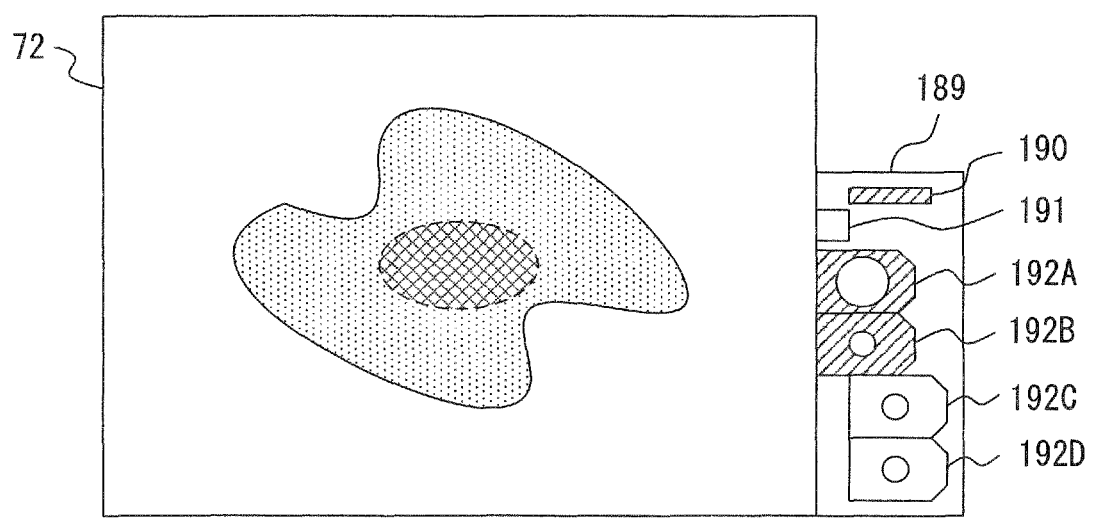
FIG. 49 is an example of a screen displayed when the button 192C is selected to release the superposed display of an image shot in the speculum method by the fluorescent cube C in the state in FIG. 48 according to the second embodiment.

In FIG. 49, when the stage is moved with the observed image by the fluorescent cube B superposed on the live image by the fluorescent cube A, and, for example, when the stage is moved by mouse clicking etc., the host system 2 detects that the stage movement has been made (Y in S710). In this case, the host system 2 releases the superposed display of the observed image by the fluorescent cube by the read from the image record unit 188 (S711).

Then, as illustrated in FIG. 50, the observed image (live image) by the fluorescent cube A is displayed in the image display area 72. That is, when the stage is moved or a magnification is changed, and a microscope operation generates a shift from the currently displayed live image, the host system 2 releases the superposed display. Then, only the observed image (live image) by the fluorescent cube A is displayed in the image display area 72.

The button 192B is moved to the position of L2, and the mode is changed from the mode 194 to the mode 195. Thus, the image of the fluorescent cube B is distinguished from the mode 194 of the fluorescent cube C when a user optionally performs the release. That is, the mode of the button is changed to the GUI 195 in the case in which the release is performed by a movement of a stage.

Figure 51:
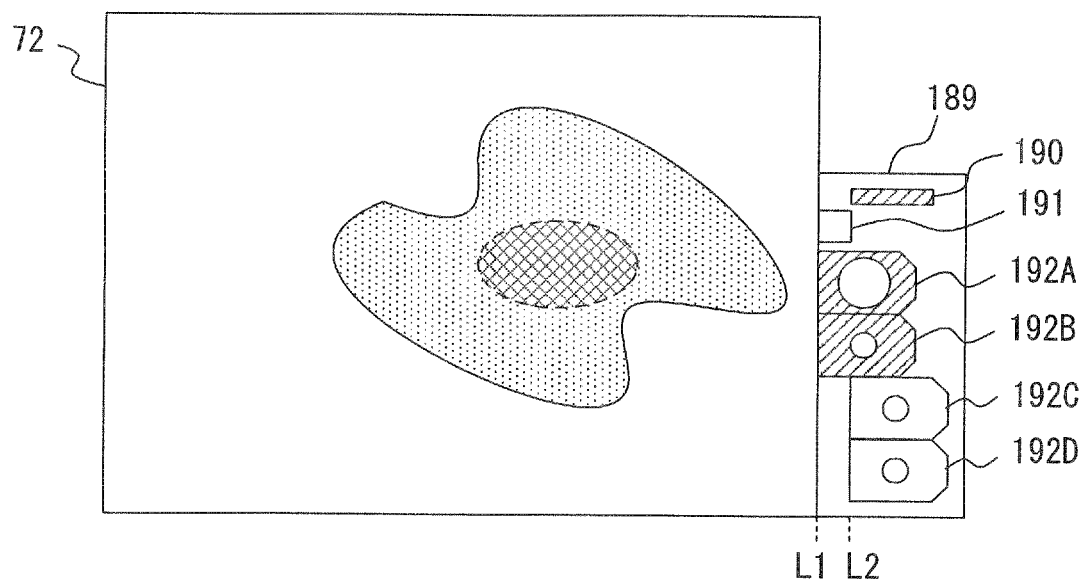
FIG. 51 is an example of a screen displayed when the image in the speculum method released from the superposed display by the movement of a stage is superposed again on the live image from the state in FIG. 50 according to the second embodiment.

Then, the re-display operation of the speculum method in which the superposed display has been released by moving a stage etc. is described below with reference to FIGS. 50 and 51. In FIG. 50, the button 191 is a redisplay instruction button for superposed images. That is, the button 191 issues an instruction to superpose and display the images again in the speculum method in which the superposed display has been released by moving a stage or changing a magnification. When the movement of a stage or changing a magnification is completed, the button 191 becomes valid (Y in S712). As illustrated in FIG. 50, the observed image of the fluorescent cube A is displayed in the image display area 72. The selection of the fluorescent cube B is released by moving the stage. The selection of the fluorescent cube C is released optionally by a user.

If the button 191 is clicked (Y in S713), the host system instructs the microscope controller 31 to insert the fluorescent cube B (35*b*) into the optical observation path (S715). Then, the host system 2 shoots an image through the fluorescent cube B (35*b*), and stores the observed image by the cube B in the image record unit 188 (S716).

The host system 2 determines whether or not there is an image which has been shot in the speculum method in which superposed display has been released by moving a stage etc. and has not been stored yet (S717). When there is an image which has been shot in the speculum method in which superposed display has been released and has not been stored yet (Y in S717), the processes in S715 through S717 are repeated.

When the image in the speculum method in which the superposed display has been released is completed (N in S717), the host system 2 issues an instruction through the microscope controller 31 to insert the fluorescent cube A (35*a*) into the optical observation path (S718). The observed image (live image) by the fluorescent cube A is displayed in the image display area 72 (S719).

The host system 2 reads an image of the fluorescent cube B stored in the image record unit 188 (S720). Then, as illustrated in FIG. 51, the host system 2 performs superposed display (S721). That is, the image of the fluorescent cube B released by the movement of the stage is superposed on the observed image (live image) by the fluorescent cube A after the completion of the movement of the stage and displayed in the image display area 72.

The case in which a magnification is changed with the image by the fluorescent cube B superposed on the live image by the fluorescent cube A is described below with reference to FIGS. 51 through 53. An optical magnification is changed at an instruction etc. by the button 80. Then, the host system 2 detects that the optical magnification has been changed (Y in S710).

The host system 2 releases the superposed display of the fluorescent cube B by the read from the image record unit 188 (S711). As illustrated in FIG. 52, the observed image (live image) by the fluorescent cube A is displayed in the image display area 72. The button 192B moves to the position of L2, and the mode is changed from the mode 194 to the mode 195. Thus, the button 192B is distinguished from the mode 194 of the fluorescent cube C optionally released by a user. That is, the button 192B becomes a GUI indicated in the mode 195 in which it is informed that the release has been performed by moving the stage. When the button 191 is clicked (S713), the host system 2 instructs the microscope controller 31 to insert the fluorescent cube B (35*b*) into the optical observation path (S715).

Then, the host system 2 shoots an image through the fluorescent cube B (35*b*), and stores the observed image by the cube B in the image record unit 188 (S716). The host system 2 determines whether or not there is an image which has been shot in the speculum method in which superposed display has been released by changing a magnification etc. and has not been stored yet (S717). When there is an image which has been shot in the speculum method in which superposed display has been released and has not been stored yet (Y in S717), the processes in S715 through S717 are repeated. When the image in the speculum method in which the superposed display has been released is completed (N in S717), the host system 2 issues an instruction through the microscope controller 31 to insert the fluorescent cube A (35*a*) into the optical observation path (S718). The observed image (live image) by the fluorescent cube A is displayed in the image display area 72 (S719).

The host system 2 reads an image of the fluorescent cube B stored in the image record unit 188 (S720). Then, as illustrated in FIG. 53, the host system 2 performs superposed display (S720). That is, the image of the fluorescent cube B released by the movement of the stage is superposed on the observed image (live image) by the fluorescent cube A after the change of the optical magnification and displayed in the image display area 72. In the present embodiment, the detection of the operation of a stage is performed in the X- and Y-axis directions. In addition to the X- and Y-axis directions, the movement in the Z-axis direction can also be detected. In this case, the superposing operation can also be automatically released as in the case in which the movement of a stage in the Z-axis direction is detected by the focusing operation.

When an image whose superposed display has been released is to be re-displayed by pressing the button 191, the image displayed on the monitor 5 is once cleared and the superposed display is performed after the image is acquired while the processes in S715 through S717 are repeated (that is, during the acquisition of the image whose superposed display has been released).

Until the movement is performed to another wizard screen, the speculum method change instruction area 189 can be operated (S714).

As described above, the microscope system according to the second embodiment includes a detection unit for detecting a microscope operation in which a change is made to an image of a specimen. Thus, when a fluorescent observation is performed, the overlay display state of an observed image can be released although a stage is moved, a magnification is changed, or an AF operation is performed. As a result, when the microscope is operated with the observed image superposed, the problem of a difficult observation due to a shift between the live image and the observed image superposed on the live image, thereby causing a troublesome operation can be prevented. Therefore, the operability of the microscope can be improved and the load of a user can be reduced. In addition, the observation time can be shortened and the load of a user can be considerably reduced.

Furthermore, depending on the display mode of the button 192, the observing method in which superposed display has been forcibly released can be easily distinguished from the observing method in which the superposed display is optionally released. As a result, when superposed display is performed again, the observing method in which the superposed display has been forcibly released can be easily determined and selected.

In the second embodiment, an instruction to perform superposed display again on the image of the speculum method in which the superposed display has been released by moving a stage or changing a magnification is issued using the button 191, but the superposed display can be automatically performed again by detecting the movement of a stage or the completion of the converting operation of a magnification.

Furthermore, the image in the selected speculum method in the second embodiment is displayed as a live image. However, as described about the live/pause switch and display area 85, when no present embodiment is performed for a predetermined time, a switching operation can be automatically performed for a pause image to prevent fading on a fluorescent image.

In the second embodiment, examples of combinations of a fluorescent observation, a DIC observation, and a bright field observation are described, but the combinations are limited to these examples. For example, the DIC observation can be replaced with the phase difference observation, and can be a combination of other speculum methods.

In addition, the microscope apparatus according to the second embodiment is described as having a plurality of objectives and they can be optionally switched, but the microscope apparatus can include an objective having a zoom mechanism. Furthermore, although a slide glass is exemplified as a sample, but the present invention is not limited to the sample, and can be a dish and other samples.

The processes illustrated by the flowcharts in FIGS. 7 through 10, 35, 39, and 54 and the wheel operation control table can be stored in a control program used to direct the CPU of a computer of a standard configuration described above to perform the processes by generating the program and storing it in a computer readable record medium. In this case, the computer can read the program from the record medium and the CPU can execute the program, thereby applying the first and second embodiments.

A record medium from which the computer can read the stored control program can be, for example, ROM and a storage device such as a hard disk device etc. built in the computer or provided as an external accessory device, and portable record medium etc. such as a flexible disk, a MO (magneto optical disk), CD-ROM, DVD-ROM, etc. which can read the stored control program by being inserted into the medium drive device provided for the computer.

A record medium can also be a storage device provided for a computer system functioning as a program server connected to the computer through a communication circuit. In this case, a transmission signal obtained by modulating the carrier wave by a data signal representing the control program is transmitted to the computer through a communication circuit as a transmission medium from a program server, and the computer demodulates the received transmission signal and regenerates the control program, thereby allowing the control program to be executed by the CPU of the computer.

For example, an upright microscope apparatus has been used as the microscope apparatus 1 in the first and second embodiment, but an inverted microscope apparatus can be used instead. In addition, the present embodiment can be applied to various systems such as a line device etc. into which a microscope apparatus is incorporated.

The embodiments of the present invention are described above, but the present invention is not limited to those embodiments, and can be improved and varied within the scope of the gist of the present invention.

The present invention can provide a microscope system which improves the operability of a user in performing a microscope observation.

What is claimed is:

1. A microscope system, comprising:
a microscope capable of observing a specimen by switching between a plurality of observing methods;
an image pickup unit which captures an optical image of the specimen;
an image storage unit which stores a captured image captured by the image pickup unit;
a selection instruction unit which receives a selection instruction to select at least one of the plurality of observing methods;
a superposition unit which superposes at least one stored image on a live observation image currently being captured based on the selected observing method;
a display control unit which controls display of the at least one image superposed on the live observation image;
a detection unit which detects an operation of the microscope which generates a change of an observation environment of shooting the specimen;
a superposition image removing unit which removes the at least one image superposed on the live observation image when the operation of the microscope is detected by the detection unit; and
an independent image display unit which independently displays the live observation image when the at least one image superposed thereon is removed by the superposition image removing unit.

2. The system according to claim 1, wherein the superposition unit accumulatively superposes the at least one stored image in an observing method selected by the selection instruction on the live observation image, which is displayed by the display control unit.

3. The system according to claim 1, wherein the operation detected by the detection unit relates to at least one of moving a stage loaded with the specimen, changing a magnification, and focusing.

4. The system according to claim 2, wherein the selection instruction unit is displayed as a part of a graphical user interface, and the display control unit changes a display mode of the selection instruction unit from a first display mode to a second display mode when the selection instruction is provided by the selection instruction unit.

5. The system according to claim 4, wherein the display control unit changes the display mode of the selection instruction unit from the second display mode to the first display mode when a selection release instruction is received from the selection instruction unit, and changes the display mode of the selection instruction unit from the second display mode to a third display mode when the operation of the microscope is detected by the detection unit.

6. The system according to claim 1, wherein the observing methods include a fluorescent observation method in which a fluorescent observation is performed for each wavelength.

7. The system according to claim 1, wherein the observing methods include at least two of a bright field observation method, a dark field observation method, a phase difference observation method, and a differential interference contrast method.

8. A non-transitory computer readable storage medium having a program stored thereon which causes a computer to control a microscope system including a microscope capable of observing a specimen by switching between a plurality of observing methods and an image pickup unit for capturing an optical image of the specimen, the computer causing the computer to perform functions comprising:
a selection instruction acquiring process of acquiring selection instruction information for selecting at least one of the plurality of observing methods;
a superposing process of superposing at least one stored captured image on a live observation image currently being captured based on the selected observing method;
a display controlling process of controlling display of the at least one image superposed on the live observation image;
a detecting process of detecting an operation of the microscope which generates a change of an observation environment of shooting the specimen;
a superposition removing process of removing the at least one image superposed on the live observation image when the operation of the microscope is detected by the detecting process; and an independent image displaying process of independently displaying the live observation image when the at least one image superposed thereon is removed by the superposition removing process.

9. A method of controlling a microscope system including a microscope capable of observing a specimen by switching between a plurality of observing methods and an image pickup unit for capturing an optical image of the specimen, the method comprising:
- acquiring selection instruction information for selecting at least one of the plurality of observing methods;
- superposing at least one stored captured image on a live observation image currently being captured based on the selected observing method;
- controlling display of the at least one image superposed on the live observation image;
- detecting an operation of the microscope which generates a change of an observation environment of shooting the specimen;
- removing the at least one image superposed on the live observation image when the operation of the microscope is detected; and
- independently displaying the live observation image when the at least one image superposed thereon is removed.

* * * * *